(12) United States Patent
Kubota et al.

(10) Patent No.: US 12,514,004 B2
(45) Date of Patent: Dec. 30, 2025

(54) DISPLAY DEVICE, DISPLAY MODULE, ELECTRONIC DEVICE, AND VEHICLE

(71) Applicant: Semiconductor Energy Laboratory Co., Ltd., Atsugi (JP)

(72) Inventors: Daisuke Kubota, Atsugi (JP); Ryo Hatsumi, Hadano (JP)

(73) Assignee: Semiconductor Energy Laboratory Co., Ltd., Atsugi (JP)

( * ) Notice: Subject to any disclaimer, the term of this patent is extended or adjusted under 35 U.S.C. 154(b) by 449 days.

(21) Appl. No.: 17/916,662

(22) PCT Filed: Apr. 2, 2021

(86) PCT No.: PCT/IB2021/052762
§ 371 (c)(1),
(2) Date: Oct. 3, 2022

(87) PCT Pub. No.: WO2021/209852
PCT Pub. Date: Oct. 21, 2021

(65) Prior Publication Data
US 2023/0157123 A1 May 18, 2023

(30) Foreign Application Priority Data

Apr. 16, 2020 (JP) .................................. 2020-073341
Jun. 3, 2020 (JP) .................................. 2020-096692
Aug. 6, 2020 (JP) .................................. 2020-133728

(51) Int. Cl.
*H10K 59/40* (2023.01)
*H04N 23/10* (2023.01)
(Continued)

(52) U.S. Cl.
CPC ............. *H10F 39/12* (2025.01); *H04N 23/10* (2023.01); *H10K 59/40* (2023.02); *H10K 59/65* (2023.02);
(Continued)

(58) Field of Classification Search
CPC ...... H10K 59/40; H10K 59/65; B60R 25/252; H10F 39/198
See application file for complete search history.

(56) References Cited

U.S. PATENT DOCUMENTS 5,060,040 A * 10/1991 Saika .................... H10F 39/198
257/53
8,357,961 B2   1/2013 Hanari
(Continued)

FOREIGN PATENT DOCUMENTS

CN    101753861 A    6/2010
CN    106663396 A    5/2017
(Continued)

OTHER PUBLICATIONS

International Search Report (Application No. PCT/IB2021/052762) Dated Jun. 15, 2021.
(Continued)

*Primary Examiner* — Tucker J Wright
(74) *Attorney, Agent, or Firm* — Eric J. Robinson; Robinson Intellectual Property Law Office, P.C.

(57) ABSTRACT

An imaging device or a display device that is capable of clearly capturing an image of a fingerprint or the like can be provided. The display device includes a light-receiving element, a light-emitting element, a first substrate, a second substrate, a first resin layer, a second resin layer, and a light-blocking layer. The first resin layer, the second resin layer, and the second substrate are stacked over the first substrate. The light-receiving element and the light-emitting element are positioned between the first substrate and the first resin layer. The light-blocking layer is positioned between the first resin layer and the second resin layer and includes an opening portion overlapping with the light-receiving element. The opening portion in the light-blocking layer is positioned on an inner side of a light-receiving
(Continued)

region of the light-receiving element in a plan view, and the width of the opening portion is less than or equal to the width of the light-receiving region. The second substrate is thicker than the first resin layer and the second resin layer. The thickness of a portion of the first resin layer, which overlaps with the light-receiving region of the light-receiving element, is greater than or equal to one time and less than or equal to 10 times as large as the width of the light-receiving region. The second substrate has a higher refractive index than the first resin layer and the second resin layer.

20 Claims, 26 Drawing Sheets

(51) Int. Cl.
*H10F 39/12* (2025.01)
*H10K 59/65* (2023.01)
*H10K 59/80* (2023.01)
*B60R 25/25* (2013.01)
*H10K 39/30* (2023.01)
*H10K 102/00* (2023.01)

(52) U.S. Cl.
CPC .......... *H10K 59/87* (2023.02); *H10K 59/871* (2023.02); *H10K 59/873* (2023.02); *B60R 25/252* (2013.01); *H10F 39/198* (2025.01); *H10K 39/30* (2023.02); *H10K 59/8051* (2023.02); *H10K 59/878* (2023.02); *H10K 59/8791* (2023.02); *H10K 2102/311* (2023.02)

(56) References Cited

U.S. PATENT DOCUMENTS

| | | | |
|---|---|---|---|
| 9,450,133 | B2 | 9/2016 | Nakamura et al. |
| 9,854,629 | B2 | 12/2017 | Ikeda et al. |
| 10,020,355 | B2 | 7/2018 | Ito |
| 10,345,977 | B2 | 7/2019 | Kimura et al. |
| 10,866,682 | B2 | 12/2020 | Kimura et al. |
| 10,910,574 | B2 | 2/2021 | Li et al. |
| 10,923,541 | B2 | 2/2021 | Ju |
| 11,394,014 | B2 | 7/2022 | Kubota et al. |
| 11,469,279 | B2 | 10/2022 | Ju |
| 12,096,659 | B2 | 9/2024 | Kamada et al. |
| 2010/0084642 | A1 | 4/2010 | Hanari |
| 2010/0134735 | A1 | 6/2010 | Nakamura et al. |
| 2013/0299789 | A1 | 11/2013 | Yamazaki et al. |
| 2016/0044751 | A1 | 2/2016 | Ikeda et al. |
| 2017/0288001 | A1 | 10/2017 | Ito |
| 2018/0062098 | A1 | 3/2018 | Li et al. |
| 2018/0076256 | A1 | 3/2018 | Jiang et al. |
| 2018/0107301 | A1 | 4/2018 | Kimura et al. |
| 2019/0013368 | A1* | 1/2019 | Chung .................. H10K 59/65 |
| 2020/0104563 | A1 | 4/2020 | Ryu et al. |
| 2022/0327187 | A1 | 10/2022 | Yoshimoto et al. |
| 2024/0397755 | A1 | 11/2024 | Kamada et al. |

FOREIGN PATENT DOCUMENTS

| | | |
|---|---|---|
| CN | 106970495 A | 7/2017 |
| CN | 109477988 A | 3/2019 |
| EP | 3288083 A | 2/2018 |
| EP | 3352221 A | 7/2018 |
| JP | 2010-091610 A | 4/2010 |
| JP | 2010-153834 A | 7/2010 |
| JP | 2014-197522 A | 10/2014 |
| JP | 2016-038579 A | 3/2016 |
| JP | 2017-188522 A | 10/2017 |
| JP | 2018-067308 A | 4/2018 |
| JP | 2018-533749 | 11/2018 |
| JP | 2019-501399 | 1/2019 |
| KR | 2010-0061393 A | 6/2010 |
| KR | 2018-0122719 A | 11/2018 |
| KR | 2018-0125170 A | 11/2018 |
| KR | 2019-0092661 A | 8/2019 |
| TW | 201036151 | 10/2010 |
| TW | 201610948 | 3/2016 |
| WO | WO-2016/020845 | 2/2016 |
| WO | WO-2018/035812 | 3/2018 |
| WO | WO-2018/049745 | 3/2018 |
| WO | WO-2020/053692 | 3/2020 |

OTHER PUBLICATIONS

Written Opinion (Application No. PCT/IB2021/052762) Dated Jun. 15, 2021.

\* cited by examiner

FIG. 3A
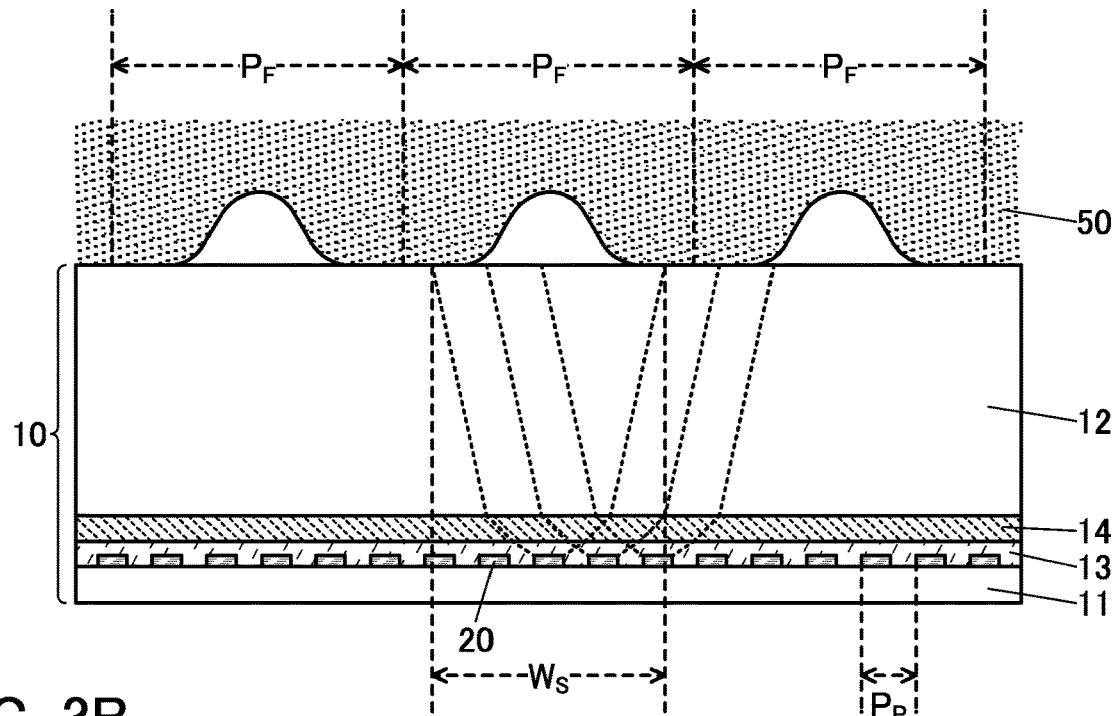
FIG. 3B
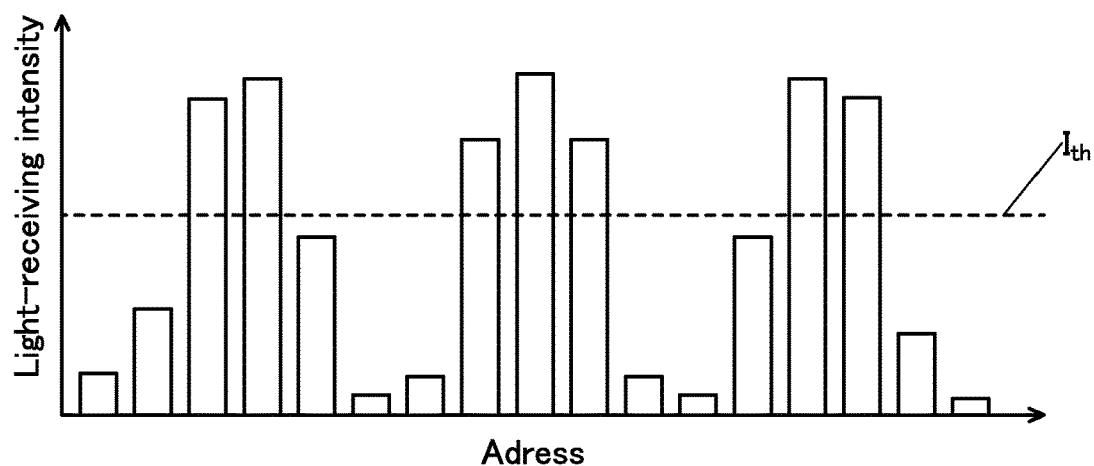
FIG. 3C
FIG. 3D

400

Sample A1

Sample A2

Sample A1

Sample A2

DISPLAY DEVICE, DISPLAY MODULE, ELECTRONIC DEVICE, AND VEHICLE

TECHNICAL FIELD

One embodiment of the present invention relates to a display device. One embodiment of the present invention relates to a display device provided with an image capturing function.

Note that one embodiment of the present invention is not limited to the above technical field. Examples of the technical field of one embodiment of the present invention disclosed in this specification and the like include a semiconductor device, a display device, a light-emitting device, a power storage device, a memory device, an electronic device, a lighting device, an input device, an input/output device, a driving method thereof, and a manufacturing method thereof. A semiconductor device generally means a device that can function by utilizing semiconductor characteristics.

BACKGROUND ART

In recent years, display devices have been required to have higher definition in order to display high-resolution images. In addition, display devices used in information terminal devices such as smartphones, tablet terminals, and laptop PCs (personal computers) have been required to have lower power consumption as well as higher definition. Furthermore, display devices have been required to have a variety of functions such as a touch panel function and a function of capturing images of fingerprints for authentication, in addition to a function of displaying images.

Light-emitting devices including light-emitting elements have been developed, for example, as display devices. Light-emitting elements (also referred to as EL elements) utilizing an electroluminescence (hereinafter referred to as EL) phenomenon have features such as ease of reduction in thickness and weight, high-speed response to an input signal, and driving with a direct-current constant voltage source, and have been used in display devices. For example, Patent Document 1 discloses a flexible light-emitting device including an organic EL element.

REFERENCE

Patent Document

[Patent Document 1] Japanese Published Patent Application No. 2014-197522

SUMMARY OF THE INVENTION

Problems to be Solved by the Invention

An object of one embodiment of the present invention is to provide a display device with an image capturing function. An object of one embodiment of the present invention is to provide an imaging device or a display device that is capable of clearly capturing an image of a fingerprint or the like. An object of one embodiment of the present invention is to provide a display device less likely to be broken.

An object of one embodiment of the present invention is to reduce the number of components of an electronic device. An object of one embodiment of the present invention is to provide a multifunctional display device. An object of one embodiment of the present invention is to provide a display device, an imaging device, a vehicle, an electronic device, or the like that has a novel structure. An object of one embodiment of the present invention is to at least reduce at least one of problems of the conventional technique.

Note that the description of these objects does not preclude the existence of other objects. One embodiment of the present invention does not have to achieve all these objects. Objects other than these can be derived from the description of the specification, the drawings, the claims, and the like.

Means for Solving the Problems

One embodiment of the present invention is a display device including a light-receiving element, a light-emitting element, a first substrate, a second substrate, a first resin layer, a second resin layer, and a light-blocking layer. The first resin layer, the second resin layer, and the second substrate are stacked in this order over the first substrate. The light-receiving element and the light-emitting element are each positioned between the first substrate and the first resin layer. The light-blocking layer is positioned between the first resin layer and the second resin layer and includes a first opening portion overlapping with the light-receiving element. The light-blocking layer includes a region where the first opening portion is positioned on an inner side of a light-receiving region of the light-receiving element in a plan view and the width of the first opening portion is less than or equal to the width of the light-receiving region. The second substrate is thicker than the first resin layer and the second resin layer. The first resin layer comprises a region in which a thickness of a portion overlapping with the light-receiving region of the light-receiving element is greater than or equal to one time and less than or equal to 10 times as large as the width of the light-receiving region. The second substrate has a higher refractive index with respect to a wavelength of light emitted by the light-emitting element than the first resin layer and the second resin layer.

Another embodiment of the present invention is a display device including a first display panel and a second display panel. The first display panel includes a first region. The first region includes a first pixel and a second pixel. The second display panel includes a second region, a third region, and a fourth region. The second region includes a third pixel. The third region has a function of transmitting visible light. The fourth region has a function of blocking visible light. The second pixel and the third region include a region where the second pixel and the third region overlap with each other. At least one of the first pixel, the second pixel, and the third pixel includes a light-emitting element and a light-receiving element.

It is preferable that the first display panel or the second display panel preferably includes the light-receiving element, the light-emitting element, a first substrate, a second substrate, a first resin layer, a second resin layer, and a light-blocking layer. The first resin layer, the second resin layer, and the second substrate are stacked in this order over the first substrate. The light-receiving element and the light-emitting element are each positioned between the first substrate and the first resin layer. The light-blocking layer is positioned between the first resin layer and the second resin layer and includes a first opening portion overlapping with the light-receiving element. The first opening portion in the light-blocking layer is positioned on an inner side of a light-receiving region of the light-receiving element in a plan view, and the light-blocking layer comprises a region in which a width of the first opening portion is less than or equal to a width of the light-receiving region. The second substrate is thicker than the first resin layer and the second resin layer. The first resin layer comprises a region in which a thickness of a portion overlapping with the light-receiving region of the light-receiving element is greater than or equal to one time and less than or equal to 10 times as large as the width of the light-receiving region. The second substrate has a higher refractive index with respect to a wavelength of light emitted by the light-emitting element than the first resin layer and the second resin layer.

In any of the above embodiments, the light-receiving element preferably includes a first pixel electrode, an active layer, and a common electrode. The light-emitting element preferably includes a second pixel electrode, a light-emitting layer, and the common electrode. In this case, the first pixel electrode and the second pixel electrode are preferably positioned on the same surface. Furthermore, the common electrode preferably includes a portion overlapping with the first pixel electrode with the active layer therebetween and a portion overlapping with the second pixel electrode with the light-emitting layer therebetween.

In any of the above embodiments, a common layer is preferably further included. The common layer preferably includes a portion positioned between the first pixel electrode and the common electrode, a portion positioned between the second pixel electrode and the common electrode, and a portion overlapping neither the first pixel electrode nor the second pixel electrode.

In any of the above embodiments, the first resin layer preferably has a lower refractive index with respect to the wavelength of light emitted by the light-emitting element than the second resin layer.

In any of the above embodiments, the refractive index of the second substrate with respect to the wavelength of light emitted by the light-emitting element is preferably greater than or equal to 1.5 and less than or equal to 2.0. Furthermore, the refractive index of the first resin layer with respect to the wavelength of light emitted by the light-emitting element is preferably greater than or equal to 1.3 and less than or equal to 1.6.

In any of the above embodiments, a plug is preferably included. Here, the plurality of light-receiving elements are preferably arranged in matrix. In addition, the pitch of the light-emitting element is preferably greater than or equal to 1 μm and less than or equal to 150 μm.

In the above embodiments, a plurality of light-emitting elements are further included. In this case, the plurality of light-emitting elements are preferably arranged in a matrix with the same arrangement pitch as the light-receiving elements. Alternatively, the plurality of light-emitting elements are preferably arranged in a matrix with an arrangement pitch different from that of the light-receiving elements.

In any of the above embodiments, a functional layer is preferably further included. In this case, it is preferable that the functional layer include a third resin layer and be positioned between the second resin layer and the second substrate. Furthermore, the third resin layer preferably has a lower refractive index with respect to the wavelength of light emitted by the light-emitting element than the second substrate. Moreover, the third resin layer is preferably thinner than the second substrate and thicker than the first resin layer and the second resin layer.

In the above embodiments, the functional layer preferably has a function of a polarizing plate. Alternatively, the functional layer preferably has a function of a touch sensor. In this case, the functional layer preferably includes a first electrode provided along a first surface of the third resin layer.

In the above embodiments, a fourth resin layer is preferably further included. In this case, the fourth resin layer is preferably positioned between the functional layer and the second substrate. The fourth resin layer is preferably thinner than the second substrate and the functional layer. The fourth resin layer preferably has a lower refractive index with respect to the wavelength of light emitted by the light-emitting element than the second substrate.

In any of the above embodiments, a protective layer is preferably further included. In this case, the protective layer is positioned between the first substrate and the first resin layer. It is preferable that the protective layer be provided to cover the light-receiving element and the light-emitting element and include an inorganic insulator. The protective layer is preferably thinner than the first resin layer.

In the above embodiment, a second electrode provided between the protective layer and the first resin layer is preferably included. In this case, the second electrode preferably functions as an electrode of a touch sensor. The second electrode is preferably thinner than the first resin layer.

Another embodiment of the present invention is a display module including any one of the above-described display devices, and a connector or an integrated circuit.

Another embodiment of the present invention is an electronic device including the above display module and at least one of an antenna, a battery, a housing, a camera, a speaker, a microphone, a touch sensor, and an operation button.

Another embodiment of the present invention is a vehicle in which any one of the above-described display devices is provided along a surface of a dashboard.

Another embodiment of the present invention is a vehicle in which any one of the above-described display devices is provided along a surface of a door.

Effect of the Invention

According to one embodiment of the present invention, a display device with an image capturing function can be provided. Alternatively, an imaging device or a display device that is capable of clearly capturing an image of a fingerprint or the like can be provided. Alternatively, a display device that is less likely to be broken can be provided.

According to one embodiment of the present invention, the number of components of an electronic device can be reduced. Alternatively, a multifunctional display device can be provided. Alternatively, a display device, an imaging device, a vehicle, an electronic device, or the like that has a novel structure can be provided. Alternatively, at least one of problems of the conventional technique can be at least reduced.

Note that the description of these effects does not preclude the existence of other effects. One embodiment of the present invention does not have to have all of these effects. Effects other than these can be derived from the description of the specification, the drawings, the claims, and the like.

BRIEF DESCRIPTION OF THE DRAWINGS

FIG. 3A is a diagram illustrating a structure example of a display device. FIG. 3B is a graph showing an example of light-receiving intensity. FIG. 3C illustrates contact portions of a finger.

FIG. 3D is a diagram illustrating an example of an image.

MODE FOR CARRYING OUT THE INVENTION

Figure 1:
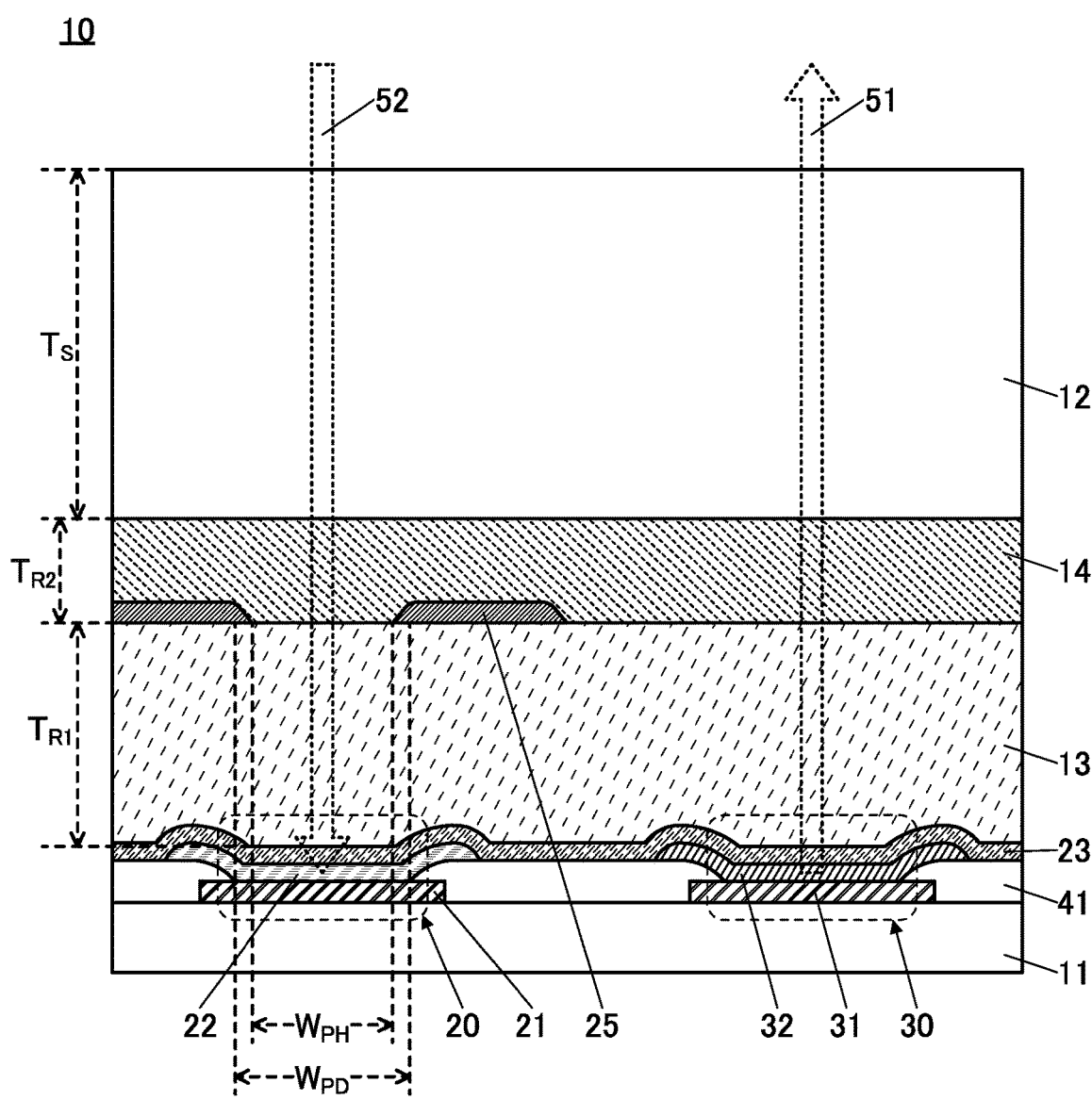
FIG. 1 is a diagram illustrating a structure example of a display device.

Hereinafter, embodiments will be described with reference to the drawings. Note that the embodiments can be implemented in many different modes, and it is readily understood by those skilled in the art that modes and details thereof can be changed in various ways without departing from the spirit and scope thereof. Thus, the present invention should not be construed as being limited to the following description of the embodiments.

Note that in structures of the invention described below, the same portions or portions having similar functions are denoted by the same reference numerals in different drawings, and a description thereof is not repeated. Furthermore, the same hatch pattern is used for the portions having similar functions, and the portions are not especially denoted by reference numerals in some cases.

Note that in each drawing described in this specification, the size, the layer thickness, or the region of each component is exaggerated for clarity in some cases. Therefore, they are not limited to the illustrated scale.

Note that in this specification and the like, the ordinal numbers such as "first" and "second" are used in order to avoid confusion among components and do not limit the number.

Note that the expressions indicating directions such as "over" and "under" are basically used to correspond to the directions of drawings. However, in some cases, the direction indicating "over" or "under" in the specification does not correspond to the direction in the drawings for the purpose of description simplicity or the like.

For example, when a stacking order (or formation order) of a stacked body or the like is described, even in the case where a surface on which the stacked body is provided (e.g., a formation surface, a support surface, an adhesion surface, or a planar surface) is positioned above the stacked body in the drawings, the direction and the opposite direction are referred to as "under" and "over", respectively, in some cases.

Note that in this specification, an EL layer refers to a layer containing at least a light-emitting substance (also referred to as a light-emitting layer) or a stack body including a light-emitting layer, provided between a pair of electrodes of a light-emitting element.

Furthermore, in this specification, a photoelectric conversion layer refers to at least an active layer or a stack body including an active layer that is provided between a pair of electrodes of a light-receiving element. An active layer refers to a layer having a function of generating electron-hole pairs by absorbing light. Note that an active layer includes a single layer and a stack body.

In this specification and the like, a display panel that is one embodiment of a display device has a function of displaying (outputting) an image or the like on (to) a display surface. Therefore, the display panel is one embodiment of an output device.

In this specification and the like, a substrate of a display panel to which a connector such as an FPC (Flexible Printed Circuit) or a TCP (Tape Carrier Package) is attached, or a substrate on which an IC is mounted by a COG (Chip On Glass) method or the like is referred to as a display panel module, a display module, or simply a display panel or the like in some cases.

Embodiment 1

In this embodiment, structure examples of one embodiment of the present invention will be described.

One embodiment of the present invention includes a plurality of light-receiving elements (also referred to as light-receiving devices) and a plurality of light-emitting elements (also referred to as light-emitting devices), which are arranged in a matrix.

One embodiment of the present invention is capable of image capturing by a plurality of light-receiving elements and thus functions as an imaging device. In this case, light-emitting elements can be used as a light source for image capturing. Moreover, one embodiment of the present invention is capable of displaying images by a plurality of light-emitting elements and thus functions as a display device. Accordingly, one embodiment of the present invention can be regarded as a display device having an image capturing function or an imaging device having a display function.

For example, in the display device of one embodiment of the present invention, light-emitting elements are arranged periodically in a matrix in a display portion, and light-receiving elements are also arranged periodically in a matrix in the display portion. Hence, the display portion has a function of displaying images and a function of a light-receiving portion. An image can be captured by the plurality of light-receiving elements provided in the display portion, so that the display device can function as an image sensor, a touch panel, or the like. That is, the display portion can capture an image and detect an approach or a contact of an object. Furthermore, since the light-emitting elements provided in the display portion can be used as a light source at the time of receiving light, another light source does not need to be provided separately from the display device; thus, a highly functional display device can be provided without increasing the number of electronic components.

In one embodiment of the present invention, when an object reflects light emitted by the light-emitting element included in the display portion, the light-receiving element can sense the reflected light; thus, image capturing and touch (including non-contact touch) sensing can be performed even in a dark environment.

Furthermore, when a finger, a palm, or the like touches the display portion of the display device of one embodiment of the present invention, an image of the fingerprint or the palm print can be captured. Thus, an electronic device including the display device of one embodiment of the present invention can perform personal authentication by using the image of the captured fingerprint, palm print, or the like. Accordingly, an imaging device for the fingerprint authentication, palm-print authentication, or the like does not need to be additionally provided, and the number of components of the electronic device can be reduced. Furthermore, since the light-receiving elements are arranged in a matrix in the display portion, an image of a fingerprint, a palm print, or the like can be captured in any portion in the display portion, which can provide a convenient electronic device.

As the light-emitting element, an EL element such as an OLED (Organic Light Emitting Diode) or a QLED (Quantum-dot Light Emitting Diode) is preferably used. As a light-emitting substance included in the EL element, a substance which emits fluorescence (a fluorescent material), a substance which emits phosphorescence (a phosphorescent material), a substance which exhibits thermally activated delayed fluorescence (a thermally activated delayed fluorescent (TADF) material), an inorganic compound (e.g., a quantum dot material), and the like can be given.

As the light-receiving element, a pn photodiode or a pin photodiode can be used, for example. The light-receiving element functions as a photoelectric conversion element that senses light incident on the light-receiving element and generates charge. The amount of generated charge in the photoelectric conversion element is determined depending on the amount of incident light. It is particularly preferable to use an organic photodiode including a layer containing an organic compound as the light-receiving element. An organic photodiode, which is easily made thin, lightweight, and large in area and has a high degree of freedom for shape and design, can be used in a variety of display devices.

An organic compound is preferably used for the active layer of the light-receiving element. In that case, one electrode of the light-emitting element and one electrode of the light-receiving element (the electrodes are also referred to as pixel electrodes) are preferably provided on the same plane. It is further preferable that the other electrode of the light-emitting element and the other electrode of the light-receiving element be an electrode (also referred to as a common electrode) formed using one continuous conductive layer. It is still further preferable that the light-emitting element and the light-receiving element include a common layer. Thus, the manufacturing process of the light-emitting element and the light-receiving element can be simplified, so that the manufacturing cost can be reduced and the manufacturing yield can be increased.

The light-emitting element and the light-receiving element can be provided between a first substrate and a second substrate. At this time, the light-emitting element emits light to the second substrate side, and the light-receiving element receives light incident from the second substrate side. In the display device, a surface on an outer side (a surface opposite to the first substrate) of the second substrate functions as a display surface and a light-receiving surface (also referred to as an imaging surface) of the display device. Note that the display surface and the light-receiving surface are not limited to the surface of the second substrate itself. For example, the surface of the second substrate is coated with an inorganic or organic substance in some cases.

The range of light received by one light-receiving element becomes wider as the object is farther away from the light-receiving element; therefore, when the distance between the light-receiving element and the object is large, a blur is generated in the captured image, which inhibits capturing of a clear image. In this case, the distance between the light-receiving element and the object is the smallest when the object is in contact with the light-receiving surface of the display device. Accordingly, it is necessary that a clear image can be captured at least when the object is in contact with the light-receiving surface of the display device.

For example, the distance between the light-receiving element and the light-receiving surface can be small when the thickness of the second substrate is small, in which case a clear image can be captured. However, thinning the second substrate causes a problem of a reduction in the mechanical strength of the display device. Therefore, a display device that is capable of capturing a clear image and has high mechanical strength is required.

Thus, one embodiment of the present invention has a structure in which a light-emitting element and a light-receiving element are provided side by side over a first substrate, and a first resin layer, a second resin layer, and a second substrate are provided in this order to cover the light-emitting element and the light-receiving element. Furthermore, a light-blocking layer with an opening portion overlapping with a light-receiving region of the light-receiving element is provided over the light-receiving element. The light-blocking layer is provided between the first resin layer and the second resin layer. A material thicker than the first resin layer and the second resin layer is used for the second substrate. The first resin layer is made thicker than the width of the light-receiving region of the light-receiving element. Moreover, a material having a higher refractive index with respect to the wavelength of light emitted by the light-emitting element than the first resin layer and the second resin layer is used for the second substrate.

Owing to the light-blocking layer with the opening overlapping with the light-receiving element, an area where light can be received by the light-receiving element can be narrowed. Furthermore, increasing the thickness of the first resin layer can increase the distance between the light-blocking layer and the light-receiving element, making it possible to further narrow the area where light can be received by the light-receiving element. Moreover, using a material with a high refractive index as the first substrate can further narrow the area where light is incident on one light-receiving element. Thus, the second substrate can be made thick while capturing of a clear image is enabled, whereby the mechanical strength can be increased.

In addition, when a material having a lower refractive index with respect to the wavelength of light emitted by the light-emitting element than the second resin layer is used for the first resin layer, the area where light can be received by the light-receiving element can be further narrowed because of a difference in refractive index between the first resin layer and the second resin layer. At this time, the effect can be further enhanced when the second resin layer is made thinner than the first resin layer.

Specifically, it is preferable to select materials so that the refractive index with respect to the wavelength of light emitted by the light-emitting element (hereinafter, simply referred to as the refractive index) of the second substrate is the highest and that of the first resin layer is the lowest. At this time, it is preferable that the refractive index of the second substrate be greater than or equal to 1.5 and less than or equal to 2.0 and the refractive index of the first resin layer be greater than or equal to 1.3 and less than or equal to 1.6. If possible, the refractive index of the second substrate may be greater than 2.0. Furthermore, if possible, the refractive index of the first resin layer may be lower than 1.3.

When light-receiving elements are arranged at high density, capturing of a clearer image becomes possible. Specifically, the arrangement pitch of the light-receiving elements is less than or equal to 400 μm, preferably less than or equal to 200 μm, further preferably less than or equal to 150 μm, still further preferably less than or equal to 120 μm, yet still further preferably less than or equal to 100 μm, even yet still further preferably less than or equal to 50 μm. The arrangement pitch is preferably as small as possible and can be greater than or equal to 1 μm, greater than or equal to 10 μm, or greater than or equal to 20 μm, for example.

A functional layer including a third resin layer can be provided between the second substrate and the second resin layer. A material that is thinner than the second substrate and thicker than the first resin layer and the second resin layer is preferably used for the third resin layer. Moreover, the material having a lower refractive index than the second substrate is preferably used for the third resin layer.

As the functional layer, for example, an optical member such as a polarizing plate (including a circularly polarizing plate), a condensing film, or a microlens array can be used. Alternatively, a touch sensor panel may be used as the functional layer. A touch sensor of any of various types such as a resistive type, a capacitive type, an infrared ray type, an electromagnetic induction type, and a surface acoustic wave type can be used as a touch sensor provided in the touch sensor panel. As the touch sensor, a capacitive touch sensor is particularly preferable. In the case of using the touch sensor, the functional layer can have a structure including the third resin layer and one or more conductive layers that are provided over one surface of the third resin layer and function as electrodes.

A fourth resin layer may be further provided between the functional layer and the second substrate. In this case, a material thinner than the second substrate and the functional layer is preferably used for the fourth resin layer. In addition, a material having a lower refractive index than the second substrate is preferably used for the fourth resin layer.

More specific examples are described below with reference to drawings.

Structure Example 1

FIG. 1 is a cross-sectional schematic view of a display device 10 of one embodiment of the present invention.

The display device 10 includes a substrate 11, a substrate 12, a light-receiving element 20, a light-emitting element 30, a resin layer 13, a resin layer 14, a light-blocking layer 25, an insulating layer 41, and the like.

The light-receiving element 20 and the light-emitting element 30 are provided over the substrate 11. The resin layer 13 is provided to cover the light-receiving element 20 and the light-emitting element 30. The resin layer 14 is provided between the resin layer 13 and the substrate 12. The light-blocking layer 25 is provided between the resin layer 13 and the resin layer 14.

The light-emitting element 30 has a function of emitting light 51 to the substrate 12 side. The light-receiving element 20 has a function of receiving light 52 incident from the substrate 12 side.

The light-emitting element 30 can be a light-emitting element that emits any one of red (R) light, green (G) light, and blue (B) light, for example. Alternatively, the light-emitting element 30 may be a light-emitting element that emits white (W) light, yellow (Y) light, or the like. The emission spectrum of the light-emitting element 30 may have two or more peaks.

The light-receiving element 20 includes a conductive layer 21 functioning as a pixel electrode, a photoelectric conversion layer 22, and a conductive layer 23 functioning as a common electrode. The photoelectric conversion layer 22 includes at least an active layer. The conductive layer 21 is provided over the substrate 11. The insulating layer 41 is provided to cover end portions of the conductive layer 21. The photoelectric conversion layer 22 is provided over the conductive layer 21 and the insulating layer 41. The conductive layer 23 is provided over the photoelectric conversion layer 22 and the insulating layer 41.

The light-emitting element 30 includes a conductive layer 31 functioning as a pixel electrode, an EL layer 32, and the conductive layer 23 functioning as a common electrode. The EL layer 32 includes at least a light-emitting layer. The conductive layer 31 is provided over the substrate 11. The insulating layer 41 is provided to cover end portions of the conductive layer 31. The EL layer 32 is provided over the conductive layer 31 and the insulating layer 41. The conductive layer 23 is provided over the EL layer 32 and the insulating layer 41.

Here, the conductive layer 21 and the conductive layer 31 are preferably provided on the same surface over the substrate 11. Furthermore, the conductive layer 21 and the conductive layer 31 are preferably formed by processing the same conductive film. The conductive layer 23 includes a portion overlapping with the conductive layer 21 with the photoelectric conversion layer 22 therebetween and a portion overlapping with the conductive layer 31 with the EL layer 32 therebetween. With such a structure, components of the light-receiving element 20 and the light-emitting element 30 other than the photoelectric conversion layer 22 and the EL layer 32 can be manufactured through a common process, so that the manufacturing cost can be reduced.

Although the conductive layer 21 and the conductive layer 31 are provided directly on the substrate 11 in the example illustrated in FIG. 1, it is preferable that an insulating layer, a wiring, an electrode, a transistor, a capacitor, or the like be provided as appropriate between the substrate 11 and the conductive layer 21 and the conductive layer 31.

The resin layer 13 is provided to cover the conductive layer 23. The resin layer 13 functions as a protective layer for protecting the light-receiving element 20 and the light-emitting element 30. Note that a protective layer including an inorganic insulating material may further be provided between the resin layer 13 and the conductive layer 23.

The light-blocking layer 25 is provided over the resin layer 13. The light-blocking layer 25 has a function of blocking part of light incident from the substrate 12 side and adjusting the area where light is received by the light-receiving element 20.

The resin layer 14 functions as a bonding layer for bonding the resin layer 13 and the substrate 12.

Here, the light-blocking layer 25 has an opening portion overlapping with a light-receiving region of the light-receiving element 20. The opening portion is preferably provided to be positioned on an inner side than the light-receiving region of the light-receiving element 20 in a plan view.

FIG. 1 shows the relationship between a width $W_{PD}$ of the light-receiving region of the light-receiving element 20 and a width $W_{PH}$ of the opening portion of the light-blocking layer 25. The light-receiving region of the light-receiving element 20 can be a region that is not covered with the insulating layer 41 over the conductive layer 21. That is, the width $W_{PD}$ of the light-receiving region of the light-receiving element 20 in a cross-sectional view can be referred to as the length of a straight line connecting end portions of a pair of insulating layers 41 over the conductive layer 21. Alternatively, the width $W_{PD}$ of the light-receiving region can also be referred to as the width of a region where the conductive layer 21 and the photoelectric conversion layer 22 are in contact with each other.

As illustrated in FIG. 1, the light-emitting element 20 and the light-blocking layer 25 are preferably provided so that the opening portion of the light-blocking layer 25 can be positioned on an inner side than the light-receiving region of the light-receiving element 20. Reducing the width $W_{PH}$ with respect to the width Wm allows the area where light can be received by the light-receiving element 20 to be narrowed, thereby enabling capturing of a clear image. In contrast, when the width $W_{PH}$ is too small, the amount of light reaching the light-receiving element 20 decreases, in which case light exposure time needs to be lengthened. Thus, the width $W_{PH}$ can be set to an appropriate width depending on the sensitivity of the light-receiving element 20.

Here, the thickness of the resin layer 13 is referred to as a thickness $T_{R1}$, the thickness of the resin layer 14 is referred to as a thickness $T_{R2}$, and the thickness of the substrate 12 is referred to as a thickness $T_S$. Note that in the case where these thicknesses are not uniform, the thicknesses of portions overlapping at least the light-receiving region of the light-receiving element 20 are employed as the above-described thicknesses. The thickness $T_{R1}$ of the resin layer 13 is a distance from the top surface of the conductive layer 23 over the conductive layer 21 to the top surface of the resin layer 13.

The thickness $T_S$ of the substrate 12 is preferably larger than the thickness $T_{R1}$ of the resin layer 13 and the thickness $T_{R2}$ of the resin layer 14. As the thickness $T_S$ of the substrate 12 becomes larger, the mechanical strength can be more enhanced. For example, the thickness $T_S$ can be greater than or equal to 0.1 mm, preferably greater than or equal to 0.2 mm, further preferably greater than or equal to 0.5 mm, still further preferably greater than or equal to 0.7 mm, and less than or equal to 5 mm, preferably less than or equal to 3 mm, further preferably less than or equal to 2 mm. Typically, the thickness $T_S$ can be 0.5 mm, 0.7 mm, 1.0 mm, 1.3 mm, or 1.5 mm.

The thickness $T_{R1}$ of the resin layer 13 is preferably larger than the thickness $T_{R2}$ of the resin layer 14. As the thickness of the resin layer 13 becomes larger, the distance between the light-receiving element 20 and the light-blocking layer 25 can be increased. Accordingly, the imaging range of one light-receiving element 20 can be narrowed, making it possible to capture a clear image.

Here, the thickness $T_{R1}$ of the resin layer 13 is preferably equal to or larger than the width Wm of the light-receiving region of the light-receiving element 20. For example, the ratio of the thickness $T_{R1}$ to the width Wm ($T_{R1}/W_{PD}$) can be greater than or equal to 1, preferably greater than or equal to 1.2, further preferably greater than or equal to 1.5, still further preferably greater than or equal to 2.0, and less than or equal to 10, preferably less than or equal to 8, further preferably less than or equal to 6, still further preferably less than or equal to 5.

The thickness $T_{R1}$ of the resin layer 13 can be, for example, greater than or equal to 1 μm, preferably greater than or equal to 3 μm, further preferably greater than or equal to 5 μm, still further preferably greater than or equal to 10 μm, and less than or equal to 200 μm, preferably less than or equal to 100 μm, further preferably less than or equal to 70 μm, still further preferably less than or equal to 50 μm. Typically, the thickness $T_{R1}$ can be approximately 20 μm, approximately 30 μm, or approximately 40 μm.

For example, in the case where the width $W_{PH}$ of the opening of the light-blocking layer 25 is equal to the width $W_{PD}$ of the light-receiving region of the light-receiving element 20 and the thickness $T_{R1}$ of the resin layer 13 is equal to the width $W_{PD}$ of the light-receiving region of the light-receiving element 20, the maximum angle of incidence of light reaching the light-receiving region of the light-receiving element 20 through the opening of the light-blocking layer 25 is 45°. In the case where the maximum angle of incidence is sufficiently larger than 45° (e.g., greater than or equal to 50° or greater than or equal to 60°), light totally reflected inside the substrate 12, the resin layer 14, and the like enters, whereby the contrast of an image to be captured might be reduced. Therefore, the width $W_{PH}$ of the opening of the light-blocking layer 25, the thickness $T_{R1}$ of the resin layer 13, and the like are preferably adjusted so that the maximum angle of incidence can be less than or equal to 45°.

The thickness $T_{R1}$ is preferably large with respect to the width $W_{PD}$ of the light-receiving region of the light-receiving element 20, in which case the maximum angle of incidence becomes close to 0° and the imaging range of one light-receiving element 20 can be narrowed. Therefore, the thickness $T_{R1}$ of the resin layer 13 is preferably as large as possible; however, in consideration of productivity, as described above, the thickness $T_{R1}$ of the resin layer 13 can be less than or equal to 10 times, preferably less than or equal to 8 times, further preferably less than or equal to 6 times, still further preferably less than or equal to 5 times as large as the width $W_{PD}$ of the light-receiving region of the light-receiving element 20.

Here, the refractive index of the resin layer 13 with respect to the wavelength of the light 51 emitted by the light-emitting element 30 is referred to as $n_{R1}$, the refractive index of the resin layer 14 with respect to the wavelength is referred to as $n_{R2}$, and the refractive index of the substrate 12 with respect to the wavelength is referred to as $n_S$. Note that as the wavelength of the light 51, the wavelength of the highest peak in the spectrum of the light 51 or a refractive index with respect to light with a wavelength of 550 nm is employed.

The refractive index $n_S$ of the substrate 12 is preferably higher than the refractive index $n_{R1}$ of the resin layer 13 and the refractive index $n_{R2}$ of the resin layer 14. Accordingly, the imaging range of one light-receiving element 20 can be narrowed and a clear image can be obtained even when the thickness of the substrate 12 is large. The refractive index $n_S$ can be, for example, greater than or equal to 1.5, preferably greater than or equal to 1.55, further preferably greater than or equal to 1.6, and less than or equal to 2.0, less than or equal to 1.98, or less than or equal to 1.96. Note that the refractive index $n_S$ of the substrate 12 can be higher than 2.0, if possible.

For example, a glass substrate of barium borosilicate glass, aluminosilicate glass, or the like, a ceramic substrate, a quartz substrate, a sapphire substrate; or the like can be used as the substrate 12. Alternatively, high refractive index glass including titanium, yttrium, niobium, lanthanum, lead, bismuth, gadolinium, or the like may be used. Alternatively, a high refractive index resin material can be used.

The difference between the refractive index $n_{R1}$ of the resin layer 13 and the refractive index $n_S$ of the substrate 12 is preferably as large as possible, in which case the imaging range of one light-receiving element 20 can be narrowed with utilization of refraction. For example, the refractive index $n_{R1}$ of the resin layer 13 can be greater than or equal to 1.3, greater than or equal to 1.35, or greater than or equal to 1.4, and less than or equal to 1.6, preferably less than or equal to 1.58, further preferably less than or equal to 1.56. Note that the refractive index $n_{R1}$ of the resin layer 13 may be lower than 1.3, if possible.

The refractive index $n_{R2}$ of the resin layer 14 is within a range greater than or equal to the refractive index $n_{R1}$ and less than or equal to the refractive index $n_S$. For example, the resin layer 14 may be formed using the same material as the resin layer 13, so that the resin layer 14 may be a resin layer having substantially the same refractive index as the resin layer 13. Note that the refractive index may vary depending on the formation method although the same material is used, in which case adjustment is preferably performed so that the refractive index $n_{R2}$ of the resin layer 14 cannot be lower than the refractive index $n_{R1}$ of the resin layer 13. Note that, for example, in the case where the resin layer 14 has a sufficiently small thickness (e.g., a thickness smaller than or equal to one tenth of the thickness $T_S$ of the substrate 12), a material having a lower refractive index than the resin layer 13 can be used for the resin layer 14 in some cases.

As each of the resin layer 13 and the resin layer 14, an acrylic resin, an epoxy resin, a polyimide resin, a polyamide resin (e.g., nylon or aramid), a polyamide-imide resin, a benzocyclobutene-based resin, a phenol resin, a polyester resin such as polyethylene-terephthalate (PET) or polyethylene naphthalate (PEN), a polyacrylonitrile resin, a polymethylmethacrylate resin, a polycarbonate (PC) resin, a polyether sulfone (PES) resin, a polysiloxane resin, a cycloolefin resin, a polystyrene resin, a polyurethane resin, a polyvinyl chloride resin, a polyvinylidene chloride resin, a polypropylene resin, a polytetrafluoroethylene (PTFE) resin, an ABS resin, cellulose nanofiber, or the like can be used. Alternatively, a precursor of any of the above resins may be used.

Such a structure makes it possible to provide a display device or an imaging device that has high mechanical strength and is capable of capturing a clear image.

Structure Example of Pixel

As described above, one embodiment of the present invention can capture an image with a plurality of light-receiving elements arranged in a matrix. Furthermore, an image can be displayed with a plurality of light-emitting elements arranged in a matrix. Light-emitting elements of three colors, e.g., red (R), green (G), and blue (B), are positioned in one pixel included in the display device, whereby a full-color display device can be obtained. An example of the pixel included in the display device will be described below.

Structure Example of Pixel

Figure 2A:
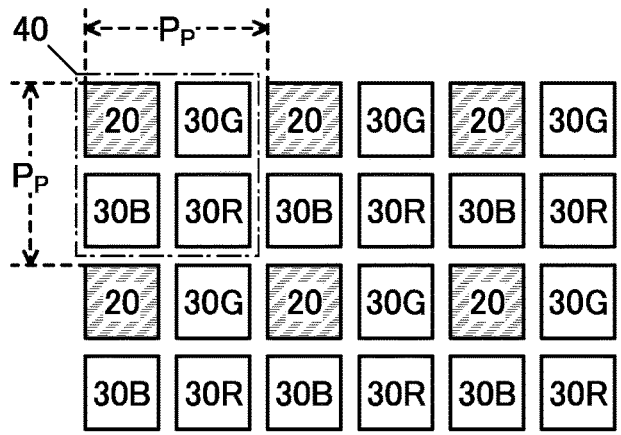
FIG. 2A to FIG. 2C are diagrams illustrating structure examples of a display device.

FIG. 2A illustrates a structure example of a pixel 40. The pixel 40 includes the light-receiving element 20, a light-emitting element 30R, a light-emitting element 30G, and a light-emitting element 30B. The light-emitting element 30R is a light-emitting element that emits red light, the light-emitting element 30G is a light-emitting element that emits green light, and the light-emitting element 30B is a light-emitting element that emits blue light.

Note that the light-receiving elements 20 and the light-emitting elements are arranged with the same arrangement pitch in the example illustrated here, these may be arranged with different arrangement pitches. For example, the light-receiving elements 20 may be arranged with an arrangement pitch smaller than that of the light-emitting elements and may be arranged with an arrangement pitch larger than that of the light-emitting elements. In this case, the arrangement pitch of the light-receiving elements 20 is preferably an integer multiple of the arrangement pitch of the light-emitting elements; alternatively, the arrangement pitch of the light-emitting elements is preferably an integer multiple of the arrangement pitch of the light-receiving elements 20.

Although one pixel is provided with one of each color of light-emitting elements and one light-receiving element 20 in the example illustrated here, one pixel may be provided with a plurality of light-emitting elements of the same color and may be provided with a plurality of light-receiving elements 20.

Although one pixel is provided with the light-emitting elements that emits different colors in the example illustrated here, a structure in which one pixel includes one or more light-emitting elements emitting the same color and one or more light-receiving elements may be employed, for example, in the case where single-color display is performed or the case where the light-emitting elements are used only as a light source for image capturing. Furthermore, light-emitting elements of a single color and the light-receiving elements 20 can be independently arranged in a matrix with different arrangement pitches.

In FIG. 2A, three pixels 40 in the row direction (horizontal direction) and two pixels 40 in the column direction (vertical direction) are illustrated. The light-receiving elements 20 and the light-emitting elements 30G are arranged alternately in the row direction. The light-emitting elements 30B and the light-emitting elements 30R are arranged alternately in the row direction. The light-receiving elements 20 and the light-emitting elements 30B are arranged alternately in the column direction. Note that the structure is not limited to that illustrated in FIG. 2A, and it is possible to change the positions of light-receiving elements 20, the light-emitting elements 30R, the light-emitting elements 30G, and the light-emitting elements 30B to one another.

Here, the pixels 40 arranged in the row direction and the column direction with an arrangement pitch $P_P$. Accordingly, all of the light-receiving elements 20, the light-emitting elements 30R, the light-emitting elements 30G, and the light-emitting elements 30B are arranged in the row direction and the column direction with the arrangement pitch $P_P$.

Figure 2B:
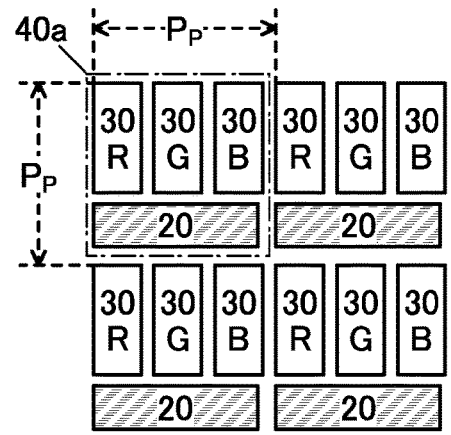

In a pixel 40a illustrated in FIG. 2B, the light-emitting element 30R, the light-emitting element 30G, and the light-emitting element 30B are arranged side by side in the row direction, and the light-receiving element 20 is positioned in a different row. Also in the pixel 40a, the light-emitting elements 30R, the light-emitting elements 30G, and the light-emitting elements 30B are arranged in the row direction and the column direction with the arrangement pitch $P_P$.

[Imaging Range of Light-Receiving Element]

Figure 2C:
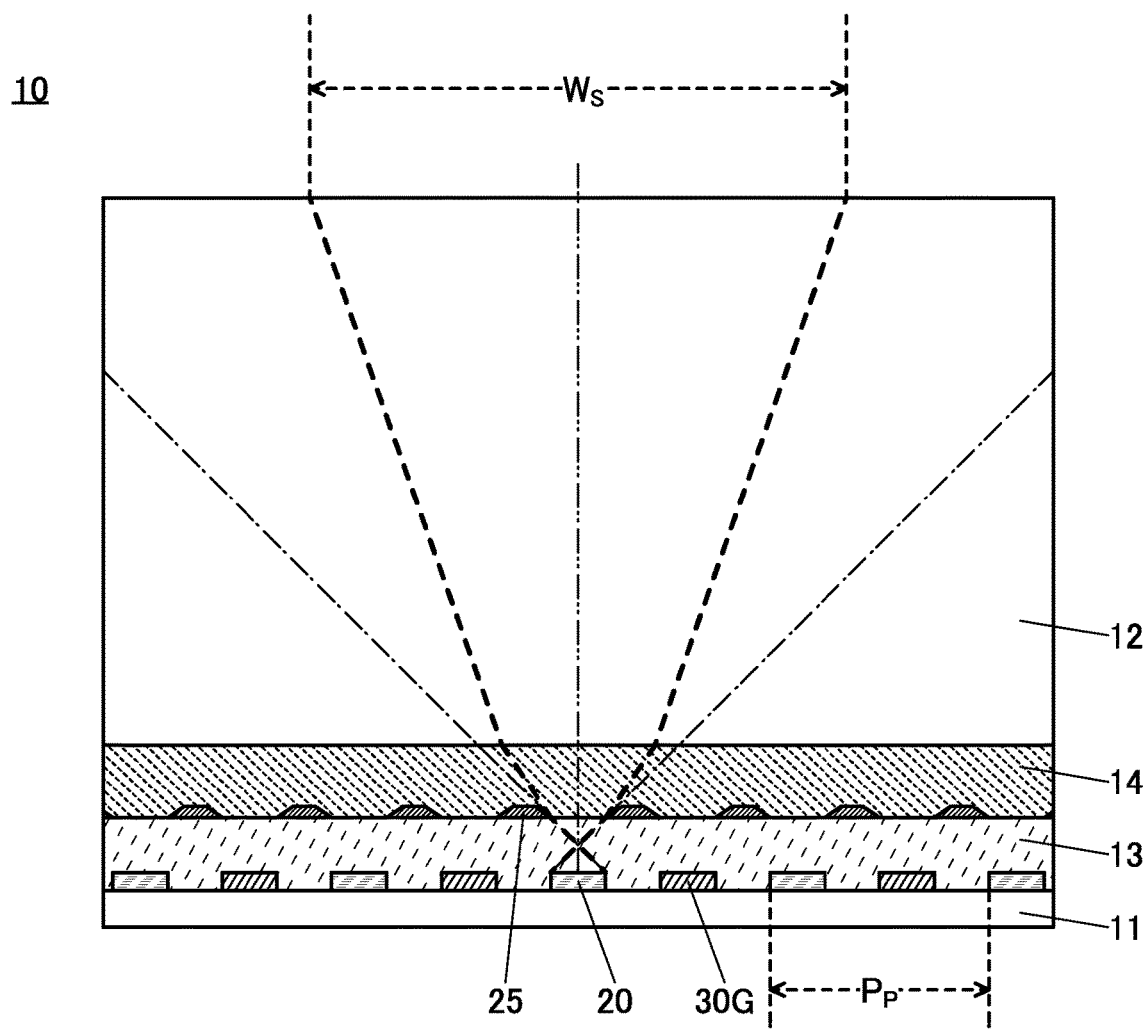

FIG. 2C is a schematic cross-sectional view of a region including a plurality of pixels 40. The cross-sectional view of FIG. 2C shows an example in the case where a region including the light-receiving elements 20 and the light-emitting elements 30G in FIG. 2A is cut in the row direction.

For simplicity, the light-receiving elements 20 and the light-emitting elements 30G are each denoted by a rectangle in FIG. 2C. As illustrated in FIG. 2C, the light-receiving elements 20 and the light-emitting elements 30G are arranged with the arrangement pitch $P_P$. In FIG. 2C, the light-receiving elements 20 and the light-emitting elements 30G are arranged at regular intervals.

Here, with a focus on one light-receiving element 20, an imaging range of the light-receiving element 20 will be described.

Light incident from above the substrate 12 is refracted at the interface between the substrate 12 and the resin layer 14. At this time, the refractive index of the resin layer 14 is lower than that of the substrate 12, and thus the angle of refraction is large with respect to the angle of incidence on the resin layer 14 from the substrate 12. Furthermore, light that has passed through the resin layer 14 is refracted also at the interface between the resin layer 14 and the resin layer 13. Assuming that the refractive index of the resin layer 13 is lower than that of the resin layer 14, as for light incident on the resin layer 13 from the resin layer 14, the angle of refraction is large with respect to the angle of incidence.

The maximum angle of incidence of light incident on the light-receiving element 20 is roughly determined by the width of the light-receiving region of the light-receiving element 20, the width of the opening of the light-blocking layer 25, and the thickness of the resin layer 13 (the distance between the light-receiving element 20 and the light-blocking layer 25). Specifically, an angle formed by a straight line (denoted by a dashed-dotted line) that connects the edge of the light-receiving region of the light-receiving element 20 and the edge of the light-blocking layer 25 positioned on the opposite side and a straight line (denoted by a dashed-two dotted line) perpendicular to the light-receiving surface of the light-receiving element 20 is the maximum angle of incidence of light that can be incident on the light-receiving element 20.

A region surrounded by two dashed-dotted lines in FIG. 2C corresponds to the imaging range of the light-receiving element 20 in the case where the resin layer 13, the resin layer 14, and the substrate 12 have the same refractive index and no refraction is caused at the interfaces of them.

A region $W_S$ illustrated in FIG. 2C corresponds to the imaging range of one light-receiving element 20 on the top surface of the substrate 12. In this manner, among the substrate 12, the resin layer 13, and the resin layer 14, the substrate 12 positioned on the imaging surface side and having the largest thickness is formed using a material having a higher refractive index than the resin layer 13 and the resin layer 14, and the resin layer 13 nearest to the light-receiving element 20 is formed using a material having a lower refractive index than the substrate 12 and the resin layer 14, whereby the imaging range of one light-receiving element 20 can be favorably narrowed. Consequently, a clear image can be captured.

[Image Capturing]

Imaging capturing for an object in contact with the outer surface of the substrate 12 will described below.

FIG. 3A is a schematic cross-sectional view illustrating the display device 10 and a finger 50 that is an object in contact with the substrate 12 of the display device 10. In FIG. 3A, for simplicity, only the light-receiving elements 20 are illustrated and the light-blocking layer 25, the light-emitting elements, and the like are not illustrated. The light-receiving elements 20 are arranged with the arrangement pitch $P_P$.

The surface of the finger 50 has a fingerprint formed of depressions and projections. As illustrated in FIG. 3A, when the finger 50 touches the substrate 12, the projections of the finger 50 are in contact with the substrate 12 and the depressions are not in contact with the substrate 12. The contact portions are separated from the non-contact portions in an image captured by the display device 10, whereby a fingerprint pattern can be obtained.

The distance between the projections of the finger 50 is referred to as a pitch $P_F$. In the case where the arrangement pitch $P_P$ of the light-receiving elements 20 is set to be smaller than the distance between two projections of the fingerprint (the pitch $P_F$), preferably smaller than the distance between the depression and the projection adjacent to each other (a half of the pitch $P_F$), a clear fingerprint image can be obtained. The pitch $P_P$ of a human finger varies among individuals, but is generally within a range from 300 µm to 500 µm, typically approximately 460 µm. Accordingly, the arrangement pitch of the light-receiving elements 20 is less than or equal to 400 µm, preferably less than or equal to 200 µm, further preferably less than or equal to 150 µm, still further preferably less than or equal to 120 µm, still further preferably less than or equal to 100 µm, still further preferably less than or equal to 50 µm. The arrangement pitch is preferably as small as possible, and can be greater than or equal to 1 µm or greater than or equal to 10 µm, for example.

In FIG. 3A, the region $W_S$ for one light-receiving element 20 is denoted by dashed lines. In addition, the imaging ranges of three adjacent light-receiving elements 20 including the one light-receiving elements 20 are each denoted by dotted lines. As illustrated in FIG. 3A, the imaging ranges of the plurality of light-receiving elements 20 may include an overlapping portion.

Here, reflection of light from a surface or an interface is categorized into regular reflection and diffuse reflection. Regularly reflected light is highly directional light with the angle of reflection equal to the angle of incidence. Diffusely reflected light has low directionality and low angular dependence of intensity. Light reflected at the surface or the interface includes both regularly reflected light and diffusely reflected light unless the surface or the interface is an ideal mirror surface or an ideal scatterer. Here, as for regular reflection and diffuse reflection, diffuse reflection components are dominant in the light reflected from the surface of the finger 50. Meanwhile, regular reflection components are dominant in the light reflected from the interface between the substrate 12 and the air.

When an image of the fingerprint is to be captured, light-emitting elements (not illustrated) provided over the substrate 11 are made to emit light and the reflection light reflected by the surface of the substrate 12 (or the interface with the finger 50) is received by the light-receiving elements 20, whereby an image can be captured. Here, in the depression of the finger 50, the substrate 12 and the finger 50 are not in contact with each other, and thus reflection is caused at the interface between the substrate 12 and the air, so that regularly reflected light is dominant. Meanwhile, in the projection of the finger 50, the substrate 12 and the finger 50 are in contact with each other, so that diffusely reflected light is dominant. Accordingly, the intensity of light received (light-receiving intensity) by the light-receiving element 20 positioned directly below the depression is higher than the intensity of light received by the light-receiving element 20 positioned directly below the projection. This makes it possible to capture an image with a high contrast by the depression and the projection.

As illustrated in FIG. 3A, the width of the region $W_S$ that is the imaging range of one light-receiving element 20 is made smaller than that of two periods of the fingerprint of the finger 50 (double the pitch $P_F$). When the width of the region $W_S$ exceeds double the pitch $P_F$, two or more projections or depressions of the finger 50 are included in the region $W_S$, which makes it difficult to obtain a clear image.

FIG. 3B shows an example of the intensity of light received (light-receiving intensity) by each of 18 light-receiving elements 20 in FIG. 3A. The horizontal axis in FIG. 3B indicates addresses of the light-receiving elements 20. As illustrated in FIG. 3A and FIG. 3B, the light-receiving intensity of the light-receiving element 20 near the depression of the finger 50 is high, and the light-receiving intensity of the light-receiving element 20 near the projection is low.

Data of the light-receiving intensity obtained with the light-receiving element 20 is output as analog data and converted into digital data, and can be treated as digital values. For example, with image data of 8-bit gray levels, a smooth image of a fingerprint can be obtained. A clear image can be captured for a variety of objects (a printed matter, a photograph, and other various kinds of matters), without limitation to the fingerprint. In contrast, in the case of biometric authentication such as fingerprint authentication or palm print authentication, image data with a small number of gray levels is used, whereby a pattern of a fingerprint, a palm print, or the like can be more clarified, so that the authentication can be performed with high accuracy.

In the case of binarizing data of the light-receiving intensity of light received by the light-receiving element 20, a predetermined threshold intensity $I_{th}$ is set as shown in FIG. 3B, and binary data can be generated with the threshold intensity $I_{th}$ as the boundary. The threshold intensity $I_{th}$ can be set as appropriate on the basis of all the data of light received by all the light-receiving elements 20. For example, the threshold intensity $I_{th}$ may be an intermediate value between the maximum value and the minimum value of all the data or may be the average value of all the data. Note that it is preferable that the threshold intensity $I_{th}$ be higher than the intermediate value or the average value in consideration of influences of noise, dark current, and the like. Alternatively, binary data may be generated using data from which the influences of noise, dark current, and the like have been removed in advance.

Next, an example of an image in the case of capturing an image of a fingerprint is described. FIG. 3C schematically illustrates contact portions and non-contact portions of the finger 50 and the substrate 12. The contact portions are denoted by hatching. FIG. 3D shows an example of an image captured with the light-receiving elements 20. FIG. 3D shows the binarized image with vertical 32×horizontal 48 pixels. In this manner, the pattern reflecting the unevenness of the fingerprint can be captured clearly. Furthermore, when the arrangement pitch $P_P$ of the light-receiving elements 20 is made small, an image smoother than that in FIG. 3D can be obtained.

Structure Example 2

An example of a display device having a structure different from the above is described below. Note that the above description can be referred to for portions similar to those described above, and description of the portions is omitted in some cases.

Structure Example 2-1

Figure 4:
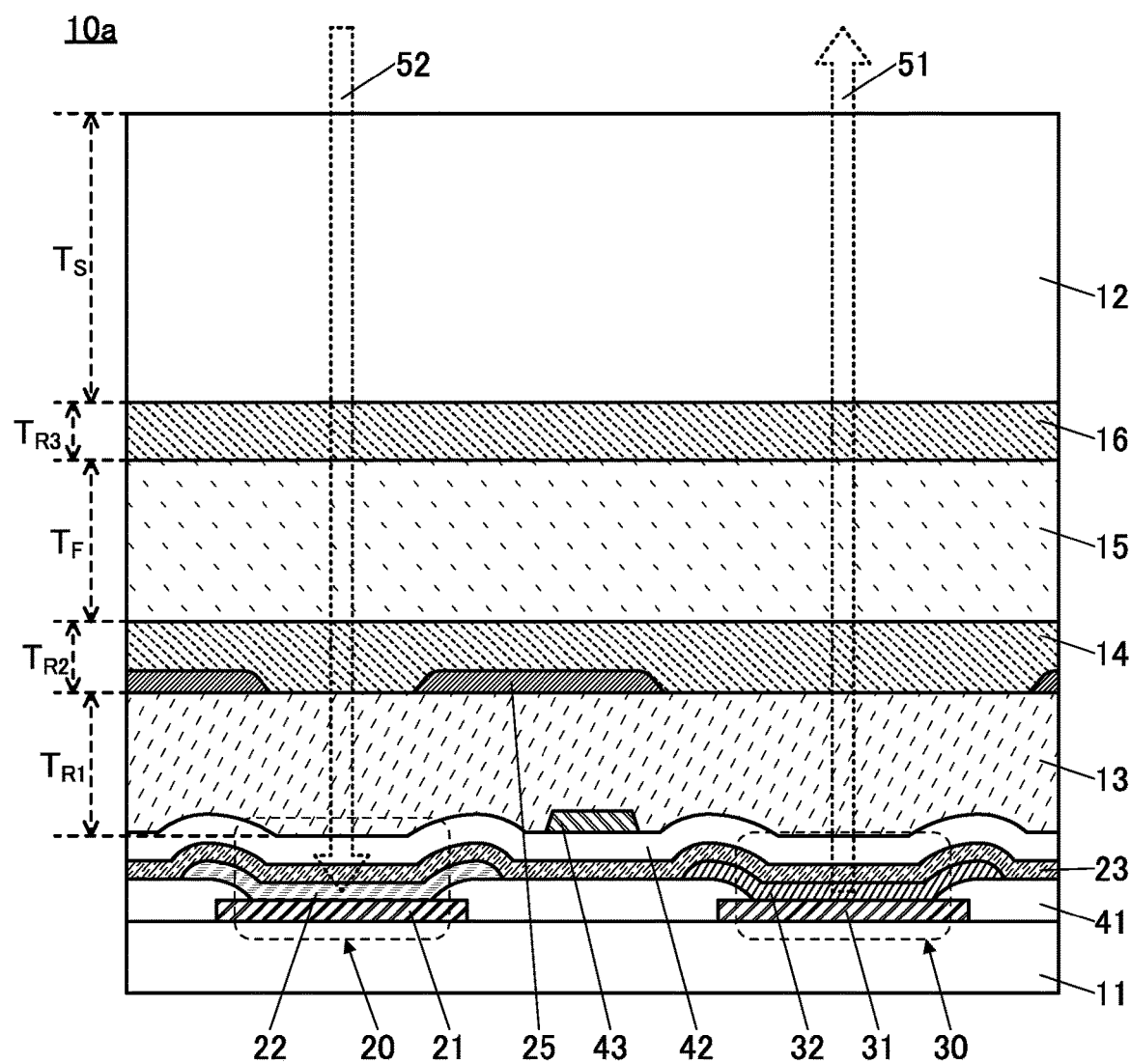
FIG. 4 is a diagram illustrating a structure example of a display device.

FIG. 4 illustrates a schematic cross-sectional view of a display device 10a. The display device 10a differs from the display device 10 illustrated in FIG. 1 mainly in including a functional layer 15, a protective layer 42, a conductive layer 43, a resin layer 16, and the like.

The functional layer 15 is provided between the resin layer 14 and the substrate 12. The resin layer 16 is provided between the functional layer 15 and the substrate 12 and has a function of bonding them. The resin layer 14 has a function of bonding the resin layer 13 and the functional layer 15.

As the functional layer 15, for example, an optical member such as a polarizing plate (including a circularly polarizing plate), a condensing film, or a microlens array can be used. When a circularly polarizing plate is provided as the functional layer 15, reflection of external light during display can be inhibited and the display quality can be improved. Alternatively, when a microlens array including a micro lens overlapping with the light-receiving element 20 is used as the functional layer 15, the imaging range of one light-receiving element 20 can be effectively narrowed and the thickness of the substrate 12 can be further increased, or a clear image of an object can be captured even when the object is far away from the surface of the substrate 12.

Alternatively, a touch sensor panel may be used as the functional layer 15. A touch sensor of any of various types such as a resistive type, a capacitive type, an infrared ray type, an electromagnetic induction type, and a surface acoustic wave type can be used as a touch sensor provided in the touch sensor panel. As the touch sensor, a capacitive touch sensor is particularly preferable.

The functional layer 15 may have both a function of the optical member and a function of a touch sensor panel. Alternatively, a stack body in which a layer functioning as an optical member and a layer functioning as a touch sensor panel are stacked may be used as the functional layer 15.

The functional layer 15 preferably includes a resin layer including a resin.

The thickness of the functional layer 15 is referred to as a thickness $T_F$. In the case where a resin layer is provided as the functional layer 15, the thickness of the resin layer can be regarded as the thickness $T_F$ of the functional layer 15. The thickness $T_F$ of the functional layer 15 is preferably smaller than the thickness $T_S$ of the substrate 12. Furthermore, the thickness $T_F$ of the functional layer 15 is preferably larger than the thickness $T_{R1}$ of the resin layer 13 and the thickness $T_{R2}$ of the resin layer 14.

The refractive index of the functional layer 15 with respect to the wavelength of the light 51 emitted by the light-emitting element 30 is referred to as $n_F$. The refractive index $n_F$ of the functional layer 15 is preferably lower than the refractive index $n_S$ of the substrate 12.

The thickness of the resin layer 16 is referred to as $T_{R3}$, and the refractive index of the resin layer 16 is referred to as $n_{R3}$. The thickness $T_{R3}$ of the resin layer 16 is preferably smaller than the thickness $T_S$ of the substrate 12 and the thickness $T_F$ of the functional layer 15. The thickness $T_{R3}$ of the resin layer 16 is preferably smaller than the thickness $T_{R1}$ of the resin layer 13. The refractive index $n_{R3}$ of the resin layer 16 is preferably lower than the refractive index $n_S$ of the substrate 12.

The protective layer 42 is provided to cover the conductive layer 23. The protective layer 42 has a function of inhibiting diffusion of impurities such as water from the resin layer 13 and the like into the light-receiving element 20 and the light-emitting element 30. The protective layer 42 preferably includes at least an inorganic insulator. Thus, diffusion of impurities such as water can be favorably inhibited, so that the reliability can be improved. The protective layer 42 can have a single-layer structure of an inorganic insulating film or a stacked-layer structure of an organic insulating film and an inorganic insulating film.

In the case where an inorganic insulating film is used as the protective layer 42, the protective layer 42 is likely to have a higher refractive index than the resin layer 13. Therefore, it is preferable that the protective layer 42 be thinner than at least the resin layer 13. Thus, when the protective layer 42 is provided, a reduction in the amount of light incident on the light-receiving element 20 can be favorably inhibited.

The conductive layer 43 is provided over the protective layer 42. The conductive layer 43 can function as a wiring or an electrode of a touch sensor, for example. The conductive layer 43 is preferably provided in a region overlapping with the light-blocking layer 25. Accordingly, light reflected at the surface of the conductive layer 43 can be inhibited from being incident on the light-receiving element 20, so that noise of an image to be captured can be reduced.

It is preferable that the conductive layer 43 be thinner than the resin layer 13. Thus, the planarity of the top surface of the resin layer 13 can be improved, and thus the thicknesses of the resin layer 14 and the like positioned over the light-receiving element 20 can be made uniform in the display region, so that a clear image can be captured.

Note that application of the conductive layer 43 is not limited to that for a wiring of a touch sensor. For example, the conductive layer 43 can be used as an electrode of a capacitor, a transistor, a display element, a sensor element, or the like, a wiring electrically connected to them, or the like.

Structure Example 2-2

Figure 5:
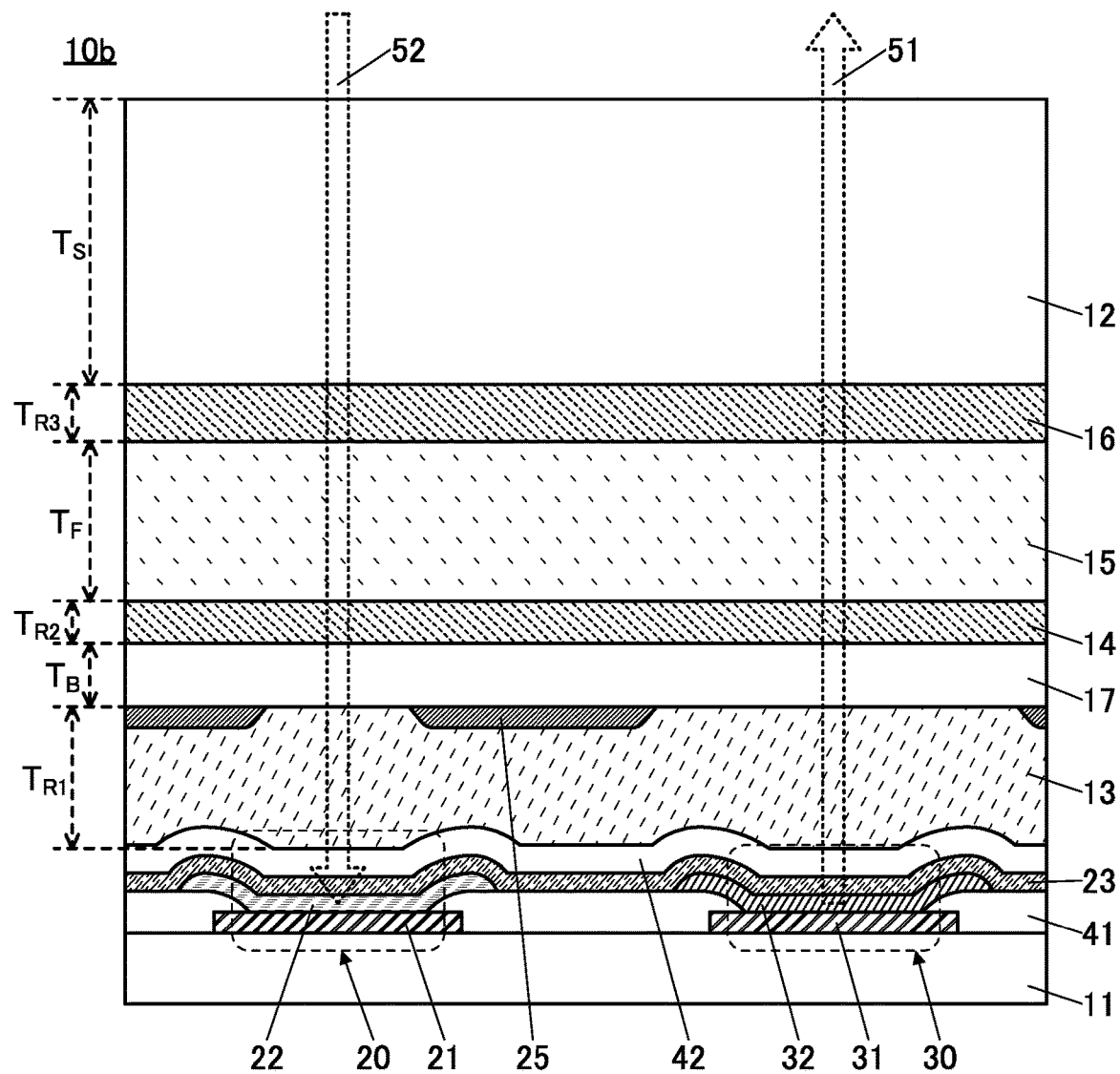
FIG. 5 is a diagram illustrating a structure example of a display device.

FIG. 5 illustrates a schematic cross-sectional view of a display device 10b. The display device 10b differs from the display device 10a mainly in including a protective layer 17, in having another structure of the light-blocking layer 25, and in not including the conductive layer 43.

The protective layer 17 is provided between the resin layer 13 and the resin layer 14. The protective layer 17 has a function of inhibiting impurities such as water from diffusing from the resin layer 14 and the like to the resin layer 13 side.

An inorganic insulating film can be used as the protective layer 17. Alternatively, a sheet-like or plate-like member including a resin or an inorganic insulator may be used as the protective layer 17. When a sheet-like or plate-like member is used as the protective layer 17, the protective layer 17 can function as a counter substrate that is provided to face the substrate 11.

The light-blocking layer 25 is provided on a surface of the protective layer 17 on the substrate 11 side. The resin layer 13 functions as an adhesive layer that bonds the substrate 11 (specifically, the top surface of the protective layer 42) and the protective layer 17.

The thickness of the protective layer 17 is referred to as $T_B$. Furthermore, the refractive index of the protective layer 17 is referred to as $n_B$. The thickness $T_B$ of the protective layer 17 is preferably smaller than the thickness $T_S$ of the substrate 12. The refractive index $n_B$ of the protective layer 17 is preferably lower than the refractive index $n_S$ of the substrate 12.

In the display device 10b, the functional layer 15 preferably functions as a touch sensor panel. The functional layer 15 functioning as a touch sensor panel will be described below.

Figure 6A:
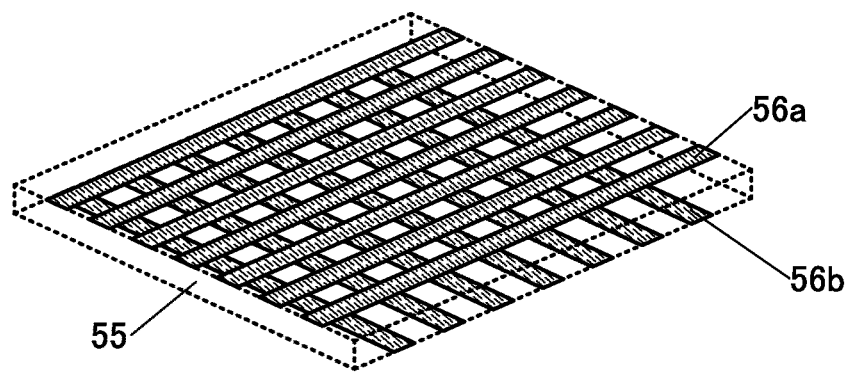
FIG. 6A to FIG. 6E are diagrams illustrating structure examples of a touch sensor panel.

FIG. 6A is a perspective view illustrating part of the functional layer 15 functioning as a touch sensor panel. The functional layer 15 includes a resin layer 55, a plurality of conductive layers 56a, and a plurality of conductive layers 56b. In FIG. 6A, the resin layer 55 is denoted by dashed lines.

The conductive layers 56a each have a belt-like shape extending in one direction. The conductive layers 56b each have a belt-like shape extending in a direction such that the conductive layers 56b intersects the conductive layers 56a. The plurality of conductive layers 56a and the plurality of conductive layers 56b are arranged at regular intervals.

For example, in the case of a capacitive-type mutual capacitive touch sensor, a pulse signal is supplied to one of the conductive layers 56a and the conductive layer 56b, and an amplifier circuit or the like is connected to the other thereof.

Figure 6B:
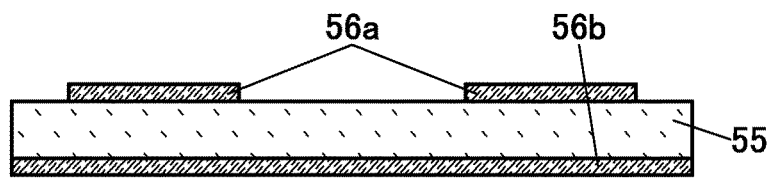

FIG. 6B is a schematic cross-sectional view of the functional layer 15. The conductive layers 56a are provided side by side on one surface of the resin layer 55. The conductive layers 56b are provided on the other surface of the resin layer 55.

A light-transmitting conductive film is preferably used for the conductive layers 56a and the conductive layers 56b. For example, a metal oxide can be used.

Alternatively, a metal film processed into a mesh-like shape may be used for the conductive layers 56a and the conductive layers 56b. In this case, the light-receiving elements 20, the light-emitting elements 30, and the like are preferably provided so as to be positioned in openings of the mesh in a plan view. In addition, the metal film and the light-blocking layer 25 may be combined with each other.

Thus, the distance between the light-blocking layer and the light-receiving element 20 can be longer, whereby the imaging range of one light-receiving element 20 can be further narrowed, and a clear image can be captured.

Figure 6C:
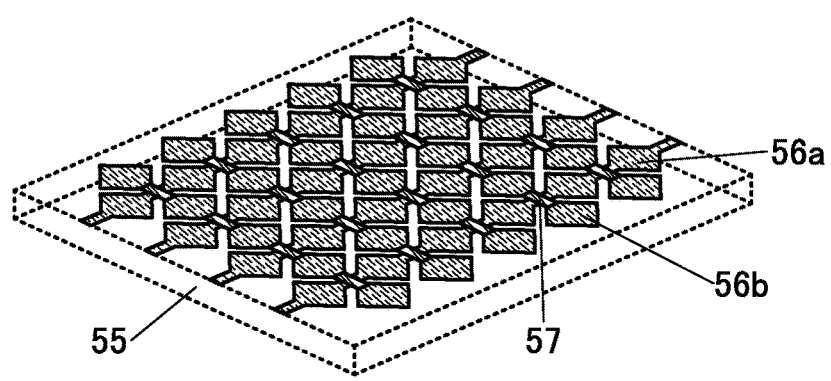

FIG. 6C is a perspective view of the functional layer 15 having a structure different from the above. The functional layer 15 illustrated in FIG. 6C includes the resin layer 55, the conductive layers 56a, the conductive layers 56b, conductive layers 57, and the like.

The conductive layers 56a and the conductive layers 56b are provided on the same surface. The conductive layers 56a and the conductive layers 56b are preferably formed by processing the same conductive film.

The conductive layer 56a includes a plurality of portions each having a rhombus top surface shape, and portions connecting them. Meanwhile, the conductive layer 56b has an island shape having a rhombus top surface shape. Two adjacent conductive layers 56b are electrically connected with the conductive layer 57.

Figure 6D:
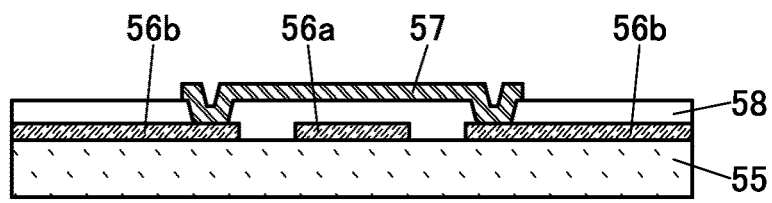

FIG. 6D illustrates an example of a cross section of the functional layer 15 illustrated in FIG. 6C.

The conductive layer 56a and the conductive layers 56b are provided over the resin layer 55. In FIG. 6D, a pair of conductive layers 56b between which the conductive layer 56a is sandwiched is illustrated. An insulating layer 58 is provided to cover the conductive layer 56a and the conductive layer 56b, and the conductive layer 57 is provided over the insulating layer 58. The conductive layer 57 is electrically connected to the conductive layers 56b in two opening portions provided in the insulating layer 58. Thus, the pair of conductive layers 56b is electrically connected through the conductive layer 57.

Figure 6E:
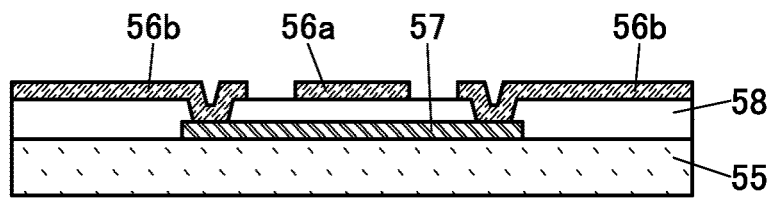

FIG. 6E illustrates an example in the case where the conductive layer 57 is positioned closer to the resin layer 55 side than the insulating layer 58. The conductive layer 57 is provided over the resin layer 55, and the insulating layer 58 is provided to cover the conductive layer 57. Furthermore, the conductive layer 56a and the conductive layers 56b are provided over the insulating layer 58. The pair of conductive layers 56b is electrically connected to the conductive layer 57 in opening portions provided in the insulating layer 58.

The above is the description of the functional layer 15 functioning as a touch sensor panel.

The display device described in this embodiment has high mechanical strength and a function of capturing a clear image. For example, when the display device is applied to a display portion (screen) of an electronic device such as a smartphone, a tablet terminal, or a watch-type terminal, the electronic device can be a highly convenient multifunctional electronic device in which the screen is less likely to be broken.

At least part of the configuration examples, the drawings corresponding thereto, and the like shown in this embodiment as an example can be implemented in combination with the other configuration examples, the other drawings, and the like as appropriate.

At least part of this embodiment can be implemented in combination with the other embodiments described in this specification as appropriate.

Embodiment 2

In this embodiment, a display device of one embodiment of the present invention will be described.

A display portion of the display device of one embodiment of the present invention includes light-receiving elements (also referred to as light-receiving devices) and light-emitting elements (also referred to as light-emitting devices). The display portion has a function of displaying an image with the use of the light-emitting elements. Furthermore, the display portion has one or both of a function of capturing an image with the use of the light-receiving elements and a sensing function.

Alternatively, the display device of one embodiment of the present invention may have a structure including light-emitting and light-receiving elements (also referred to as light-emitting and light-receiving devices) and light-emitting elements.

First, a display device including light-receiving elements and light-emitting elements is described.

The description in Embodiment 1 can be referred to for the light-receiving elements and the light-emitting elements.

When the light-receiving elements are used as an image sensor, the display device can capture an image using the light-receiving elements. For example, the display device can be used as a scanner.

An electronic device including the display device of one embodiment of the present invention can acquire data related to biological information such as a fingerprint or a palm print by using a function of an image sensor. That is, a biometric authentication sensor can be incorporated in the display device. When the display device incorporates a biometric authentication sensor, the number of components of an electronic device can be reduced as compared to the case where a biometric authentication sensor is provided separately from the display device; thus, the size and weight of the electronic device can be reduced.

When the light-receiving elements are used as the touch sensor, the display device can detect touch operation of an object with the use of the light-receiving elements.

In one embodiment of the present invention, organic EL elements (also referred to as organic EL devices) are used as the light-emitting elements, and organic photodiodes are used as the light-receiving elements. The organic EL elements and the organic photodiodes can be formed over one substrate. Thus, the organic photodiodes can be incorporated in the display device including the organic EL elements.

In the case where all the layers of the organic EL elements and the organic photodiodes are formed separately, the number of deposition steps becomes extremely large. However, a large number of layers of the organic photodiodes can have a structure in common with the organic EL elements; thus, concurrently depositing the layers that can have a common structure can inhibit an increase in the number of deposition steps.

For example, one of a pair of electrodes (a common electrode) can be a layer shared by the light-receiving element and the light-emitting element. For example, at least one of a hole-injection layer, a hole-transport layer, an electron-transport layer, and an electron-injection layer is preferably a layer shared by the light-receiving element and the light-emitting element. As another example, the light-receiving element and the light-emitting element can have the same structure except that the light-receiving element includes an active layer and the light-emitting element includes a light-emitting layer. In other words, the light-receiving element can be manufactured by only replacing the light-emitting layer of the light-emitting element with an active layer. When the light-receiving element and the light-emitting element include common layers in such a manner, the number of deposition steps and the number of masks can be reduced, whereby the number of manufacturing steps and the manufacturing cost of the display device can be reduced. Furthermore, the display device including the light-receiving element can be manufactured using an existing manufacturing apparatus and an existing manufacturing method for the display device.

Note that a layer shared by the light-receiving element and the light-emitting element might have functions different in the light-receiving element and the light-emitting element. In this specification, the name of a component is based on its function in the light-emitting element. For example, a hole-injection layer functions as a hole-injection layer in the light-emitting element and functions as a hole-transport layer in the light-receiving element. Similarly, an electron-injection layer functions as an electron-injection layer in the light-emitting element and functions as an electron-transport layer in the light-receiving element. A layer shared by the light-receiving element and the light-emitting element may have the same functions in the light-receiving element and the light-emitting element. A hole-transport layer functions as a hole-transport layer in both of the light-emitting element and the light-receiving element, and an electron-transport layer functions as an electron-transport layer in both of the light-emitting element and the light-receiving element.

Next, a display device including light-emitting and light-receiving elements and light-emitting elements is described. Note that functions, behavior, effects, and the like similar to those in the above are not be described in some cases.

In the display device of one embodiment of the present invention, a subpixel exhibiting any color includes a light-emitting and light-receiving element instead of a light-emitting element, and subpixels exhibiting the other colors each include a light-emitting element. The light-emitting and light-receiving element has both a function of emitting light (a light-emitting function) and a function of receiving light (a light-receiving function). For example, in the case where a pixel includes three subpixels of a red subpixel, a green subpixel, and a blue subpixel, at least one of the subpixels includes a light-emitting and light-receiving element, and the other subpixels each include a light-emitting element. Thus, the display portion of the display device of one embodiment of the present invention has a function of displaying an image using both light-emitting and light-receiving elements and light-emitting elements.

The light-emitting and light-receiving element functions as both a light-emitting element and a light-receiving element, whereby the pixel can have a light-receiving function without an increase in the number of subpixels included in the pixel. Thus, the display portion of the display device can be provided with one or both of an image capturing function and a sensing function while keeping the aperture ratio of the pixel (aperture ratio of each subpixel) and the resolution of the display device. Accordingly, in the display device of one embodiment of the present invention, the aperture ratio of the pixel can be more increased and the resolution can be increased more easily than in a display device provided with a subpixel including a light-receiving element separately from a subpixel including a light-emitting element.

In the display portion of the display device of one embodiment of the present invention, the light-emitting and light-receiving elements and the light-emitting elements are arranged in a matrix, and an image can be displayed on the display portion. The display portion can be used as an image sensor, a touch sensor, or the like. In the display device of one embodiment of the present invention, the light-emitting elements can be used as a light source of the sensor. Thus, image capturing, touch operation sensing, or the like is possible even in a dark place.

The light-emitting and light-receiving element can be manufactured by combining an organic EL element and an organic photodiode. For example, by adding an active layer of an organic photodiode to a layered structure of an organic EL element, the light-emitting and light-receiving element can be manufactured. Furthermore, in the light-emitting and light-receiving element formed of a combination of an organic EL element and an organic photodiode, concurrently depositing layers that can be shared with the organic EL element can inhibit an increase in the number of deposition steps.

For example, one of a pair of electrodes (a common electrode) can be a layer shared by the light-emitting and light-receiving element and the light-emitting element. For example, at least one of a hole-injection layer, a hole-transport layer, an electron-transport layer, and an electron-injection layer is preferably a layer shared by the light-emitting and light-receiving element and the light-emitting element. As another example, the light-emitting and light-receiving element and the light-emitting element can have the same structure except for the presence or absence of an active layer of the light-receiving element. That is, the light-emitting and light-receiving element can be manufactured by only adding the active layer of the light-receiving element to the light-emitting element. When the light-emitting and light-receiving element and the light-emitting element include common layers in such a manner, the number of deposition steps and the number of masks can be reduced, whereby the number of manufacturing steps and the manufacturing cost of the display device can be reduced. Furthermore, the display device including the light-emitting and light-receiving element can be manufactured using an existing manufacturing apparatus and an existing manufacturing method for the display device.

Note that a layer included in the light-emitting and light-receiving element may have a different function between the case where the light-emitting and light-receiving element function as a light-receiving element and the case where the light-emitting and light-receiving element function as a light-emitting element. In this specification, the name of a component is based on its function in the case where the light-emitting and light-receiving element functions as a light-emitting element.

The display device of this embodiment has a function of displaying an image with the use of the light-emitting elements and the light-emitting and light-receiving elements. That is, the light-emitting elements and the light-emitting and light-receiving elements function as display elements.

The display device of this embodiment has a function of detecting light with the use of the light-emitting and light-receiving elements. The light-emitting and light-receiving element can detect light having a shorter wavelength than light emitted by the light-emitting and light-receiving element itself.

When the light-emitting and light-receiving elements are used as an image sensor, the display device of this embodiment can capture an image using the light-emitting and light-receiving elements. When the light-emitting and light-receiving elements are used as the touch sensor, the display device of this embodiment can detect touch operation of an object with the use of the light-emitting and light-receiving elements.

The light-emitting and light-receiving element functions as a photoelectric conversion element. The light-emitting and light-receiving element can be manufactured by adding an active layer of the light-receiving element to the above-described structure of the light-emitting element. For the light-emitting and light-receiving element, an active layer of a pn photodiode or a pin photodiode can be used, for example.

It is particularly preferable to use, for the light-emitting and light-receiving element, an active layer of an organic photodiode including a layer containing an organic compound. An organic photodiode, which is easily made thin, lightweight, and large in area and has a high degree of freedom for shape and design, can be used in a variety of display devices.

The display device of one embodiment of the present invention is specifically described below with reference to drawings.

Structure Example 1 of Display Device

Structure Example 1-1

Figure 7A:
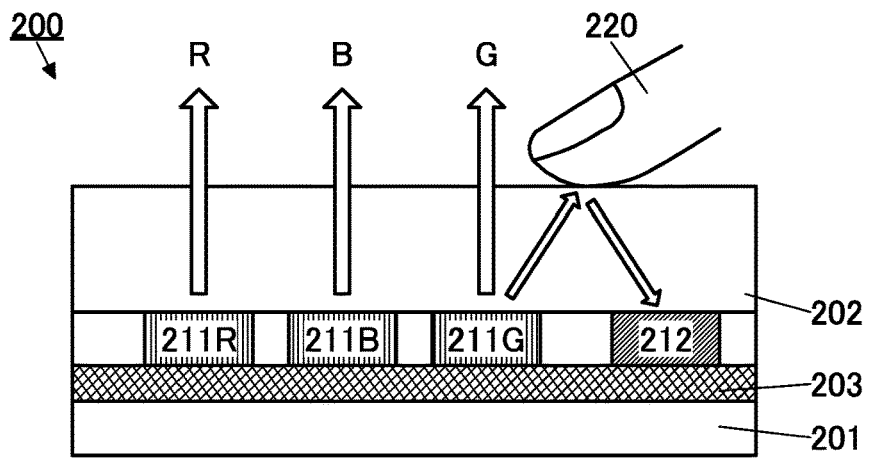
FIG. 7A, FIG. 7B, and FIG. 7D are cross-sectional views illustrating structure examples of a display device.

FIG. 7A is a schematic view of a display panel 200. The display panel 200 includes a substrate 201, a substrate 202, a light-receiving element 212, a light-emitting element 211R, a light-emitting element 211G, a light-emitting element 211B, a functional layer 203, and the like.

The light-emitting element 211R, the light-emitting element 211G, the light-emitting element 211B, the light-receiving element 212 are provided between the substrate 201 and the substrate 202. The light-emitting element 211R, the light-emitting element 211G, and the light-emitting element 211B emit red (R) light, green (G) light, and blue (B) light, respectively. Note that in the following description, the term "light-emitting element 211" may be used when the light-emitting element 211R, the light-emitting element 211G, and the light-emitting element 211B are not distinguished from each other.

The display panel 200 includes a plurality of pixels arranged in a matrix. One pixel includes one or more subpixels. One subpixel includes one light-emitting element. For example, the pixel can have a structure including three subpixels (e.g., three colors of R, G, and B or three colors of yellow (Y), cyan (C), and magenta (M)) or four subpixels (e.g., four colors of R, G, B, and white (W) or four colors of R, G, B, and Y). The pixel further includes the light-receiving element 212. The light-receiving element 212 may be provided in all the pixels or may be provided in some of the pixels. In addition, one pixel may include a plurality of light-receiving elements 212.

FIG. 7A illustrates a finger 220 touching a surface of the substrate 202. Part of light emitted by the light-emitting element 211G is reflected at a contact portion of the substrate 202 and the finger 220. In the case where part of the reflected light is incident on the light-receiving element 212, the contact of the finger 220 with the substrate 202 can be detected. That is, the display panel 200 can function as a touch panel.

The functional layer 203 includes a circuit for driving the light-emitting element 211R, the light-emitting element 211G, and the light-emitting element 211B and a circuit for driving the light-receiving element 212. The functional layer 203 is provided with a switch, a transistor, a capacitor, a wiring, and the like. Note that in the case where the light-emitting element 211R, the light-emitting element 211G, the light-emitting element 211B, and the light-receiving element 212 are driven by a passive-matrix method, a structure not provided with a switch, a transistor, or the like may be employed.

Figure 7B:
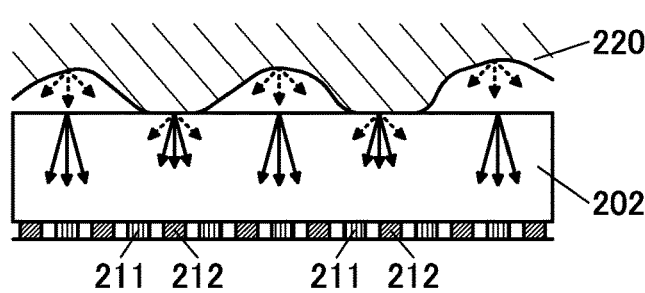

The display panel 200 preferably has a function of detecting a fingerprint of the finger 220. FIG. 7B schematically illustrates an enlarged view of the contact portion in a state where the finger 220 touches the substrate 202. FIG. 7B illustrates light-emitting elements 211 and the light-receiving elements 212 that are alternately arranged.

The fingerprint of the finger 220 is formed of depressions and projections. Therefore, as illustrated in FIG. 7B, the projections of the fingerprint touch the substrate 202.

Reflection of light from a surface or an interface is categorized into regular reflection and diffuse reflection. Regularly reflected light is highly directional light with an angle of reflection equal to the angle of incidence. Diffusely reflected light has low directionality and low angular dependence of intensity. As for regular reflection and diffuse reflection, diffuse reflection components are dominant in the light reflected from the surface of the finger 220. Meanwhile, regular reflection components are dominant in the light reflected from the interface between the substrate 202 and the air.

The intensity of light that is reflected from contact surfaces or non-contact surfaces between the finger 220 and the substrate 202 and is incident on the light-receiving elements 212 positioned directly below the contact surfaces or the non-contact surfaces is the sum of intensities of regularly reflected light and diffusely reflected light. As described above, regularly reflected light (indicated by solid arrows) is dominant near the depressions of the finger 220, where the finger 220 is not in contact with the substrate 202; whereas diffusely reflected light (indicated by dashed arrows) from the finger 220 is dominant near the projections of the finger 220, where the finger 220 is in contact with the substrate 202. Thus, the intensity of light received by the light-receiving element 212 positioned directly below the depression is higher than the intensity of light received by the light-receiving element 212 positioned directly below the projection. Accordingly, a fingerprint image of the finger 220 can be captured.

In the case where an arrangement interval between the light-receiving elements 212 is smaller than a distance between two projections of a fingerprint, preferably a distance between a depression and a projection adjacent to each other, a clear fingerprint image can be obtained. The distance between a depression and a projection of a human's fingerprint is generally within a range from 150 µm to 250 µm; thus, the arrangement interval between the light-receiving elements 212 is, for example, less than or equal to 400 µm, preferably less than or equal to 200 µm, further preferably less than or equal to 150 µm, still further preferably less than or equal to 120 µm, yet still further preferably less than or equal to 100 µm, even yet still further preferably less than or equal to 50 µm. The arrangement interval is preferably as small as possible, and can be greater than or equal to 1 µm, greater than or equal to 10 µm, or greater than or equal to 20 µm, for example.

Figure 7C:
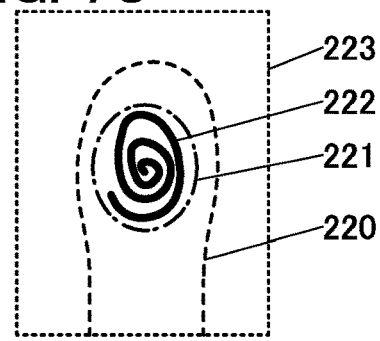
FIG. 7C and FIG. 7E are diagrams illustrating examples of an image captured by the display device.

FIG. 7C illustrates an example of a fingerprint image captured by the display panel 200. In an image-capturing range 223 in FIG. 7C, the outline of the finger 220 is indicated by a dashed line and the outline of a contact portion 221 is indicated by a dashed-dotted line. In the contact portion 221, a high-contrast image of a fingerprint 222 can be captured owing to a difference in the amount of light incident on the light-receiving elements 212.

Figure 7D:
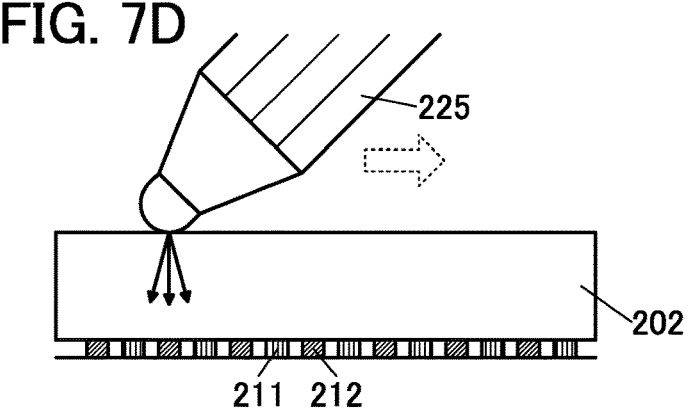

The display panel 200 can also function as a touch panel or a pen tablet, for example. FIG. 7D illustrates a state where a tip of a stylus 225 slides in a direction indicated with a dashed arrow while the tip of the stylus 225 touches the substrate 202.

As illustrated in FIG. 7D, when diffusely reflected light that is diffused at the contact surface of the tip of the stylus 225 and the substrate 202 is incident on the light-receiving element 212 that overlaps with the contact surface, the position of the tip of the stylus 225 can be detected with high accuracy.

Figure 7E:
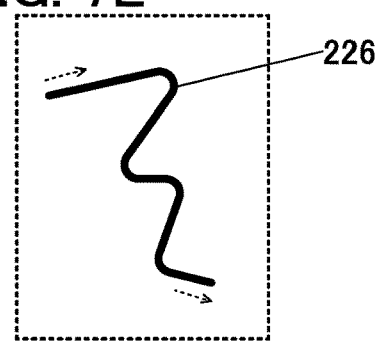

FIG. 7E illustrates an example of a path 226 of the stylus 225 that is detected by the display panel 200. The display panel 200 can detect the position of a detection target, such as the stylus 225, with high position accuracy, so that high-definition drawing can be performed using a drawing application or the like. Unlike the case of using a capacitive touch sensor, an electromagnetic induction touch pen, or the like, the display panel 200 can detect even the position of a highly insulating object to be detected, the material of a tip portion of the stylus 225 is not limited, and a variety of writing materials (e.g., a brush, a glass pen, a quill pen, and the like) can be used.

Figure 7F:
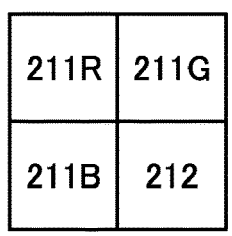
FIG. 7F to FIG. 7H are top views illustrating examples of a pixel.
Figure 7G:
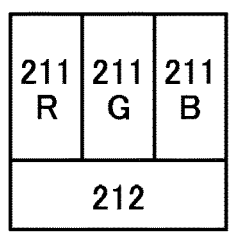
Figure 7H:
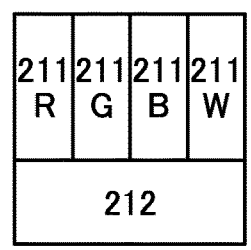

Here, FIG. 7F to FIG. 7H illustrate examples of a pixel that can be used in the display panel 200.

The pixels illustrated in FIG. 7F and FIG. 7G each include the light-emitting element 211R for red (R), the light-emitting element 211G for green (G), the light-emitting element 211B for blue (B), and the light-receiving element 212. The pixels each include a pixel circuit for driving the light-emitting element 211R, the light-emitting element 211G, the light-emitting element 211B, and the light-receiving element 212.

FIG. 7F illustrates an example in which three light-emitting elements and one light-receiving element are provided in a matrix of 2×2. FIG. 7G illustrates an example in which three light-emitting elements are arranged in one line and one laterally long light-receiving element 212 is provided below the three light-emitting elements.

The pixel illustrated in FIG. 7H is an example including a light-emitting element 211W for white (W). Here, four light-emitting elements are arranged in one line and the light-receiving element 212 is provided below the four light-emitting elements.

Note that the pixel structure is not limited to the above structure, and a variety of arrangement methods can be employed.

Structure Example 1-2

An example of a structure including light-emitting elements emitting visible light, a light-emitting element emitting infrared light, and a light-receiving element is described below.

Figure 8A:
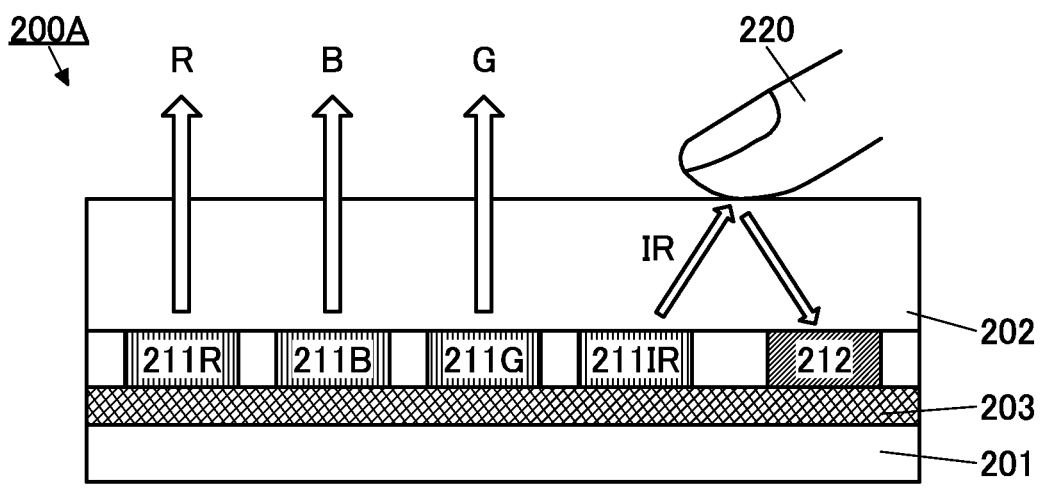
FIG. 8A is a cross-sectional view illustrating a structure example of a display device.

A display panel 200A illustrated in FIG. 8A includes a light-emitting element 211IR in addition to the components illustrated in FIG. 7A as an example. The light-emitting element 211IR is a light-emitting element emitting infrared light IR. Moreover, in that case, an element capable of receiving at least the infrared light IR emitted by the light-emitting element 211IR is preferably used as the light-receiving element 212. As the light-receiving element 212, an element capable of receiving visible light and infrared light is further preferably used.

As illustrated in FIG. 8A, when the finger 220 touches the substrate 202, the infrared light IR emitted from the light-emitting element 211IR is reflected by the finger 220 and part of reflected light is incident on the light-receiving element 212, so that the positional information of the finger 220 can be obtained.

Figure 8B:
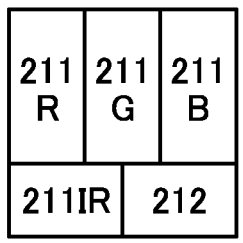
FIG. 8B to FIG. 8D are top views illustrating examples of a pixel.
Figure 8C:
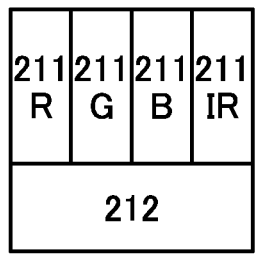
Figure 8D:
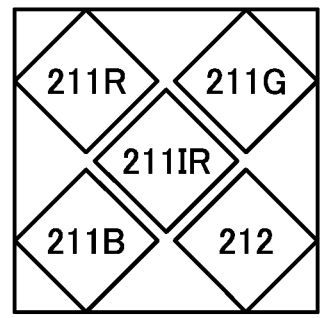

FIG. 8B to FIG. 8D illustrate examples of a pixel that can be used in the display panel 200A.

FIG. 8B illustrates an example in which three light-emitting elements are arranged in one line and the light-emitting element 211IR and the light-receiving element 212 are arranged below the three light-emitting elements in a horizontal direction. FIG. 8C illustrates an example in which four light-emitting elements including the light-emitting element 211IR are arranged in one line and the light-receiving element 212 is provided below the four light-emitting elements.

FIG. 8D shows an example in which three light-emitting elements and the light-receiving element 212 are arranged in all directions with the light-emitting element 211IR as the center.

Note that in the pixels illustrated in FIG. 8B to FIG. 8D, the positions of the light-emitting elements can be interchangeable, or the positions of the light-emitting element and the light-receiving element can be interchangeable.

Structure Example 1-3

An example of a structure including a light-emitting element emitting visible light and a light-receiving and light-emitting element emitting and receiving visible light is described below.

Figure 9A:
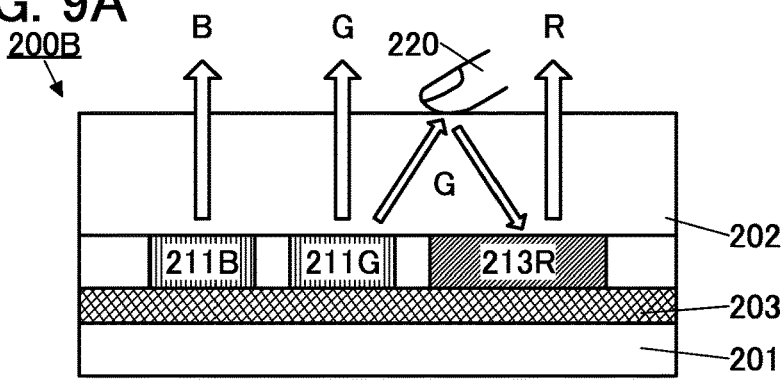
FIG. 9A is a cross-sectional view illustrating a structure example of a display device.

A display panel 200B illustrated in FIG. 9A includes the light-emitting element 211B, the light-emitting element 211G, and a light-emitting and light-receiving element 213R. The light-emitting and light-receiving element 213R has a function of a light-emitting element that emits red (R) light, and a function of a photoelectric conversion element that receives visible light. FIG. 9A illustrates an example in which the light-emitting and light-receiving element 213R receives green (G) light emitted by the light-emitting element 211G. Note that the light-emitting and light-receiving element 213R may receive blue (B) light emitted by the light-emitting element 211B. Alternatively, the light-emitting and light-receiving element 213R may receive both green light and blue light.

For example, the light-emitting and light-receiving element 213R preferably receives light having a shorter wavelength than light emitted from itself. Alternatively, the light-emitting and light-receiving element 213R may receive light (e.g., infrared light) having a longer wavelength than light emitted from itself. The light-emitting and light-receiving element 213R may receive light having approximately the same wavelength as light emitted from itself; however, in that case, the light-emitting and light-receiving element 213R also receives light emitted from itself, whereby its emission efficiency might be decreased. Therefore, the peak of the emission spectrum and the peak of the absorption spectrum of the light-emitting and light-receiving element 213R preferably overlap as little as possible.

Here, light emitted by the light-emitting and light-receiving element is not limited to red light. Furthermore, the light emitted by the light-emitting elements is not limited to the combination of green light and blue light. For example, the light-emitting and light-receiving element can be an element that emits green or blue light and receives light having a different wavelength from light emitted from itself.

The light-emitting and light-receiving element 213R serves as both a light-emitting element and a light-receiving element as described above, whereby the number of elements provided in one pixel can be reduced. Thus, higher definition, a higher aperture ratio, higher resolution, and the like can be easily achieved.

FIG. 9B to FIG. 9I illustrate examples of a pixel that can be used in the display panel 200B.

Figure 9B:
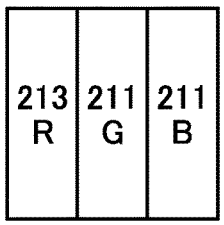
FIG. 9B to FIG. 9I are top views illustrating examples of a pixel.
Figure 9C:
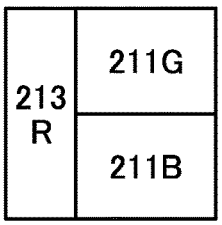

FIG. 9B illustrates an example in which the light-emitting and light-receiving element 213R, the light-emitting element 211G, and the light-emitting element 211B are arranged in one column. FIG. 9C illustrates an example in which the light-emitting element 211G and the light-emitting element 211B are alternately arranged in the vertical direction and the light-emitting and light-receiving element 213R is provided alongside the light-emitting elements.

Figure 9D:
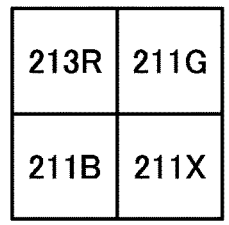

FIG. 9D illustrates an example in which three light-emitting elements (the light-emitting element 211G, the light-emitting element 211B, and a light-emitting element 211X) and one light-emitting and light-receiving element are arranged in matrix of 2×2. The light-emitting element 211X is an element that emits light of a color other than R, G, and B. The light of a color other than R, G, and B can be white (W) light, yellow (Y) light, cyan (C) light, magenta (M) light, infrared light (IR), ultraviolet light (UV), or the like. In the case where the light-emitting element 211X emits infrared light, the light-emitting and light-receiving element preferably has a function of detecting infrared light or a function of detecting both visible light and infrared light. The wavelength of light detected by the light-emitting and light-receiving element can be determined depending on the application of a sensor.

Figure 9E:
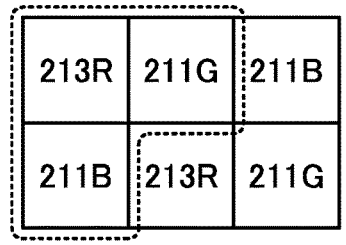

FIG. 9E illustrates two pixels. A region that includes three elements and is enclosed by a dotted line corresponds to one pixel. Each of the pixels includes the light-emitting element 211G, the light-emitting element 211B, and the light-emitting and light-receiving element 213R. In the left pixel in FIG. 9E, the light-emitting element 211G is provided in the same row as the light-emitting and light-receiving element 213R, and the light-emitting element 211B is provided in the same column as the light-emitting and light-receiving element 213R. In the right pixel in FIG. 9E, the light-emitting element 211G is provided in the same row as the light-emitting and light-receiving element 213R, and the light-emitting element 211B is provided in the same column as the light-emitting element 211G. In the pixel layout in FIG. 9E, the light-emitting and light-receiving element 213R, the light-emitting element 211G, and the light-emitting element 211B are repeatedly arranged in both the odd-numbered row and the even-numbered row, and in each column, the light-emitting elements or the light-emitting element and the light-emitting and the receiving elements arranged in the odd-numbered row and the even-numbered row emit light of different colors.

Figure 9F:
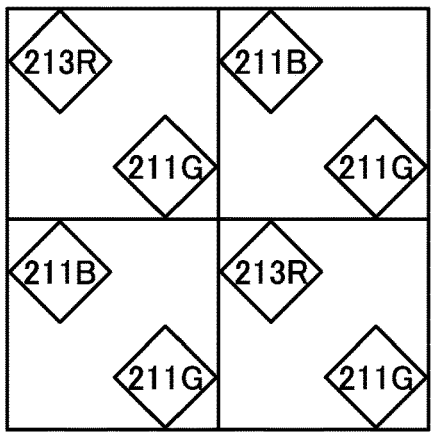

FIG. 9F illustrates four pixels which employ PenTile arrangement; adjacent two pixels have different combinations of light-emitting elements or light-receiving and light-emitting elements that emit light of two different colors. FIG. 9F illustrates the top-surface shapes of the light-emitting elements or light-emitting and light-receiving elements.

The upper left pixel and the lower right pixel in FIG. 9F each include the light-emitting and light-receiving element 213R and the light-emitting element 211G. The upper right pixel and the lower left pixel each include the light-emitting element 211G and the light-emitting element 211B. That is, in the example illustrated in FIG. 9F, the light-emitting element 211G is provided in each pixel.

The top surface shape of the light-emitting elements and the light-emitting and light-receiving elements is not particularly limited and can be a circular shape, an elliptical shape, a polygonal shape, a polygonal shape with rounded corners, or the like. FIG. 9F and the like illustrate examples in which the top surface shapes of the light-emitting elements and the light-emitting and light-receiving elements are each a square tilted at approximately 45° (a diamond shape). Note that the top surface shape of the light-emitting elements and the light-emitting and light-receiving elements may vary depending on the color thereof, or the light-emitting elements and the light-emitting and light-receiving elements of some colors or every color may have the same top surface shape.

The sizes of light-emitting regions (or light-emitting and light-receiving regions) of the light-emitting elements and the light-emitting and light-receiving elements may vary depending on the color thereof, or the light-emitting elements and the light-emitting and light-receiving elements of some colors or every color may have light-emitting regions of the same size. For example, in FIG. 9F, the light-emitting region of the light-emitting element 211G provided in each pixel may have a smaller area than the light-emitting region (or the light-emitting and light-receiving region) of the other elements.

Figure 9H:
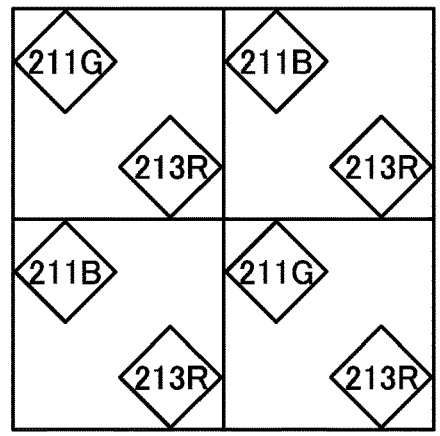
Figure 9G:
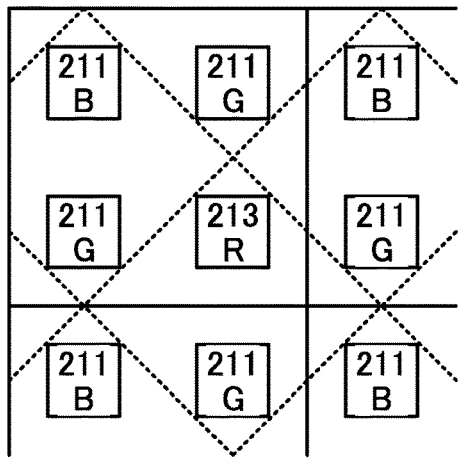

FIG. 9G is a modification example of the pixel arrangement of FIG. 9F. Specifically, the structure of FIG. 9G is obtained by rotating the structure of FIG. 9F by 45°. Although one pixel is regarded as including two elements in FIG. 9F, one pixel can be regarded as being formed of four elements as shown in FIG. 9G.

FIG. 9H is a modification example of the pixel arrangement of FIG. 9F. The upper left pixel and the lower right pixel in FIG. 9H each include the light-emitting and light-receiving element 213R and the light-emitting element 211G. The upper right pixel and the lower left pixel each include the light-emitting and light-receiving element 213R and the light-emitting element 211B. That is, in the example illustrated in FIG. 9H, the light-emitting and light-receiving element 213R is provided in each pixel. The structure illustrated in FIG. 9H achieves higher-resolution image capturing than the structure illustrated in FIG. 9F because of having the light-emitting and light-receiving element 213R in each pixel. Thus, the accuracy of biometric authentication can be increased, for example.

Figure 9I:
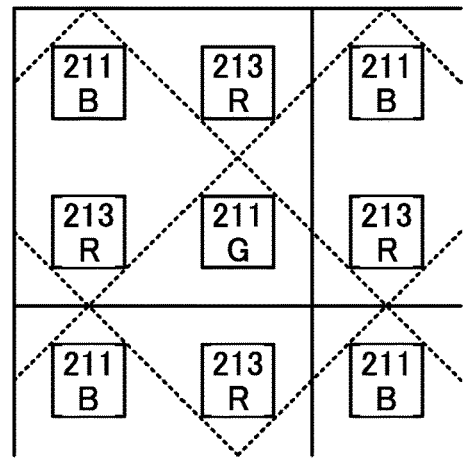

FIG. 9I shows a modification example of the pixel arrangement in FIG. 9H, obtained by rotating the pixel arrangement in FIG. 9H by 45°.

In FIG. 9I, one pixel is described as being formed of four elements (two light-emitting elements and two light-emitting and light-receiving elements). One pixel including a plurality of light-receiving and light-emitting elements having a light-receiving function allows high-resolution image capturing. Accordingly, the accuracy of biometric authentication can be increased. For example, the resolution of image capturing can be the square root of 2 times the resolution of display.

A display device that employs the structure shown in FIG. 9H or FIG. 9I includes p (p is an integer greater than or equal to 2) first light-emitting elements, q (q is an integer greater than or equal to 2) second light-emitting elements, and r (r is an integer greater than p and q) light-emitting and light-receiving elements. As for p and r, r=2p is satisfied. As for p, q, and r, r=p+q is satisfied. Either the first light-emitting elements or the second light-emitting elements emit green light, and the other light-emitting elements emit blue light. The light-emitting and light-receiving elements emit red light and have a light-receiving function.

In the case where touch operation is detected with the light-emitting and light-receiving elements, for example, it is preferable that light emitted from a light source be hard for a user to recognize. Since blue light has lower visibility than green light, light-emitting elements that emit blue light are preferably used as a light source. Accordingly, the light-emitting and light-receiving elements preferably have a function of receiving blue light. Note that without limitation to the above, light-emitting elements used as a light source can be selected as appropriate depending on the sensitivity of the light-emitting and light-receiving elements.

As described above, the display device of this embodiment can employ any of various types of pixel arrangements.

[Device Structure]

Next, detailed structures of the light-emitting element, the light-receiving element, and the light-emitting and light-receiving element which can be used in the display device of one embodiment of the present invention are described.

The display device of one embodiment of the present invention can have any of the following structures: a top-emission structure in which light is emitted in a direction opposite to the substrate where the light-emitting elements are formed, a bottom-emission structure in which light is emitted toward the substrate where the light-emitting elements are formed, and a dual-emission structure in which light is emitted toward both surfaces.

In this embodiment, a top-emission display device is described as an example.

In this specification and the like, unless otherwise specified, in describing a structure including a plurality of components (e.g., light-emitting elements or light-emitting layers), alphabets are not added when a common part for the components is described. For example, when a common part of a light-emitting layer 283R, a light-emitting layer 283G, and the like is described, the light-emitting layers are simply referred to as a light-emitting layer 283, in some cases.

Figure 10A:
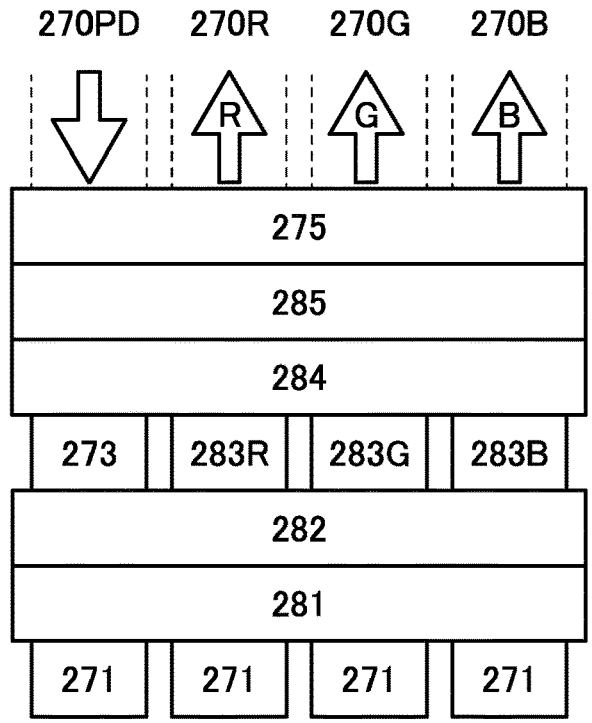
FIG. 10A and FIG. 10B are diagrams illustrating structure examples of a display device.

A display device 280A illustrated in FIG. 10A includes a light-receiving element 270PD, a light-emitting element 270R that emits red (R) light, a light-emitting element 270G that emits green (G) light, and a light-emitting element 270B that emits blue (B) light.

Each of the light-emitting elements includes a pixel electrode 271, a hole-injection layer 281, a hole-transport layer 282, a light-emitting layer, an electron-transport layer 284, an electron-injection layer 285, and a common electrode 275, which are stacked in this order. The light-emitting element 270R includes the light-emitting layer 283R, the light-emitting element 270G includes the light-emitting layer 283G, and the light-emitting element 270B includes a light-emitting layer 283B. The light-emitting layer 283R includes a light-emitting substance that emits red light, the light-emitting layer 283G includes a light-emitting substance that emits green light, and the light-emitting layer 283B includes a light-emitting substance that emits blue light.

The light-emitting elements are electroluminescent elements that emit light to the common electrode 275 side by voltage application between the pixel electrodes 271 and the common electrode 275.

The light-receiving element 270PD includes the pixel electrode 271, the hole-injection layer 281, the hole-transport layer 282, an active layer 273, the electron-transport layer 284, the electron-injection layer 285, and the common electrode 275, which are stacked in this order.

The light-receiving element 270PD is a photoelectric conversion element that receives light entering from the outside of the display device 280A and converts it into an electric signal.

In the description made in this embodiment, the pixel electrode 271 functions as an anode and the common electrode 275 functions as a cathode in both of the light-emitting element and the light-receiving element. In other words, when the light-receiving element is driven by application of reverse bias between the pixel electrode 271 and the common electrode 275, light incident on the light-receiving element can be detected and charge can be generated and extracted as current.

In the display device of this embodiment, an organic compound is used for the active layer 273 of the light-receiving element 270PD. In the light-receiving element 270PD, the layers other than the active layer 273 can have structures in common with the layers in the light-emitting elements. Therefore, the light-receiving element 270PD can be formed concurrently with the formation of the light-emitting elements only by adding a step of depositing the active layer 273 in the manufacturing process of the light-emitting elements. The light-emitting elements and the light-receiving element 270PD can be formed over one substrate. Accordingly, the light-receiving element 270PD can be incorporated into the display device without a significant increase in the number of manufacturing steps.

The display device 280A is an example in which the light-receiving element 270PD and the light-emitting elements have a common structure except that the active layer 273 of the light-receiving element 270PD and the light-emitting layers 283 of the light-emitting elements are separately formed. Note that the structures of the light-receiving element 270PD and the light-emitting elements are not limited thereto. The light-receiving element 270PD and the light-emitting elements may include separately formed layers other than the active layer 273 and the light-emitting layers 283. The light-receiving element 270PD and the light-emitting elements preferably include at least one layer used in common (common layer). Thus, the light-receiving element 270PD can be incorporated into the display device without a significant increase in the number of manufacturing steps.

A conductive film that transmits visible light is used as the electrode through which light is extracted, which is either the pixel electrode 271 or the common electrode 275. A conductive film that reflects visible light is preferably used as the electrode through which light is not extracted.

The light-emitting elements included in the display device of this embodiment preferably employs a micro optical resonator (microcavity) structure. Thus, one of the pair of electrodes of the light-emitting elements is preferably an electrode having properties of transmitting and reflecting visible light (a semi-transmissive and semi-reflective electrode), and the other is preferably an electrode having a property of reflecting visible light (a reflective electrode). When the light-emitting elements have a microcavity structure, light obtained from the light-emitting layers can be resonated between both of the electrodes, whereby light emitted from the light-emitting elements can be intensified.

Note that the semi-transmissive and semi-reflective electrode can have a stacked-layer structure of a reflective electrode and an electrode having a property of transmitting visible light (also referred to as a transparent electrode).

The transparent electrode has a light transmittance higher than or equal to 40%. For example, an electrode having a visible light (light with a wavelength greater than or equal to 400 nm and less than 750 nm) transmittance higher than or equal to 40% is preferably used in the light-emitting elements. The semi-transmissive and semi-reflective electrode has a visible light reflectance of higher than or equal to 10% and lower than or equal to 95%, preferably higher than or equal to 30% and lower than or equal to 80%. The reflective electrode has a visible light reflectance of higher than or equal to 40% and lower than or equal to 100%, preferably higher than or equal to 70% and lower than or equal to 100%. These electrodes preferably have a resistivity of $1\times10^{-2}$ Ωcm or lower. Note that in the case where any of the light-emitting elements emits near-infrared light (light with a wavelength greater than or equal to 750 nm and less than or equal to 1300 nm), the near-infrared light transmittance and reflectance of these electrodes preferably satisfy the above-described numerical ranges of the visible light transmittance and reflectance.

The light-emitting element includes at least the light-emitting layer 283. The light-emitting element may further include, as a layer other than the light-emitting layer 283, a layer containing a substance with a high hole-injection property, a substance with a high hole-transport property, a hole-blocking material, a substance with a high electron-transport property, a substance with a high electron-injection property, an electron-blocking material, a substance with a bipolar property (a substance with a high electron- and hole-transport property), or the like.

For example, the light-emitting elements and the light-receiving element can share at least one of the hole-injection layer, the hole-transport layer, the electron-transport layer, and the electron-injection layer. Furthermore, at least one of the hole-injection layer, the hole-transport layer, the electron-transport layer, and the electron-injection layer can be separately formed for the light-emitting elements and the light-receiving element.

The hole-injection layer is a layer injecting holes from an anode to the hole-transport layer, and a layer containing a material with a high hole-injection property. As the material with a high hole-injection property, it is possible to use, for example, a composite material containing a hole-transport material and an acceptor material (electron-accepting material) or an aromatic amine compound.

In the light-emitting element, the hole-transport layer is a layer transporting holes, which are injected from the anode by the hole-injection layer, to the light-emitting layer. In the light-receiving element, the hole-transport layer is a layer transporting holes, which are generated in the active layer on the basis of incident light, to the anode. The hole-transport layer is a layer containing a hole-transport material. As the hole-transport material, a substance having a hole mobility greater than or equal to $1\times10^{-6}$ cm$^2$/Vs is preferable. Note that other substances can also be used as long as they have a property of transporting more holes than electrons. As the hole-transport material, materials having a high hole-transport property, such as a π-electron rich heteroaromatic compound (e.g., a carbazole derivative, a thiophene derivative, and a furan derivative) and an aromatic amine (a compound having an aromatic amine skeleton), are preferable.

In the light-emitting element, the electron-transport layer is a layer transporting electrons, which are injected from the cathode by the electron-injection layer, to the light-emitting layer. In the light-receiving element, the electron-transport layer is a layer transporting electrons, which are generated in the active layer on the basis of incident light, to the cathode. The electron-transport layer is a layer containing an electron-transport material. As the electron-transport material, a substance having an electron mobility greater than or equal to $1\times10^{-6}$ cm$^2$/Vs is preferable. Note that other substances can also be used as long as they have a property of transporting more electrons than holes. As the electron-transport material, it is possible to use a material having a high electron-transport property, such as a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative having a quinoline ligand, a benzoquinoline derivative, a quinoxaline derivative, a dibenzoquinoxaline derivative, a pyridine derivative, a bipyridine derivative, a pyrimidine derivative, or a π-electron deficient heteroaromatic compound such as a nitrogen-containing heteroaromatic compound.

The electron-injection layer is a layer injecting electrons from a cathode to the electron-transport layer, and a layer containing a material with a high electron-injection property. As the material with a high electron-injection property, an alkali metal, an alkaline earth metal, or a compound thereof can be used. As the material with a high electron-injection property, a composite material containing an electron-transport material and a donor material (electron-donating material) can also be used.

The light-emitting layer 283 is a layer including a light-emitting substance. The light-emitting layer 283 can include one or more kinds of light-emitting substances. As the light-emitting substance, a substance that exhibits an emission color of blue, purple, bluish purple, green, yellowish green, yellow, orange, red, or the like is appropriately used. As the light-emitting substance, a substance that emits near-infrared light can also be used.

Examples of the light-emitting substance include a fluorescent material, a phosphorescent material, a TADF material, and a quantum dot material.

Examples of the fluorescent material include a pyrene derivative, an anthracene derivative, a triphenylene derivative, a fluorene derivative, a carbazole derivative, a dibenzothiophene derivative, a dibenzofuran derivative, a dibenzoquinoxaline derivative, a quinoxaline derivative, a pyridine derivative, a pyrimidine derivative, a phenanthrene derivative, and a naphthalene derivative.

Examples of the phosphorescent material include an organometallic complex (particularly an iridium complex) having a 4H-triazole skeleton, a 1H-triazole skeleton, an imidazole skeleton, a pyrimidine skeleton, a pyrazine skeleton, or a pyridine skeleton; an organometallic complex (particularly an iridium complex) having a phenylpyridine derivative including an electron-withdrawing group as a ligand; a platinum complex; and a rare earth metal complex.

The light-emitting layer 283 may include one or more kinds of organic compounds (e.g., a host material and an assist material) in addition to the light-emitting substance (a guest material). As one or more kinds of organic compounds, one or both of the hole-transport material and the electron-transport material can be used. Alternatively, as one or more kinds of organic compounds, a bipolar material or a TADF material may be used.

The light-emitting layer 283 preferably includes a phosphorescent material and a combination of a hole-transport material and an electron-transport material that easily forms an exciplex. With such a structure, light emission can be efficiently obtained by ExTET (Exciplex-Triplet Energy Transfer), which is energy transfer from an exciplex to a light-emitting substance (a phosphorescent material). When a combination of materials is selected so as to form an exciplex that exhibits light emission whose wavelength overlaps the wavelength of a lowest-energy-side absorption band of the light-emitting substance, energy can be transferred smoothly and light emission can be obtained efficiently. With this structure, high efficiency, low-voltage driving, and a long lifetime of the light-emitting element can be achieved at the same time.

In the combination of materials for forming an exciplex, the HOMO level (highest occupied molecular orbital level) of the hole-transport material is preferably higher than or equal to the HOMO level of the electron-transport material. The LUMO level (lowest unoccupied molecular orbital level) of the hole-transport material is preferably higher than or equal to the LUMO level of the electron-transport material. The LUMO levels and the HOMO levels of the materials can be derived from the electrochemical characteristics (reduction potentials and oxidation potentials) of the materials that are measured by cyclic voltammetry (CV).

Note that the formation of an exciplex can be confirmed by a phenomenon in which the emission spectrum of a mixed film in which the hole-transport material and the electron-transport material are mixed is shifted to the longer wavelength side than the emission spectrum of each of the materials (or has another peak on the longer wavelength side), observed by comparison of the emission spectra of the hole-transport material, the electron-transport material, and the mixed film of these materials, for example. Alternatively, the formation of an exciplex can be confirmed by a difference in transient response, such as a phenomenon in which the transient photoluminescence (PL) lifetime of the mixed film has longer lifetime components or has a larger proportion of delayed components than that of each of the materials, observed by comparison of the transient PL of the hole-transport material, the transient PL of the electron-transport material, and the transient PL of the mixed film of these materials. The transient PL can be rephrased as transient electroluminescence (EL). That is, the formation of an exciplex can also be confirmed by a difference in transient response observed by comparison of the transient EL of the hole-transport material, the transient EL of the electron-transport material, and the transient EL of the mixed film of these materials.

The active layer 273 includes a semiconductor. Examples of the semiconductor include an inorganic semiconductor such as silicon and an organic semiconductor including an organic compound. This embodiment shows an example in which an organic semiconductor is used as the semiconductor included in the active layer 273. The use of an organic semiconductor is preferable because the light-emitting layer 283 and the active layer 273 can be formed by the same method (e.g., a vacuum evaporation method) and thus the same manufacturing apparatus can be used.

Examples of an n-type semiconductor material contained in the active layer 273 are electron-accepting organic semiconductor materials such as fullerene (e.g., $C_{60}$ and $C_{70}$) and a fullerene derivative. Fullerene has a soccer ball-like shape, which is energetically stable. Both the HOMO level and the LUMO level of fullerene are deep (low). Having a deep LUMO level, fullerene has an extremely high electron-accepting property (acceptor property). When π-electron conjugation (resonance) spreads in a plane as in benzene, the electron-donating property (donor property) usually increases. Although π-electrons widely spread in fullerene having a spherical shape, its electron-accepting property is high. The high electron-accepting property efficiently causes rapid charge separation and is useful for a light-receiving element. Both $C_{60}$ and $C_{70}$ have a wide absorption band in the visible light region, and $C_{70}$ is especially preferable because of having a larger π-electron conjugation system and a wider absorption band in the long wavelength region than $C_{60}$.

Examples of the n-type semiconductor material include a metal complex having a quinoline skeleton, a metal complex having a benzoquinoline skeleton, a metal complex having an oxazole skeleton, a metal complex having a thiazole skeleton, an oxadiazole derivative, a triazole derivative, an imidazole derivative, an oxazole derivative, a thiazole derivative, a phenanthroline derivative, a quinoline derivative, a benzoquinoline derivative, a quinoxaline derivative, a dibenzoquinoxaline derivative, a pyridine derivative, a bipyridine derivative, a pyrimidine derivative, a naphthalene derivative, an anthracene derivative, a coumarin derivative, a rhodamine derivative, a triazine derivative, and a quinone derivative.

Examples of a p-type semiconductor material contained in the active layer 273 include electron-donating organic semiconductor materials such as copper(II) phthalocyanine (CuPc), tetraphenyldibenzoperiflanthene (DBP), zinc phthalocyanine (ZnPc), tin phthalocyanine (SnPc), and quinacridone.

Examples of a p-type semiconductor material include a carbazole derivative, a thiophene derivative, a furan derivative, and a compound having an aromatic amine skeleton. Other examples of the p-type semiconductor material include a naphthalene derivative, an anthracene derivative, a pyrene derivative, a triphenylene derivative, a fluorene derivative, a pyrrole derivative, a benzofuran derivative, a benzothiophene derivative, an indole derivative, a dibenzofuran derivative, a dibenzothiophene derivative, an indolocarbazole derivative, a porphyrin derivative, a phthalocyanine derivative, a naphthalocyanine derivative, a quinacridone derivative, a polyphenylene vinylene derivative, a polyparaphenylene derivative, a polyfluorene derivative, a polyvinylcarbazole derivative, and a polythiophene derivative.

The HOMO level of the electron-donating organic semiconductor material is preferably shallower (higher) than the HOMO level of the electron-accepting organic semiconductor material. The LUMO level of the electron-donating organic semiconductor material is preferably shallower (higher) than the LUMO level of the electron-accepting organic semiconductor material.

Fullerene having a spherical shape is preferably used as the electron-accepting organic semiconductor material, and an organic semiconductor material having a substantially planar shape is preferably used as the electron-donating organic semiconductor material. Molecules of similar shapes tend to aggregate, and aggregated molecules of similar kinds, which have molecular orbital energy levels close to each other, can improve the carrier-transport property.

For example, the active layer 273 is preferably formed by co-evaporation of an n-type semiconductor and a p-type semiconductor. Alternatively, the active layer 273 may be formed by stacking an n-type semiconductor and a p-type semiconductor.

Either a low molecular compound or a high molecular compound can be used for the light-emitting element and the light-receiving element, and an inorganic compound may also be contained. Each of the layers included in the light-emitting element and the light-receiving element can be formed by an evaporation method (including a vacuum evaporation method), a transfer method, a printing method, an inkjet method, a coating method, or the like.

Figure 10B:
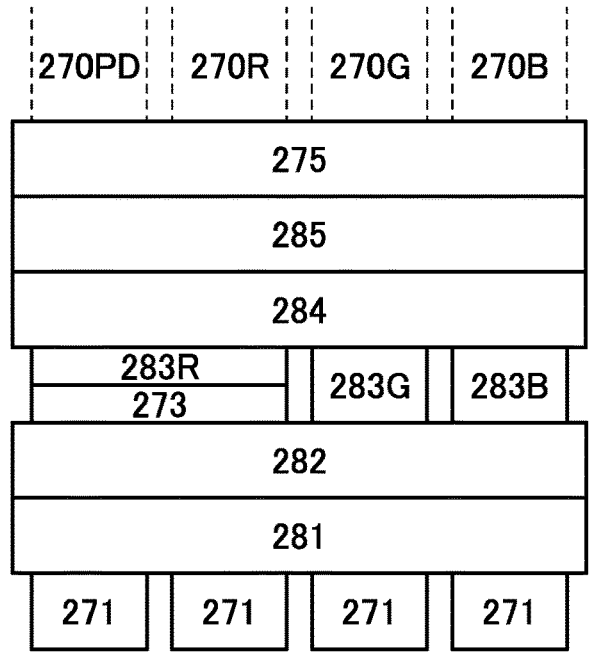

A display device 280B illustrated in FIG. 10B is different from the display device 280A in that the light-receiving element 270PD and the light-emitting element 270R have the same structure.

The light-receiving element 270PD and the light-emitting element 270R share the active layer 273 and the light-emitting layer 283R.

Here, it is preferable that the light-receiving element 270PD have a structure in common with the light-emitting element that emits light with a wavelength longer than that of the light desired to be detected. For example, the light-receiving element 270PD having a structure in which blue light is detected can have a structure which is similar to that of one or both of the light-emitting element 270R and the light-emitting element 270G. For example, the light-receiving element 270PD having a structure in which green light is detected can have a structure similar to that of the light-emitting element 270R.

When the light-receiving element 270PD and the light-emitting element 270R have a common structure, the number of deposition steps and the number of masks can be smaller than those for the structure in which the light-receiving element 270PD and the light-emitting element 270R include separately formed layers. As a result, the number of manufacturing steps and the manufacturing cost of the display device can be reduced.

When the light-receiving element 270PD and the light-emitting element 270R have a common structure, a margin for misalignment can be narrower than that for the structure in which the light-receiving element 270PD and the light-emitting element 270R include separately formed layers. Accordingly, the aperture ratio of a pixel can be increased, so that the light extraction efficiency of the display device can be increased. This can extend the life of the light-emitting element. Furthermore, the display device can exhibit a high luminance. Moreover, the resolution of the display device can also be increased.

The light-emitting layer 283R includes a light-emitting material that emits red light. The active layer 273 includes an organic compound that absorbs light with a wavelength shorter than that of red light (e.g., one or both of green light and blue light). The active layer 273 preferably includes an organic compound that does not easily absorb red light and that absorbs light with a wavelength shorter than that of red light. In this way, red light can be efficiently extracted from the light-emitting element 270R, and the light-receiving element 270PD can detect light with a wavelength shorter than that of red light at high accuracy.

Although the light-emitting element 270R and the light-receiving element 270PD have the same structure in an example of the display device 280B, the light-emitting element 270R and the light-receiving element 270PD may include optical adjustment layers with different thicknesses.

Figure 11A:
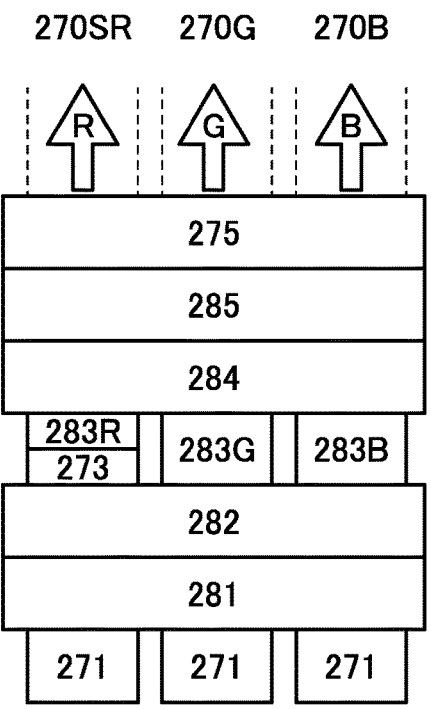
FIG. 11A to FIG. 11G are diagrams illustrating structure examples of a display device.
Figure 11B:
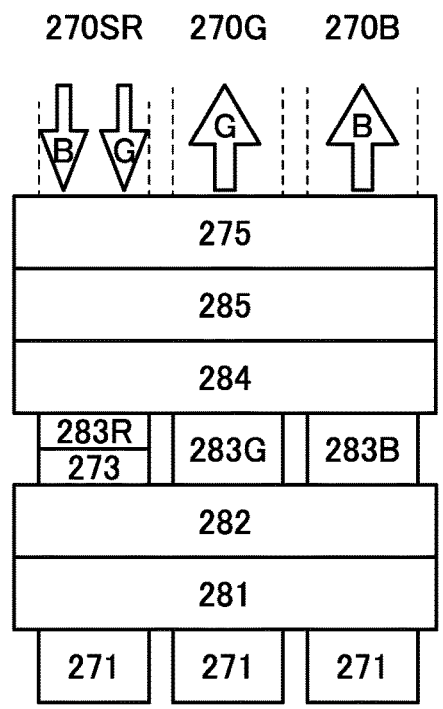

A display device 280C shown in FIG. 11A and FIG. 11B includes a light-emitting and light-receiving element 270SR that emits red (R) light and has a light-receiving function, the light-emitting element 270G that emits green (G) light, and the light-emitting element 270B that emits blue (B) light. The above description of the display device 280A and the like can be referred to for the structures of the light-emitting element 270G and the light-emitting element 270B.

The light-emitting and light-receiving element 270SR includes the pixel electrode 271, the hole-injection layer 281, the hole-transport layer 282, the active layer 273, the light-emitting layer 283R, the electron-transport layer 284, the electron-injection layer 285, and the common electrode 275, which are stacked in this order. The light-emitting and light-receiving element 270SR has the same structure as the light-emitting element 270R and the light-receiving element 270PD in the display device 280B.

FIG. 11A shows a case where the light-emitting and light-receiving element 270SR functions as a light-emitting element. In the example of FIG. 11A, the light-emitting element 270B emits blue light, the light-emitting element 270G emits green light, and the light-emitting and light-receiving element 270SR emits red light.

FIG. 11B illustrates a case where the light-emitting and light-receiving element 270SR functions as a light-receiving element. In FIG. 11B, the light-emitting and light-receiving element 270SR detects blue light emitted by the light-emitting element 270B and green light emitted by the light-emitting element 270G.

The light-emitting element 270B, the light-emitting element 270G, and the light-emitting and light-receiving element 270SR each include the pixel electrode 271 and the common electrode 275. In this embodiment, the case where the pixel electrode 271 functions as an anode and the common electrode 275 functions as a cathode is described as an example. When the light-emitting and light-receiving element 270SR is driven by application of reverse bias between the pixel electrode 271 and the common electrode 275, light incident on the light-emitting and light-receiving element 270SR can be detected and charge can be generated and extracted as current.

Note that it can be said that the light-emitting and light-receiving element 270SR has a structure in which the active layer 273 is added to the light-emitting element. That is, the light-emitting and light-receiving element 270SR can be formed concurrently with the formation of the light-emitting element only by adding a step of depositing the active layer 273 in the manufacturing process of the light-emitting element. The light-emitting element and the light-emitting and light-receiving element can be formed over one substrate. Thus, the display portion can be provided with one or both of an image capturing function and a sensing function without a significant increase in the number of manufacturing steps.

The stacking order of the light-emitting layer 283R and the active layer 273 is not limited. FIG. 11A and FIG. 11B each show an example in which the active layer 273 is provided over the hole-transport layer 282, and the light-emitting layer 283R is provided over the active layer 273. The stacking order of the light-emitting layer 283R and the active layer 273 may be reversed.

The light-emitting and light-receiving element may exclude at least one layer of the hole-injection layer 281, the hole-transport layer 282, the electron-transport layer 284, and the electron-injection layer 285. Furthermore, the light-emitting and light-receiving element may include another functional layer such as a hole-blocking layer or an electron-blocking layer.

In the light-emitting and light-receiving element, a conductive film that transmits visible light is used as the electrode through which light is extracted. A conductive film that reflects visible light is preferably used as the electrode through which light is not extracted.

The functions and materials of the layers constituting the light-emitting and light-receiving element are similar to those of the layers constituting the light-emitting elements and the light-receiving element and are not described in detail.

FIG. 11C to FIG. 11G illustrate examples of layered structures of light-emitting and light-receiving elements.

Figure 11C:
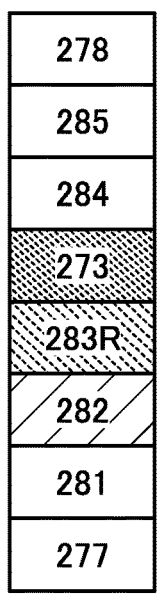

The light-emitting and light-receiving element illustrated in FIG. 11C includes a first electrode 277, the hole-injection layer 281, the hole-transport layer 282, the light-emitting layer 283R, the active layer 273, the electron-transport layer 284, the electron-injection layer 285, and a second electrode 278.

FIG. 11C illustrates an example in which the light-emitting layer 283R is provided over the hole-transport layer 282, and the active layer 273 is stacked over the light-emitting layer 283R.

As illustrated in FIG. 11A to FIG. 11C, the active layer 273 and the light-emitting layer 283R may be in contact with each other.

Figure 11D:
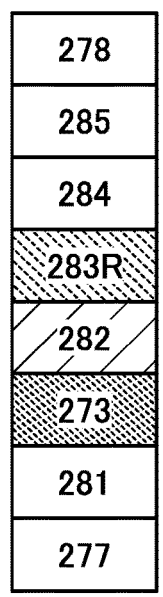

A buffer layer is preferably provided between the active layer 273 and the light-emitting layer 283R. In this case, the buffer layer preferably has a hole-transport property and an electron-transport property. For example, a substance with a bipolar property is preferably used for the buffer layer. Alternatively, as the buffer layer, at least one layer of a hole-injection layer, a hole-transport layer, an electron-transport layer, an electron-injection layer, a hole-blocking layer, an electron-blocking layer, and the like can be used. FIG. 11D illustrates an example in which the hole-transport layer 282 is used as the buffer layer.

The buffer layer provided between the active layer 273 and the light-emitting layer 283R can inhibit transfer of excitation energy from the light-emitting layer 283R to the active layer 273. Furthermore, the buffer layer can also be used to adjust the optical path length (cavity length) of the microcavity structure. Thus, high emission efficiency can be obtained from a light-emitting and light-receiving element including the buffer layer between the active layer 273 and the light-emitting layer 283R.

Figure 11E:
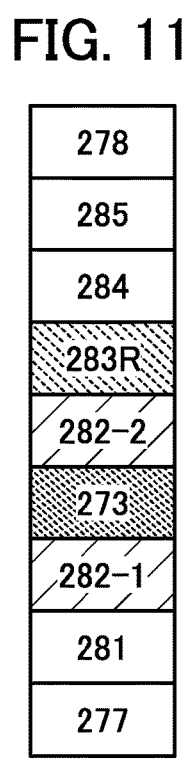

FIG. 11E illustrates an example of a stacked-layer structure in which a hole-transport layer 282-1, the active layer 273, a hole-transport layer 282-2, and the light-emitting layer 283R are stacked in this order over the hole-injection layer 281. The hole-transport layer 282-2 functions as a buffer layer. The hole-transport layer 282-1 and a hole-transport layer 281-2 may include the same material or different materials. Instead of the hole-transport layer 281-2, any of the above layers that can be used as the buffer layer may be used. The positions of the active layer 273 and the light-emitting layer 283R may be interchanged.

Figure 11F:
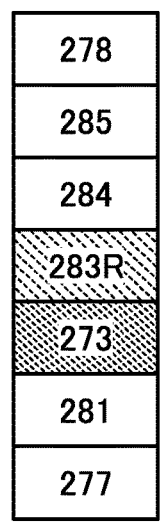

The light-emitting and light-receiving element illustrated in FIG. 11F is different from the light-emitting and light-receiving element illustrated in FIG. 11A in not including the hole-transport layer 282. In this manner, the light-emitting and light-receiving element may exclude at least one layer of the hole-injection layer 281, the hole-transport layer 282, the electron-transport layer 284, and the electron-injection layer 285. Furthermore, the light-emitting and light-receiving element may include another functional layer such as a hole-blocking layer or an electron-blocking layer.

Figure 11G:
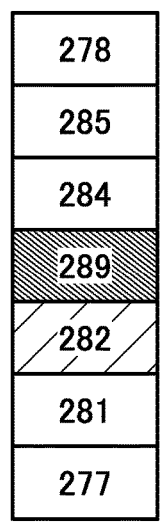

The light-emitting and light-receiving element illustrated in FIG. 11G is different from the light-emitting and light-receiving element illustrated in FIG. 11A in including a layer 289 serving as both a light-emitting layer and an active layer instead of including the active layer 273 and the light-emitting layer 283R.

As the layer serving as both a light-emitting layer and an active layer, a layer containing three materials which are an n-type semiconductor that can be used for the active layer 273, a p-type semiconductor that can be used for the active layer 273, and a light-emitting substance that can be used for the light-emitting layer 283R can be used, for example.

Note that an absorption band on the lowest energy side of an absorption spectrum of a mixed material of the n-type semiconductor and the p-type semiconductor and a maximum peak of an emission spectrum (PL spectrum) of the light-emitting substance preferably do not overlap each other and are further preferably positioned fully apart from each other.

Structure Example 2 of Light-Emitting Device

A detailed structure of the display device of one embodiment of the present invention will be described below. Here, in particular, an example of the display device including light-receiving elements and light-emitting elements will be described.

Structure Example 2-1

Figure 12A:
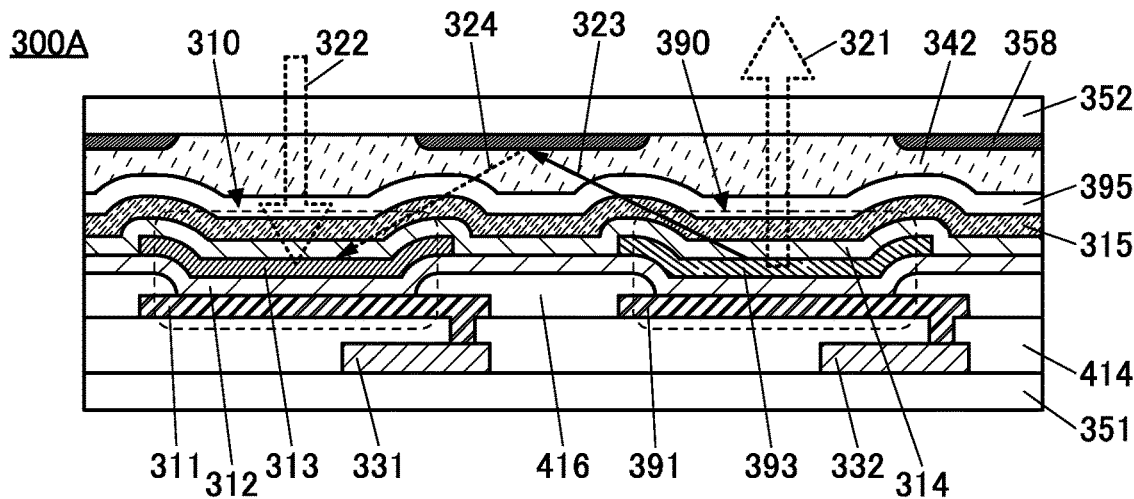
FIG. 12A to FIG. 12C are diagrams illustrating structure examples of a display device.

FIG. 12A illustrates a cross-sectional view of a display device 300A. The display device 300A includes a substrate 351, a substrate 352, a light-receiving element 310, and a light-emitting element 390.

The light-emitting element 390 includes a pixel electrode 391, a buffer layer 312, a light-emitting layer 393, a buffer layer 314, and a common electrode 315, which are stacked in this order. The buffer layer 312 can include one or both of a hole-injection layer and a hole-transport layer. The light-emitting layer 393 includes an organic compound. The buffer layer 314 can include one or both of an electron-injection layer and an electron-transport layer. The light-emitting element 390 has a function of emitting visible light 321. Note that the display device 300A may also include a light-emitting element having a function of emitting infrared light.

The light-receiving element 310 includes a pixel electrode 311, the buffer layer 312, an active layer 313, the buffer layer 314, and the common electrode 315, which are stacked in this order. The active layer 313 includes an organic compound. The light-receiving element 310 has a function of detecting visible light. Note that the light-receiving element 310 may also have a function of detecting infrared light.

The buffer layer 312, the buffer layer 314, and the common electrode 315 are common layers shared by the light-emitting element 390 and the light-receiving element 310 and provided across them. The buffer layer 312, the buffer layer 314, and the common electrode 315 each include a portion overlapping with the active layer 313 and the pixel electrode 311, a portion overlapping with the light-emitting layer 393 and the pixel electrode 391, and a portion overlapping with none of them.

This embodiment is described assuming that the pixel electrode functions as an anode and the common electrode 315 functions as a cathode in both of the light-emitting element 390 and the light-receiving element 310. In other words, the light-receiving element 310 is driven by application of reverse bias between the pixel electrode 311 and the common electrode 315, so that light incident on the light-receiving element 310 can be detected and charge can be generated and extracted as current in the display device 300A.

The pixel electrode 311, the pixel electrode 391, the buffer layer 312, the active layer 313, the buffer layer 314, the light-emitting layer 393, and the common electrode 315 may each have a single-layer structure or a stacked-layer structure.

The pixel electrode 311 and the pixel electrode 391 are each positioned over an insulating layer 414. The pixel electrodes can be formed using the same material in the same step. An end portion of the pixel electrode 311 and an end portion of the pixel electrode 391 are covered with a partition 416. Two adjacent pixel electrodes are electrically insulated (electrically isolated) from each other by the partition 416.

An organic insulating film is suitable for the partition 416. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins. The partition 416 is a layer that transmits visible light. A partition that blocks visible light may be provided instead of the partition 416.

The common electrode 315 is a layer shared by the light-receiving element 310 and the light-emitting element 390.

The material, thickness, and the like of the pair of electrodes can be the same between the light-receiving element 310 and the light-emitting element 390. Accordingly, the manufacturing cost of the display device can be reduced, and the manufacturing process of the display device can be simplified.

The display device 300A includes the light-receiving element 310, the light-emitting element 390, a transistor 331, a transistor 332, and the like between a pair of substrates (the substrate 351 and the substrate 352).

In the light-receiving element 310, the buffer layer 312, the active layer 313, and the buffer layer 314, which are positioned between the pixel electrode 311 and the common electrode 315, can each be referred to as an organic layer (a layer including an organic compound). The pixel electrode 311 preferably has a function of reflecting visible light. The common electrode 315 has a function of transmitting visible light. Note that in the case where the light-receiving element 310 is configured to detect infrared light, the common electrode 315 has a function of transmitting infrared light. Furthermore, the pixel electrode 311 preferably has a function of reflecting infrared light.

The light-receiving element 310 has a function of detecting light. Specifically, the light-receiving element 310 is a photoelectric conversion element that receives light 322 incident from the outside of the display device 300A and converts it into an electric signal. The light 322 can also be expressed as light that is emitted from the light-emitting element 390 and then reflected by an object. The light 322 may be incident on the light-receiving element 310 through a lens or the like provided in the display device 300A.

In the light-emitting element 390, the buffer layer 312, the light-emitting layer 393, and the buffer layer 314, which are positioned between the pixel electrode 391 and the common electrode 315, can be collectively referred to as an EL layer. The EL layer includes at least the light-emitting layer 393. As described above, the pixel electrode 391 preferably has a function of reflecting visible light. The common electrode 315 has a function of transmitting visible light. Note that in the case where the display device 300A includes a light-emitting element that emits infrared light, the common electrode 315 has a function of transmitting infrared light. Furthermore, the pixel electrode 391 preferably has a function of reflecting infrared light.

The light-emitting elements included in the display device of this embodiment preferably employ a micro optical resonator (microcavity) structure. The light-emitting element 390 may include an optical adjustment layer between the pixel electrode 391 and the common electrode 315. The use of the micro resonator structure enables light of a specific color to be intensified and extracted from each of the light-emitting elements.

The light-emitting element 390 has a function of emitting visible light. Specifically, the light-emitting element 390 is an electroluminescent element that emits light (here, the visible light 321) to the substrate 352 side when voltage is applied between the pixel electrode 391 and the common electrode 315.

The pixel electrode 311 included in the light-receiving element 310 is electrically connected to a source or a drain of the transistor 331 through an opening provided in the insulating layer 414. The pixel electrode 391 included in the light-emitting element 390 is electrically connected to a source or a drain of the transistor 332 through an opening provided in the insulating layer 414.

The transistor 331 and the transistor 332 are on and in contact with the same layer (the substrate 351 in FIG. 12A).

At least part of a circuit electrically connected to the light-receiving element 310 and a circuit electrically connected to the light-emitting element 390 are preferably formed using the same material in the same step. In that case, the thickness of the display device can be reduced compared with the case where the two circuits are separately formed, resulting in simplification of the manufacturing process.

The light-receiving element 310 and the light-emitting element 390 are each preferably covered with a protective layer 395. In FIG. 12A and the like, the protective layer 395 is provided on and in contact with the common electrode 315. Providing the protective layer 395 can inhibit entry of impurities such as water into the light-receiving element 310 and the light-emitting element 390, so that the reliability of the light-receiving element 310 and the light-emitting element 390 can be increased. The protective layer 395 and the substrate 352 are bonded to each other with an adhesive layer 342.

A light-blocking layer 358 is provided on the surface of the substrate 352 on the substrate 351 side. The light-blocking layer 358 has openings in a position overlapping with the light-emitting element 390 and in a position overlapping with the light-receiving element 310.

Here, the light-receiving element 310 detects light that is emitted from the light-emitting element 390 and then reflected by an object. However, in some cases, light emitted from the light-emitting element 390 is reflected inside the display device 300A and is incident on the light-receiving element 310 without through an object. The light-blocking layer 358 can reduce the influence of such stray light. For example, in the case where the light shielding layer 358 is not provided, light 323 emitted from the light-emitting element 390 is reflected by the substrate 352 and reflected light 324 is incident on the light-receiving element 310 in some cases. Providing the light-blocking layer 358 can inhibit the reflected light 324 to be incident on the light-receiving element 310. Consequently, noise can be reduced, and the sensitivity of a sensor using the light-receiving element 310 can be increased.

For the light-blocking layer 358, a material that blocks light emitted from the light-emitting element can be used. The light shielding layer 358 preferably absorbs visible light. As the light-blocking layer 358, a black matrix can be formed using a metal material or a resin material containing pigment (e.g., carbon black) or dye, for example. The light-blocking layer 358 may have a stacked-layer structure of a red color filter, a green color filter, and a blue color filter.

Structure Example 2-2

Figure 12B:
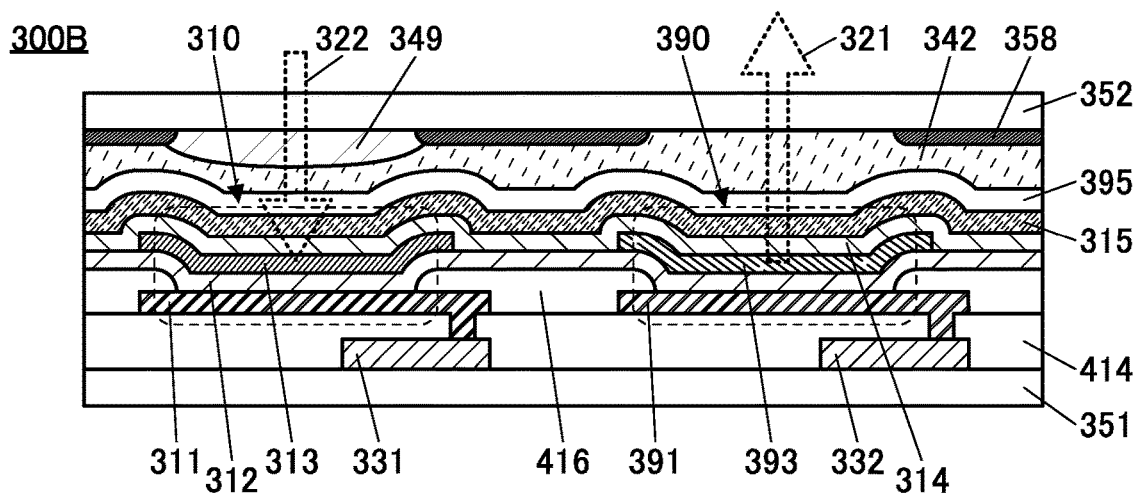

A display device 300B illustrated in FIG. 12B differs from the display device 300A mainly in including a lens 349.

The lens 349 is provided on a surface of the substrate 352 on the substrate 351 side. The light 322 from the outside is incident on the light-receiving element 310 through the lens 349. For each of the lens 349 and the substrate 352, a material that has high visible-light-transmitting property is preferably used.

When light is incident on the light-receiving element 310 through the lens 349, the range of light incident on the light-receiving element 310 can be narrowed. Thus, overlap of imaging ranges between a plurality of light-receiving elements 310 can be inhibited, whereby a clear image with little blurring can be captured.

In addition, the lens 349 can condense incident light. Accordingly, the amount of light to be incident on the light-receiving element 310 can be increased. This can increase the photoelectric conversion efficiency of the light-receiving element 310.

Structure Example 2-3

Figure 12C:
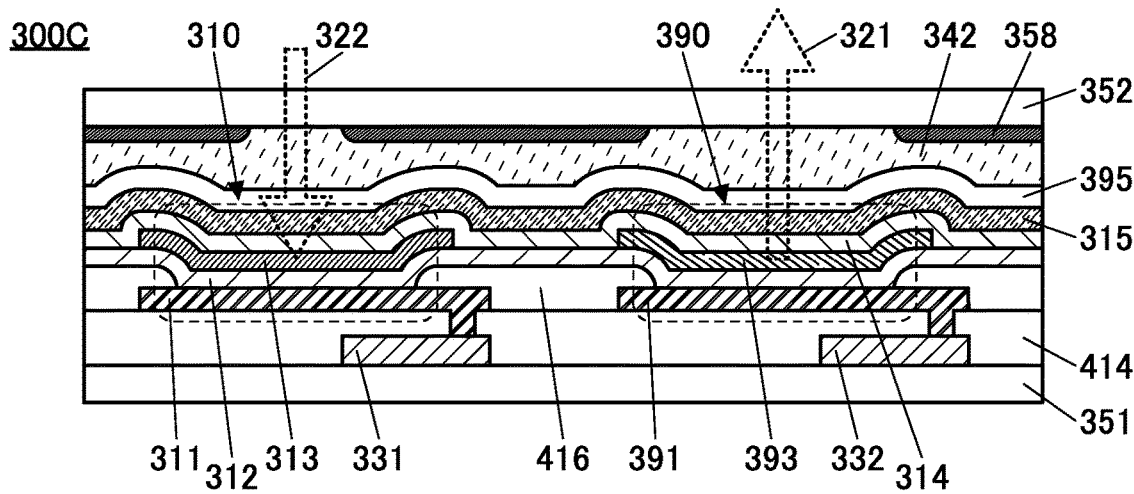

A display device 300C illustrated in FIG. 12C differs from the display device 300A in the shape of the light-blocking layer 358.

The light-blocking layer 358 is provided so that an opening portion overlapping with the light-receiving element 310 is positioned on an inner side of the light-receiving region of the light-receiving element 310 in a plan view. The smaller the diameter of the opening portion overlapping with the light-receiving element 310 of the light-blocking layer 358 is, the narrower the range of light incident on the light-receiving element 310 becomes. Thus, overlap of imaging ranges between a plurality of light-receiving elements 310 can be inhibited, whereby a clear image with little blurring can be captured.

For example, the area of the opening portion of the light-blocking layer 358 can be less than or equal to 80%, less than or equal to 70%, less than or equal to 60%, less than or equal to 50%, or less than or equal to 40% and greater than or equal to 1%, greater than or equal to 5%, or greater than or equal to 10% of the area of the light-receiving region of the light-receiving element 310. An clearer image can be obtained as the area of the opening portion of the light-blocking layer 358 becomes smaller. In contrast, when the area of the opening portion is too small, the amount of light reaching the light-receiving element 310 might be reduced to reduce light sensitivity. Therefore, the area of the opening is preferably set within the above-described range. The above upper limits and lower limits can be combined freely. Furthermore, the light-receiving region of the light-receiving element 310 can be referred to as the opening portion of the partition 416.

Note that the center of the opening portion of the light-blocking layer 358 overlapping with the light-receiving element 310 may be shifted from the center of the light-receiving region of the light-receiving element 310 in a plan view. Moreover, a structure in which the opening portion of the light-blocking layer 358 does not overlap with the light-receiving region of the light-receiving element 310 in a plan view may be employed. Thus, only oblique light that has passed through the opening portion of the light-blocking layer 358 can be received by the light-receiving element 310. Accordingly, the range of light incident on the light-receiving element 310 can be limited more effectively, so that a clear image can be captured.

Structure Example 2-4

Figure 13A:
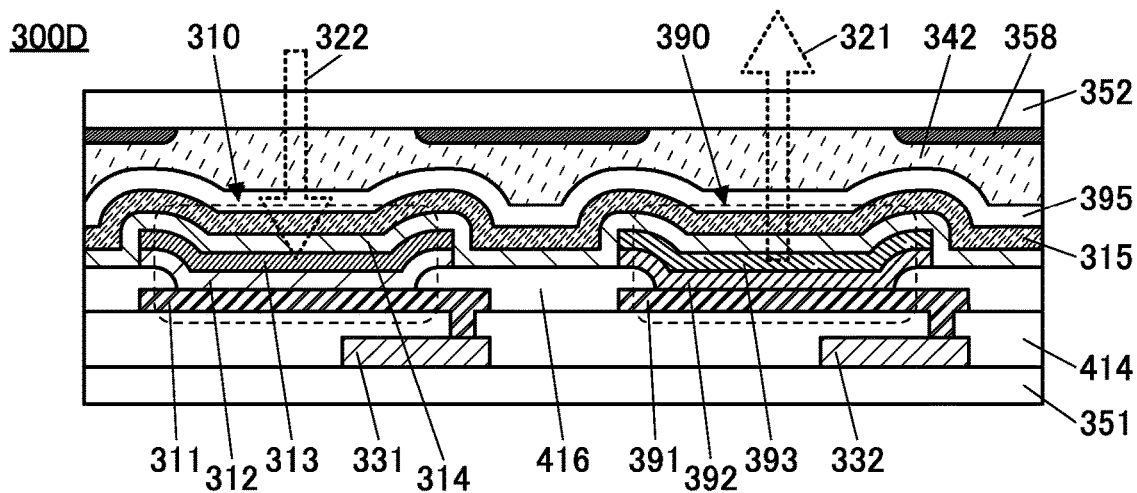
FIG. 13A to FIG. 13C are diagrams illustrating structure examples of a display device.

A display device 300D illustrated in FIG. 13A differs from the display device 300A mainly in that the buffer layer 312 is not a common layer.

The light-receiving element 310 includes the pixel electrode 311, the buffer layer 312, the active layer 313, the buffer layer 314, and the common electrode 315. The light-emitting element 390 includes the pixel electrode 391, a buffer layer 392, the light-emitting layer 393, the buffer layer 314, and the common electrode 315. Each of the active layer 313, the buffer layer 312, the light-emitting layer 393, and the buffer layer 392 has an island-shaped top surface.

The buffer layer 312 and the buffer layer 392 may include different materials or the same material.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the buffer layer 314 and the common electrode 315 are common layers, whereby the manufacturing process can be simplified and manufacturing cost can be reduced as compared to the case where the light-emitting element 390 and the light-receiving element 310 are manufactured separately.

Structure Example 2-5

Figure 13B:
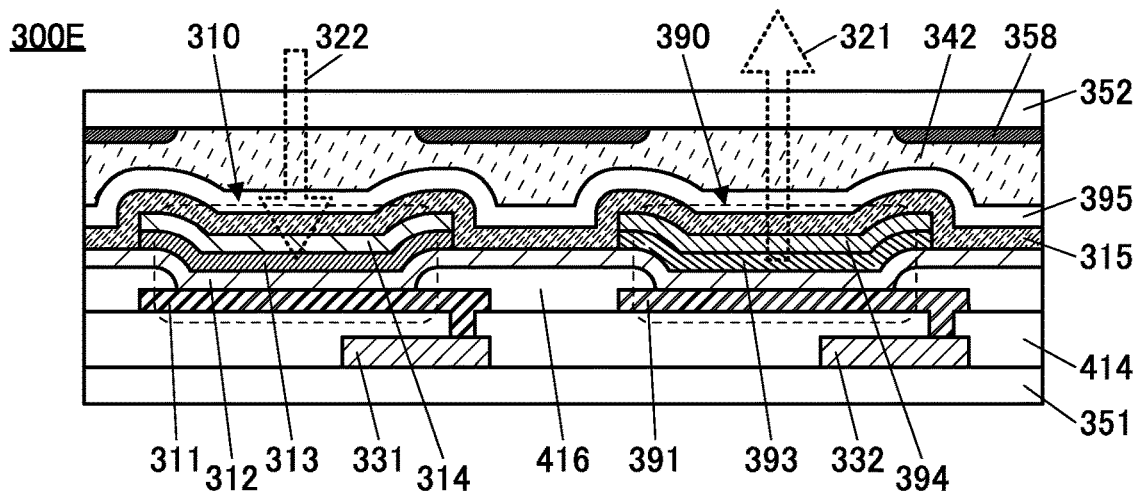

A display device 300E illustrated in FIG. 13B differs from the display device 300A mainly in that the buffer layer 314 is not a common layer.

The light-receiving element 310 includes the pixel electrode 311, the buffer layer 312, the active layer 313, the buffer layer 314, and the common electrode 315. The light-emitting element 390 includes the pixel electrode 391, the buffer layer 312, the light-emitting layer 393, a buffer layer 394, and the common electrode 315. Each of the active layer 313, the buffer layer 314, the light-emitting layer 393, and the buffer layer 394 has an island-shaped top surface.

The buffer layer 314 and the buffer layer 394 may include different materials or the same material.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the buffer layer 312 and the common electrode 315 are common layers, whereby the manufacturing process can be simplified and manufacturing cost can be reduced as compared to the case where the light-emitting element 390 and the light-receiving element 310 are manufactured separately.

Structure Example 2-6

Figure 13C:
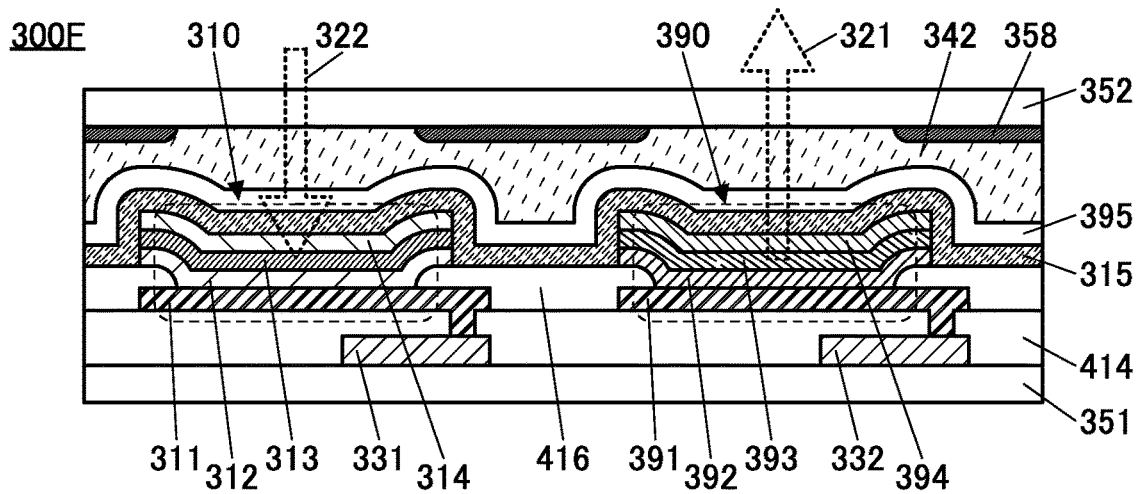

A display device 300F illustrated in FIG. 13C differs from the display device 300A mainly in that the buffer layer 312 and the buffer layer 314 are not common layers.

The light-receiving element 310 includes the pixel electrode 311, the buffer layer 312, the active layer 313, the buffer layer 314, and the common electrode 315. The light-emitting element 390 includes the pixel electrode 391, the buffer layer 392, the light-emitting layer 393, the buffer layer 394, and the common electrode 315. Each of the buffer layer 312, the active layer 313, the buffer layer 314, the buffer layer 392, the light-emitting layer 393, and the buffer layer 394 has an island-shaped top surface.

As described above, when the buffer layers are formed separately in the light-emitting element 390 and the light-receiving element 310, the degree of freedom for selecting materials of the buffer layers included in the light-emitting element 390 and the light-receiving element 310 can be increased, which facilitates optimization. In addition, the common electrode 315 is a common layer, whereby the manufacturing process can be simplified and manufacturing cost can be reduced as compared to the case where the light-emitting element 390 and the light-receiving element 310 are manufactured separately.

Structure Example 3 of Display Device

A more detailed structure of the display device of one embodiment of the present invention will be described below. Here, in particular, an example of the display device including light-receiving elements and light-emitting elements will be described.

Note that in the description below, the above description is referred to for portions similar to those described above and the description of the portions is omitted in some cases.

Structure Example 3-1

Figure 14A:
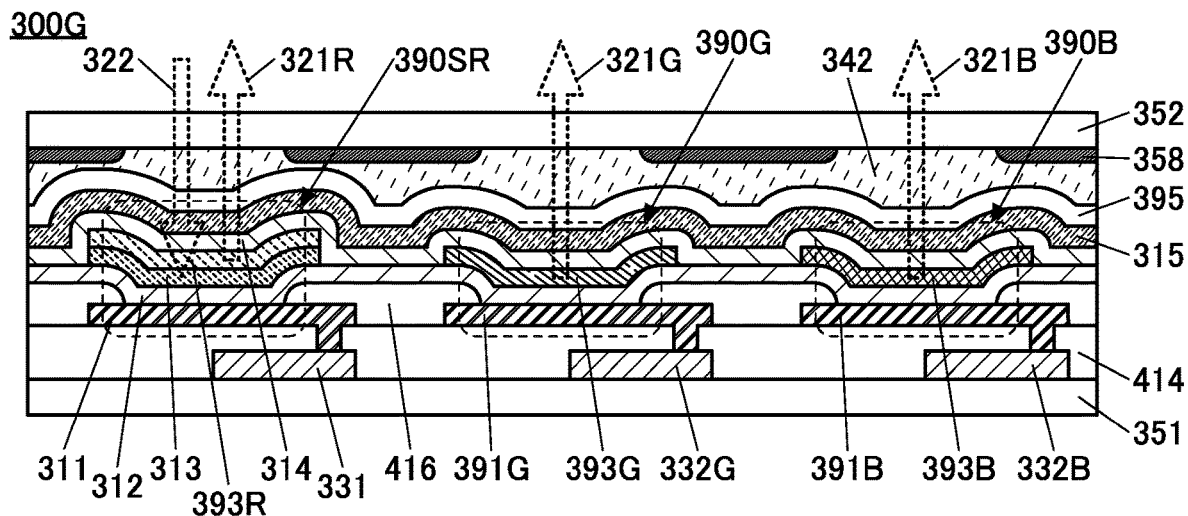
FIG. 14A and FIG. 14B are diagrams illustrating structure examples of a display device.

FIG. 14A illustrates a cross-sectional view of a display device 300G. The display device 300G includes a light-receiving and light-emitting element 390R, a light-emitting element 390G, and a light-emitting element 390B.

The light-receiving and light-emitting element 390R has a function of a light-emitting element that emits red light 321R, and a function of a photoelectric conversion element that receives the light 322. The light-emitting element 390G can emit green light 321G. The light-emitting element 390B can emit blue light 321B.

The light-emitting and light-receiving element 390R includes the pixel electrode 311, the buffer layer 312, the active layer 313, a light-emitting layer 393SR, the buffer layer 314, and the common electrode 315. The light-emitting element 390G includes a pixel electrode 391G, the buffer layer 312, a light-emitting layer 393G, the buffer layer 314, and the common electrode 315. The light-emitting element 390B includes a pixel electrode 391B, the buffer layer 312, a light-emitting layer 393B, the buffer layer 314, and the common electrode 315.

The buffer layer 312, the buffer layer 314, and the common electrode 315 are common layers shared by the light-receiving and light-emitting element 390R, the light-emitting element 390G, and the light-emitting element 390B and provided across them. Each of the active layer 313, the light-emitting layer 393R, the light-emitting layer 393G, and the light-emitting layer 393B has an island-shaped top surface. Note that although the stack body including the active layer 313 and the light-emitting layer 393R, the light-emitting layer 393G, and the light-emitting layer 393B are provided separately from one another in the example illustrated in FIG. 14, and adjacent two of them may include a region where the two overlaps each other.

Note that as in the case of the display device 300D, the display device 300E, or the display device 300F, a structure in which one or both of the buffer layer 312 and the buffer layer 314 are not used as common layers can be employed.

The pixel electrode 311 is electrically connected to one of the source and the drain of the transistor 331. The pixel electrode 391G is electrically connected to one of a source and a drain of a transistor 332G. The pixel electrode 391B is electrically connected to one of a source and a drain of a transistor 332B.

With such a structure, a display device with higher resolution can be achieved.

Structure Example 3-2

Figure 14B:
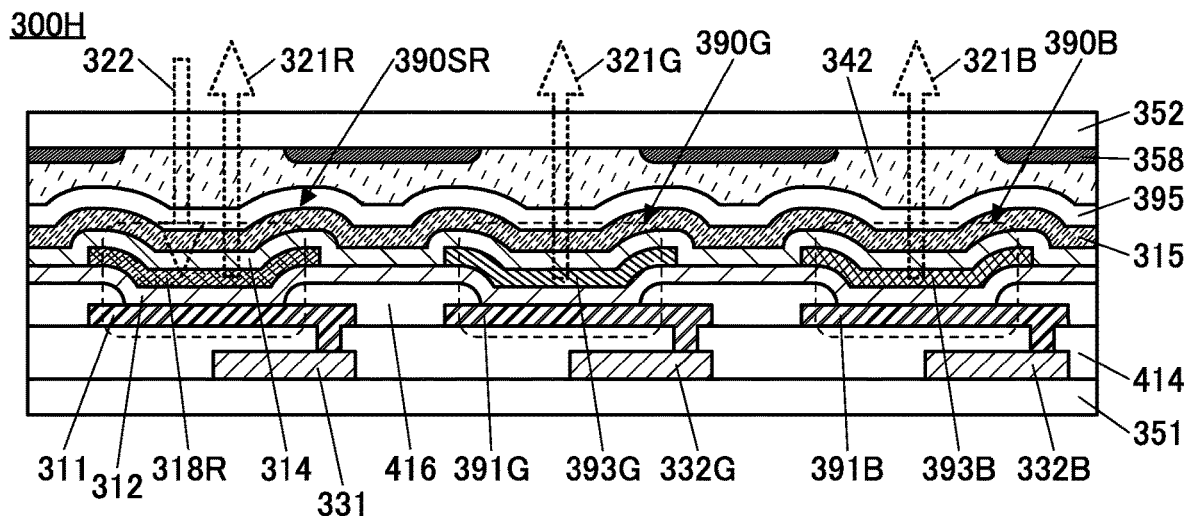

A display device 300H illustrated in FIG. 14B differs from the display device 300G mainly in the structure of the light-receiving and light-emitting element 390R.

The light-receiving and light-emitting element 390SR includes a light-receiving and light-emitting layer 318R instead of the active layer 313 and the light-emitting layer 393R.

The light-receiving and light-emitting layer 318R is a layer that has both a function of a light-emitting layer and a function of an active layer. For example, a layer including the above-described light-emitting substance, an n-type semiconductor, and a p-type semiconductor can be used.

With such a structure, the manufacturing process can be simplified, facilitating cost reduction.

Structure Example 4 of Display Device

A more specific structure of the display device of one embodiment of the present invention will be described below.

Figure 15:
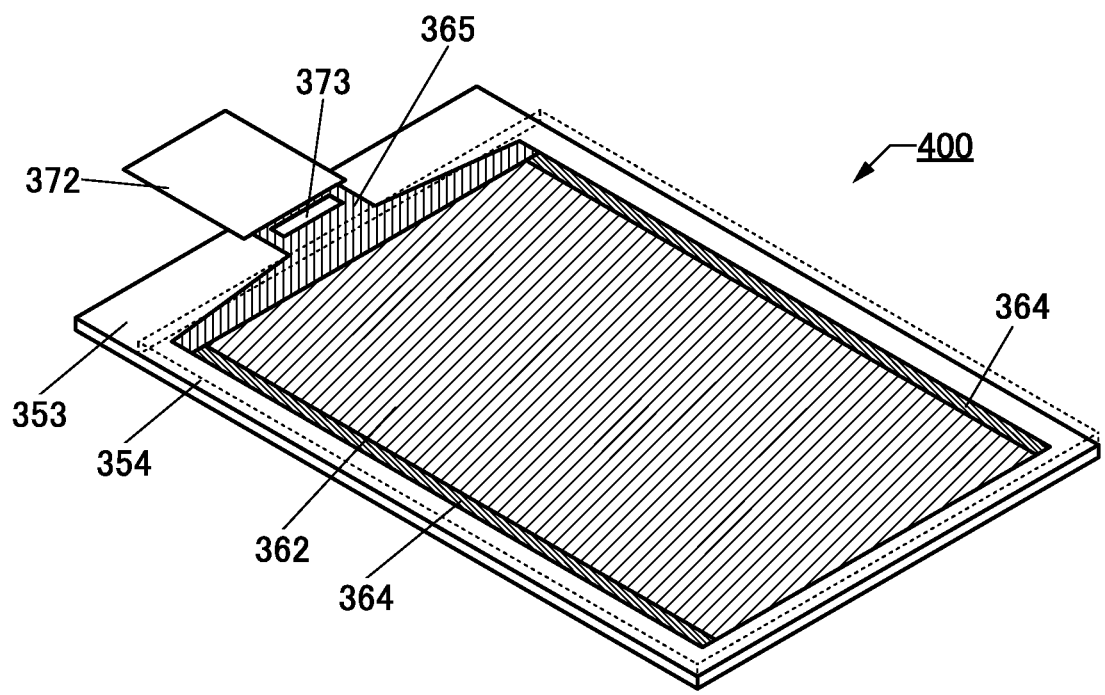
FIG. 15 is a diagram illustrating a structure example of a display device.
Figure 16A:
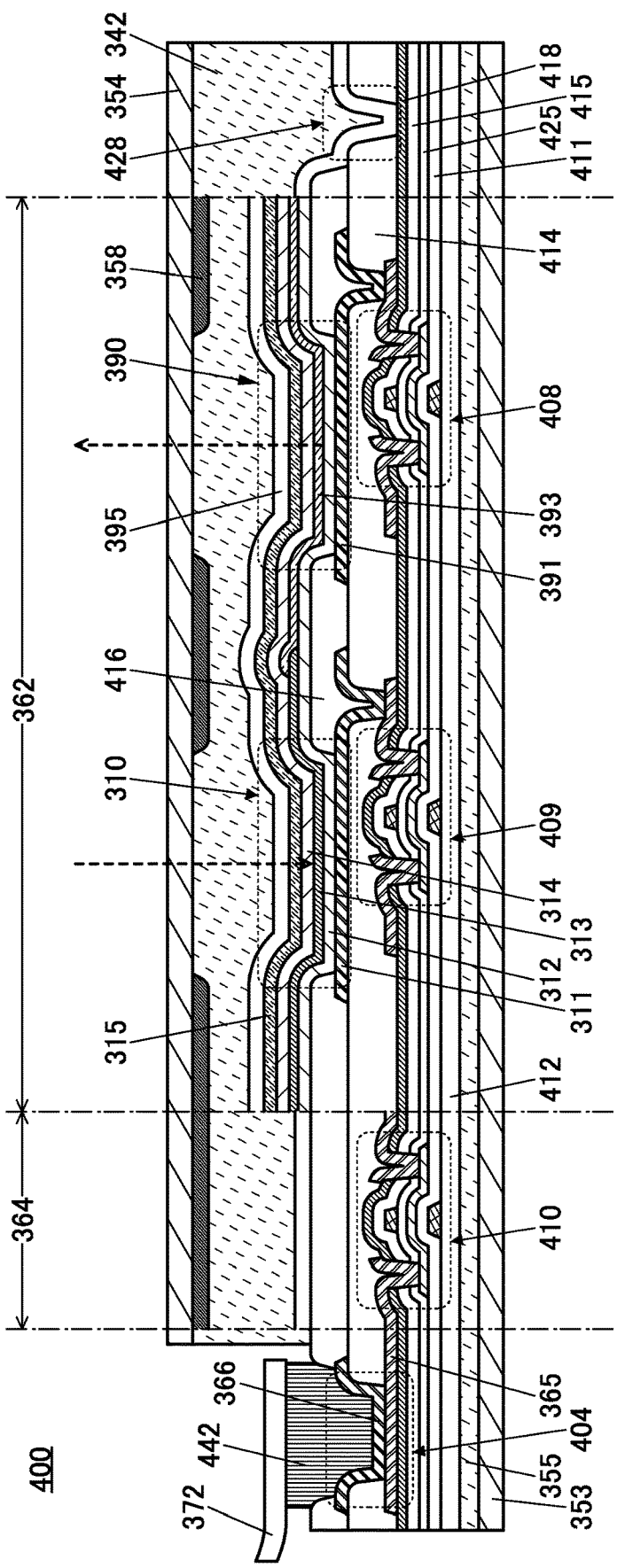
FIG. 16A is a diagram illustrating a structure example of a display device.

FIG. 15 illustrates a perspective view of a display device 400, and FIG. 16A illustrates a cross-sectional view of the display device 400.

In the display device 400, a substrate 353 and a substrate 354 are bonded to each other. In FIG. 15, the substrate 354 is denoted by a dashed line.

The display device 400 includes a display portion 362, a circuit 364, a wiring 365, and the like. FIG. 15 illustrates an example in which the display device 400 is provided with an IC (integrated circuit) 373 and an FPC 372. Thus, the structure illustrated in FIG. 15 can also be regarded as a display module including the display device 400, the IC, and the FPC.

As the circuit 364, for example, a scan line driver circuit can be used.

The wiring 365 has a function of supplying a signal and power to the display portion 362 and the circuit 364. The signal and power are input to the wiring 365 from the outside through the FPC 372 or input to the wiring 365 from the IC 373.

FIG. 15 illustrates an example in which the IC 373 is provided over the substrate 353 by a COG (Chip On Glass) method, a COF (Chip On Film) method, or the like. An IC including a scan line driver circuit, a signal line driver circuit, or the like can be used as the IC 373, for example. Note that the display device 400 and the display module are not necessarily provided with an IC. The IC may be mounted on the FPC by a COF method or the like.

FIG. 16A illustrates an example of cross-sections of part of a region including the FPC 372, part of a region including the circuit 364, part of a region including the display portion 362, and part of a region including an end portion of the display device 400 illustrated in FIG. 15.

The display device 400 illustrated in FIG. 16 includes a transistor 408, a transistor 409, a transistor 410, the light-emitting element 390, the light-receiving element 310, and the like between the substrate 353 and the substrate 354.

The substrate 354 and the protective layer 395 are bonded to each other with the adhesive layer 342, and a solid sealing structure is used for the display device 400.

The substrate 353 and an insulating layer 412 are bonded to each other with an adhesive layer 355.

In a method for manufacturing the display device 400, first, a formation substrate provided with the insulating layer 412, the transistors, the light-receiving element 310, the light-emitting element 390, and the like is bonded to the substrate 354 provided with the light-blocking layer 358 and the like with the adhesive layer 342. Then, with the use of the adhesive layer 355, the substrate 353 is attached to a surface exposed by separation of the formation substrate, whereby the components formed over the formation substrate are transferred onto the substrate 353. The substrate 353 and the substrate 354 preferably have flexibility. This can increase the flexibility of the display device 400.

The light-emitting element 390 has a stacked-layer structure in which the pixel electrode 391, the buffer layer 312, the light-emitting layer 393, the buffer layer 314, and the common electrode 315 are stacked in this order from the insulating layer 414 side. The pixel electrode 391 is electrically connected to one of a source and a drain of in the transistor 408 through an opening provided in the insulating layer 414. The transistor 408 has a function of controlling a current flowing through the light-emitting element 390.

The light-receiving element 310 has a stacked-layer structure in which the pixel electrode 311, the buffer layer 312, the active layer 313, the buffer layer 314, and the common electrode 315 are stacked in this order from the insulating layer 414 side. The pixel electrode 311 is connected to one of a source and a drain of the transistor 409 through an opening provided in the insulating layer 414. The transistor 409 has a function of controlling transfer of charge accumulated in the light-receiving element 310.

Light emitted by the light-emitting element 390 is emitted toward the substrate 354 side. Light is incident on the light-receiving element 310 through the substrate 354 and the adhesive layer 342. For the substrate 354, a material having a high visible-light-transmitting property is preferably used.

The pixel electrode 311 and the pixel electrode 391 can be formed using the same material in the same step. The buffer layer 312, the buffer layer 314, and the common electrode 315 are shared by the light-receiving element 310 and the light-emitting element 390. The light-receiving element 310 and the light-emitting element 390 can have common components except the active layer 313 and the light-emitting layer 393. Thus, the light-receiving element 310 can be incorporated in the display device 400 without a significant increase in the number of manufacturing steps.

The light-blocking layer 358 is provided on a surface of the substrate 354 on the substrate 353 side. The light-blocking layer 358 includes openings in a position overlapping with the light-emitting element 390 and in a position overlapping with the light-receiving element 310. Providing the light-blocking layer 358 can control the range where the light-receiving element 310 detects light. As described above, it is preferable to control light to be incident on the light-receiving element 310 by adjusting the position and area of the opening of the light-blocking layer provided in the position overlapping with the light-receiving element 310. Furthermore, with the light-blocking layer 358, light can be inhibited from being incident on the light-receiving element 310 directly from the light-emitting element 390 without through an object. Hence, a sensor with less noise and high sensitivity can be obtained.

An end portion of the pixel electrode 311 and an end portion of the pixel electrode 391 are each covered with the partition 416. The pixel electrode 311 and the pixel electrode 391 each include a material that reflects visible light, and the common electrode 315 includes a material that transmits visible light.

A region where part of the active layer 313 overlaps with part of the light-emitting layer 393 is included in the example illustrated in FIG. 16A. The portion where the active layer 313 overlaps with the light-emitting layer 393 preferably overlaps with the light-blocking layer 358 and the partition 416.

The transistor 408, the transistor 409, and the transistor 410 are formed over the substrate 353. These transistors can be formed using the same materials in the same steps.

The insulating layer 412, an insulating layer 411, an insulating layer 425, an insulating layer 415, an insulating layer 418, and the insulating layer 414 are provided in this order over the substrate 353 with the adhesive layer 355 therebetween. Each of the insulating layer 411 and the insulating layer 425 partially functions as a gate insulating layer for the transistors. The insulating layer 415 and the insulating layer 418 are provided to cover the transistors. The insulating layer 414 is provided to cover the transistors and has a function of a planarization layer. Note that there is no limitation on the number of gate insulating layers and the number of insulating layers covering the transistors, and each insulating layer may have either a single layer or two or more layers.

A material into which impurities such as water or hydrogen do not easily diffuse is preferably used for at least one of the insulating layers that cover the transistors. This allows the insulating layer to serve as a barrier layer. Such a structure can effectively inhibit diffusion of impurities into the transistors from the outside and increase the reliability of the display device.

An inorganic insulating film is preferably used as each of the insulating layer 411, the insulating layer 412, the insulating layer 425, the insulating layer 415, and the insulating layer 418. As the inorganic insulating film, a silicon nitride film, a silicon oxynitride film, a silicon oxide film, a silicon nitride oxide film, an aluminum oxide film, or an aluminum nitride film can be used, for example. A hafnium oxide film, a hafnium oxynitride film, a hafnium nitride oxide film, an yttrium oxide film, a zirconium oxide film, a gallium oxide film, a tantalum oxide film, a magnesium oxide film, a lanthanum oxide film, a cerium oxide film, a neodymium oxide film, or the like may be used. A stack including two or more of the above insulating films may also be used.

Here, an organic insulating film often has a lower barrier property than an inorganic insulating film. Therefore, the organic insulating film preferably has an opening in the vicinity of an end portion of the display device 400. In a region 428 illustrated in FIG. 16, an opening is formed in the insulating layer 414. This can inhibit entry of impurities from the end portion of the display device 400 through the organic insulating film. Alternatively, the organic insulating film may be formed so that an end portion of the organic insulating film is positioned on the inner side compared to the end portion of the display device 400, to prevent the organic insulating film from being exposed at the end portion of the display device 400.

In the region 428 in the vicinity of the end portion of the display device 400, the insulating layer 418 and the protective layer 395 are preferably in contact with each other through the opening in the insulating layer 414. In particular, the inorganic insulating film included in the insulating layer 418 and the inorganic insulating film included in the protective layer 395 are preferably in contact with each other. Thus, entry of impurities into the display portion 362 from the outside through an organic insulating film can be inhibited. Thus, the reliability of the display device 400 can be increased.

An organic insulating film is suitable for the insulating layer 414 functioning as a planarization layer. Examples of materials that can be used for the organic insulating film include an acrylic resin, a polyimide resin, an epoxy resin, a polyamide resin, a polyimide-amide resin, a siloxane resin, a benzocyclobutene-based resin, a phenol resin, and precursors of these resins.

Providing the protective layer 395 covering the light-emitting element 390 and the light-receiving element 310 can inhibit impurities such as water from entering the light-emitting element 390 and the light-receiving element 310 and increase the reliability of the light-emitting element 390 and the light-receiving element 310.

The protective layer 395 may have a single-layer structure or a stacked-layer structure. For example, the protective layer 395 may have a stacked-layer structure of an organic insulating film and an inorganic insulating film. In that case, an end portion of the inorganic insulating film preferably extends beyond an end portion of the organic insulating film.

Figure 16B:
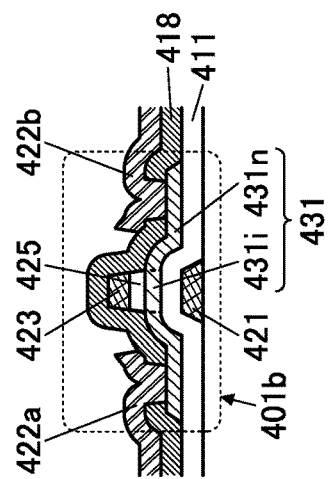
FIG. 16B and FIG. 16C are diagrams illustrating structure examples of a transistor.

FIG. 16B is a cross-sectional view of a transistor 401a that can be used as the transistor 408, the transistor 409, and the transistor 410.

The transistor 401a is provided over the insulating layer 412 (not illustrated) and includes a conductive layer 421 functioning as a first gate, the insulating layer 411 functioning as a first gate insulating layer, a semiconductor layer 431, the insulating layer 425 functioning as a second gate insulating layer, and a conductive layer 423 functioning as a second gate. The insulating layer 411 is positioned between the conductive layer 421 and the semiconductor layer 431. The insulating layer 425 is positioned between the conductive layer 423 and the semiconductor layer 431.

The semiconductor layer 431 includes a region 431i and a pair of regions 431n. The region 431i functions as a channel formation region. One of the pair of regions 431n serves as a source and the other thereof serves as a drain. The regions 431n have higher carrier concentration and higher conductivity than the region 431i. The conductive layer 422a and the conductive layer 422b are connected to the regions 431n through openings provided in the insulating layer 418 and the insulating layer 415.

Figure 16C:
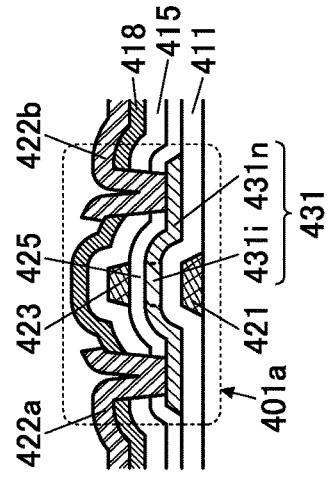

FIG. 16C is a cross-sectional view of a transistor 401b that can be used as the transistor 408, the transistor 409, and the transistor 410. Furthermore, in the example illustrated in FIG. 16, the insulating layer 415 is not provided. In the transistor 401b, the insulating layer 425 is processed in the same manner as the conductive layer 423, and the insulating layer 418 is in contact with the regions 431n.

Note that there is no particular limitation on the structure of the transistors included in the display device of this embodiment. For example, a planar transistor, a staggered transistor, or an inverted staggered transistor can be used. A top-gate or a bottom-gate transistor structure may be employed. Alternatively, gates may be provided above and below a semiconductor layer in which a channel is formed.

The structure in which the semiconductor layer where a channel is formed is provided between two gates is used for the transistor 408, the transistor 409, and the transistor 410. The two gates may be connected to each other and supplied with the same signal to drive the transistor. Alternatively, a potential for controlling the threshold voltage may be supplied to one of the two gates and a potential for driving may be supplied to the other to control the threshold voltage of the transistor.

There is no particular limitation on the crystallinity of a semiconductor material used for the transistors; any of an amorphous semiconductor, a single crystal semiconductor, and a semiconductor having crystallinity (a microcrystalline semiconductor, a polycrystalline semiconductor, or a semiconductor partly including crystal regions) may be used. A semiconductor having crystallinity is preferably used, in which case deterioration of the transistor characteristics can be suppressed.

The semiconductor layer of the transistor preferably includes a metal oxide (also referred to as an oxide semiconductor). Alternatively, the semiconductor layer of the transistor may include silicon. Examples of silicon include amorphous silicon and crystalline silicon (e.g., low-temperature poly silicon or single crystal silicon).

The semiconductor layer preferably includes indium, M (M is one or more kinds selected from gallium, aluminum, silicon, boron, yttrium, tin, copper, vanadium, beryllium, titanium, iron, nickel, germanium, zirconium, molybdenum, lanthanum, cerium, neodymium, hafnium, tantalum, tungsten, and magnesium), and zinc, for example. In particular, M is preferably one or more kinds selected from aluminum, gallium, yttrium, and tin.

It is particularly preferable to use an oxide containing indium (In), gallium (Ga), and zinc (Zn) (also referred to as IGZO) for the semiconductor layer.

When the semiconductor layer is an In-M-Zn oxide, the atomic ratio of In is preferably greater than or equal to the atomic ratio of M in the In-M-Zn oxide. Examples of the atomic ratio of the metal elements in such an In-M-Zn oxide include In:M:Zn=1:1:1 or a composition in the neighborhood thereof, In:M:Zn=1:1:1.2 or a composition in the neighborhood thereof, In:M:Zn=2:1:3 or a composition in the neighborhood thereof, In:M:Zn=3:1:2 or a composition in the neighborhood thereof, In:M:Zn=4:2:3 or a composition in the neighborhood thereof, In:M:Zn=4:2:4.1 or a composition in the neighborhood thereof, In:M:Zn=5:1:3 or a composition in the neighborhood thereof, In:M:Zn=5:1:6 or a composition in the neighborhood thereof, In:M:Zn=5:1:7 or a composition in the neighborhood thereof, In:M:Zn=5:1:8 or a composition in the neighborhood thereof, In:M:Zn=6:1:6 or a composition in the neighborhood thereof, and In:M:Zn=5:2:5 or a composition in the neighborhood thereof. Note that a composition in the neighborhood includes the range of ±30% of a desired atomic ratio.

For example, when the atomic ratio is described as In:Ga:Zn=4:2:3 or a composition in the neighborhood thereof, the case is included where the atomic ratio of Ga is greater than or equal to 1 and less than or equal to 3 and the atomic ratio of Zn is greater than or equal to 2 and less than or equal to 4 with the atomic ratio of In being 4. When the atomic ratio is described as In:Ga:Zn=5:1:6 or a composition in the neighborhood thereof, the case is included where the atomic ratio of Ga is greater than 0.1 and less than or equal to 2 and the atomic ratio of Zn is greater than or equal to 5 and less than or equal to 7 with the atomic ratio of In being 5. When the atomic ratio is described as In:Ga:Zn=1:1:1 or a composition in the neighborhood thereof, the case is included where the atomic ratio of Ga is greater than 0.1 and less than or equal to 2 and the atomic ratio of Zn is greater than 0.1 and less than or equal to 2 with the atomic ratio of In being 1.

The transistor 410 included in the circuit 364 and the transistor 408 and the transistor 409 included in the display portion 362 may have the same structure or different structures. A plurality of transistors included in the circuit 364 may have the same structure or two or more kinds of structures. Similarly, a plurality of transistors included in the display portion 362 may have the same structure or two or more kinds of structures.

A connection portion 404 is provided in a region of the substrate 353 that does not overlap with the substrate 354. In the connection portion 404, the wiring 365 is electrically connected to the FPC 372 through a conductive layer 366 and a connection layer 442. The conductive layer 366 obtained by processing the same conductive film as the pixel electrode 311 and the pixel electrode 391 is exposed on a top surface of the connection portion 404. Thus, the connection portion 404 and the FPC 372 can be electrically connected to each other through the connection layer 442.

A variety of optical members can be arranged on the outer side of the substrate 354. Examples of the optical members include a polarizing plate, a retardation plate, a light diffusion layer (a diffusion film or the like), an anti-reflective layer, and a light-condensing film. Furthermore, an antistatic film preventing the attachment of dust, a water repellent film inhibiting the attachment of stain, a hard coat film inhibiting generation of a scratch caused by the use, a shock absorption layer, or the like may be placed on the outer side of the substrate 354.

When a flexible material is used for the substrate 353 and the substrate 354, the flexibility of the display device can be increased. The material is not limited thereto, and glass, quartz, ceramic, sapphire, resin, or the like can be used for each of the substrate 353 and the substrate 354.

As the adhesive layer, a variety of curable adhesives, e.g., a photocurable adhesive such as an ultraviolet curable adhesive, a reactive curable adhesive, a thermosetting adhesive, and an anaerobic adhesive can be used. Examples of these adhesives include an epoxy resin, an acrylic resin, a silicone resin, a phenol resin, a polyimide resin, an imide resin, a PVC (polyvinyl chloride) resin, a PVB (polyvinyl butyral) resin, and an EVA (ethylene vinyl acetate) resin. In particular, a material with low moisture permeability, such as an epoxy resin, is preferred. Alternatively, a two-component resin may be used. An adhesive sheet or the like may be used.

As the connection layer, an anisotropic conductive film (ACF), an anisotropic conductive paste (ACP), or the like can be used.

Examples of materials that can be used for a gate, a source, and a drain of a transistor and conductive layers such as a variety of wirings and electrodes included in a display device include metals such as aluminum, titanium, chromium, nickel, copper, yttrium, zirconium, molybdenum, silver, tantalum, or tungsten, and an alloy containing any of these metals as its main component. A film containing any of these materials can be used in a single layer or as a stacked-layer structure.

As a light-transmitting conductive material, a conductive oxide such as indium oxide, indium tin oxide, indium zinc oxide, zinc oxide, or zinc oxide containing gallium, or graphene can be used. Alternatively, a metal material such as gold, silver, platinum, magnesium, nickel, tungsten, chromium, molybdenum, iron, cobalt, copper, palladium, or titanium, or an alloy material containing the metal material can be used. Further alternatively, a nitride of the metal material (e.g., titanium nitride) or the like may be used. Note that in the case of using the metal material or the alloy material (or the nitride thereof), the thickness is preferably set small enough to be able to transmit light. A stacked-layer film of any of the above materials can be used as a conductive layer. For example, a stacked-layer film of indium tin oxide and an alloy of silver and magnesium, or the like is preferably used for increased conductivity. These materials can also be used for conductive layers such as a variety of wirings and electrodes that constitute a display device, and conductive layers (conductive layers functioning as a pixel electrode or a common electrode) and the like included in a light-emitting element and a light-receiving element (or a light-emitting and light-receiving element).

As an insulating material that can be used for each insulating layer, for example, a resin such as an acrylic resin or an epoxy resin, and an inorganic insulating material such as silicon oxide, silicon oxynitride, silicon nitride oxide, silicon nitride, or aluminum oxide can be given.

At least part of this embodiment can be implemented in combination with the other embodiments described in this specification as appropriate.

Embodiment 3

In this embodiment, a circuit that can be used in the display device of one embodiment of the present invention will be described.

Figure 17A:
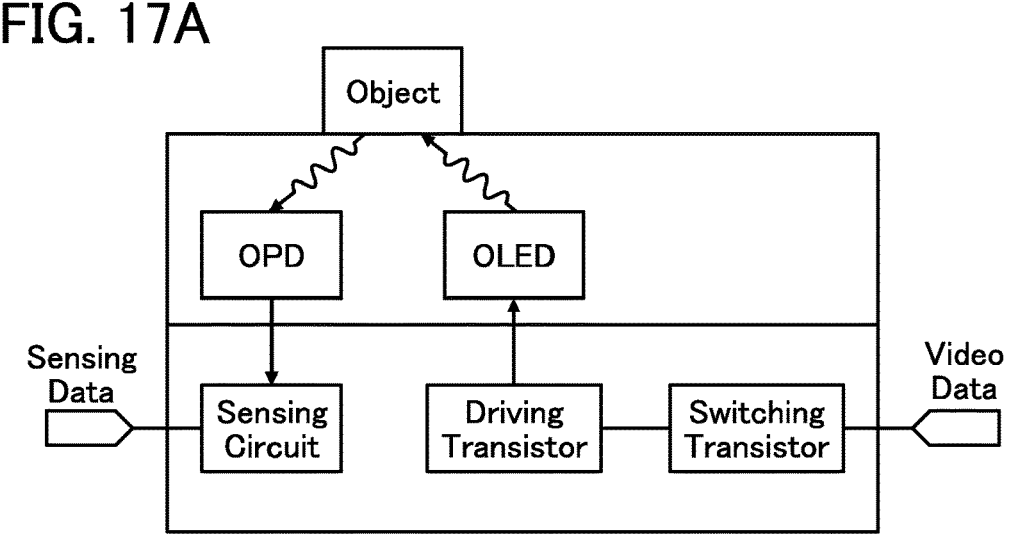
FIG. 17A and FIG. 17B are diagrams illustrating a structure example of a pixel.

FIG. 17A is a block diagram of a pixel of a display device of one embodiment of the present invention.

The pixel includes an OLED, an OPD (Organic Photo Diode), a sensing circuit (denoted as Sensing Circuit), a driving transistor (denoted as Driving Transistor), and a selection transistor (denoted as Switching Transistor).

Light emitted from the OLED is reflected by an object (denoted as Object), and the reflected light is received by the OPD, whereby an image of the object can be captured. One embodiment of the present invention can function as a touch sensor, an image sensor, an image scanner, and the like. With image capturing for a fingerprint, a palm print, a blood vessel (e.g., a vein), or the like, one embodiment of the present invention can be applied to a biometric authentication. Furthermore, an image of a printed matter with a photograph, letters, and the like, or a surface of an article or the like can be captured to be obtained as image information.

The driving transistor and the selection transistor form a driver circuit for driving the OLED. The driving transistor has a function of controlling a current flowing to the OLED, and the OLED can emit light with a luminance according to the current. The selection transistor has a function of controlling selection/non-selection of the pixel. The amount of current flowing to the driving transistor and the OLED is controlled depending on the value (e.g., the voltage value) of video data (denoted as Video Data) that is input from the outside through the selection transistor, whereby the OLED can be emit light with a desired emission luminance.

The sensing circuit corresponds to a driver circuit for controlling the operation of the OPD. The sensing circuit can control operations such as a reset operation for resetting the potential of an electrode of the OPD, a light exposure operation for accumulating charge in the OPD in accordance with the amount of irradiation light, a transfer operation for transferring the charge accumulated in the OPD to a node in the sensing circuit, and a reading operation for outputting a signal (e.g., a voltage or a current) corresponding to the magnitude of the charge, to an external reading circuit as sensing data (denoted as Sensing Data).

Figure 17B:
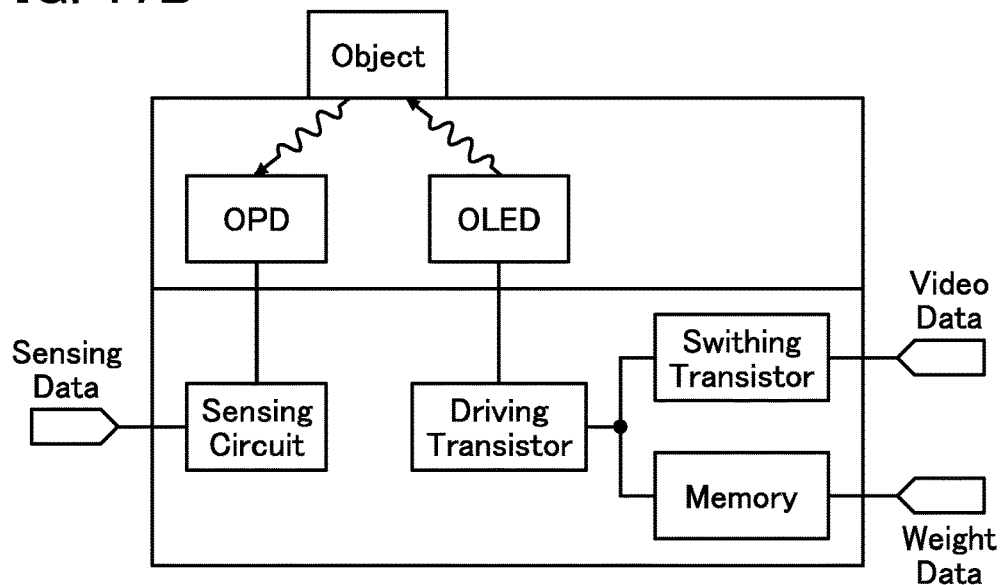

A pixel illustrated in FIG. 17B differs from that described above mainly in including a memory portion (Memory) connected to the driving transistor.

Weight data (Weight Data) is supplied to the memory portion. Data obtained by adding video data input through the selection transistor and the weight data retained in the memory portion is supplied to the driving transistor. With the weight data retained in the memory portion, the luminance of the OLED can be changed from that of the case where only the video data is supplied. Specifically, it is possible to increase or decrease the luminance of the OLED. For example, increasing the luminance of the OLED can increase the light sensitivity of the sensor.

Figure 17C:
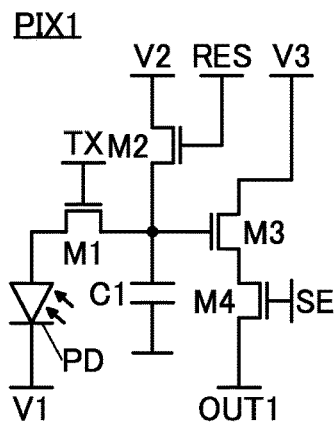
FIG. 17C to FIG. 17E are diagrams illustrating structure examples of a pixel circuit.

FIG. 17C illustrates an example of a pixel circuit that can be used for the sensing circuit.

A pixel circuit PIX1 illustrated in FIG. 17C includes a light-receiving element PD, a transistor M1, a transistor M2, a transistor M3, a transistor M4, and a capacitor C1. Here, an example in which a photodiode is used as the light-receiving element PD is illustrated.

A cathode of the light-receiving element PD is electrically connected to a wiring V1, and an anode thereof is electrically connected to one of a source and a drain of the transistor M1. A gate of the transistor M1 is electrically connected to a wiring TX, and the other of the source and the drain thereof is electrically connected to one electrode of the capacitor C1, one of a source and a drain of the transistor M2, and a gate of the transistor M3. A gate of the transistor M2 is electrically connected to a wiring RES, and the other of the source and the drain thereof is electrically connected to a wiring V2. One of a source and a drain of the transistor M3 is electrically connected to a wiring V3, and the other of the source and the drain thereof is electrically connected to one of a source and a drain of the transistor M4. A gate of the transistor M4 is electrically connected to a wiring SE, and the other of the source and the drain thereof is electrically connected to a wiring OUT1.

A constant potential is supplied to each of the wiring V1, the wiring V2, and the wiring V3. When the light-receiving element PD is driven with a reverse bias, a potential lower than the potential of the wiring V1 is supplied to the wiring V2. The transistor M2 is controlled by a signal supplied to the wiring RES and has a function of resetting the potential of a node connected to the gate of the transistor M3 to a potential supplied to the wiring V2. The transistor M1 is controlled by a signal supplied to the wiring TX and has a function of controlling the timing at which the charge accumulated in the light-receiving element PD is transferred to the node. The transistor M3 functions as an amplifier transistor for performing output corresponding to the potential of the node. The transistor M4 is controlled by a signal supplied to the wiring SE and functions as a selection transistor for reading an output corresponding to the potential of the node by an external circuit connected to the wiring OUT1.

Here, the light-receiving element PD corresponds to the above-described OPD. A potential or a current output from the wiring OUT1 corresponds to the above-described sensing data.

Figure 17D:
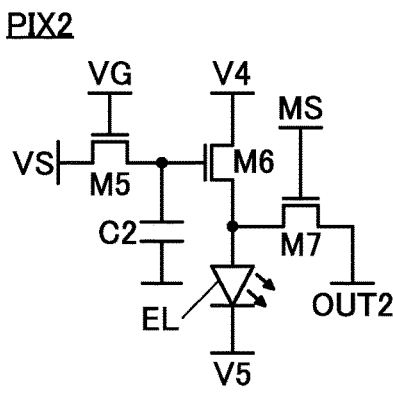

FIG. 17D illustrates an example of a pixel circuit for driving the above-described OLED.

A pixel circuit PIX2 illustrated in FIG. 17D includes a light-emitting element EL, a transistor M5, a transistor M6, a transistor M7, and a capacitor C2. Here, an example in which a light-emitting diode is used as the light-emitting element EL is illustrated. In particular, an organic EL element is preferably used as the light-emitting element EL.

The light-emitting element EL corresponds to the above-described OLED, the transistor M5 corresponds to the above-described selection transistor, and the transistor M6 corresponds to the above-described driving transistor. A wiring VS corresponds to a wiring to which the above-described video data is input.

A gate of the transistor M5 is electrically connected to a wiring VG, one of a source and a drain thereof is electrically connected to the wiring VS, and the other of the source and the drain thereof is electrically connected to one electrode of the capacitor C2 and a gate of the transistor M6. One of a source and a drain of the transistor M6 is electrically connected to a wiring V4, and the other of the source and the drain thereof is electrically connected to an anode of the light-emitting element EL and one of a source and a drain of the transistor M7. A gate of the transistor M7 is electrically connected to a wiring MS, and the other of the source and the drain thereof is electrically connected to a wiring OUT2. A cathode of the light-emitting element EL is electrically connected to a wiring V5.

A constant potential is supplied to each of the wiring V4 and the wiring V5. In the light-emitting element EL, the anode side can have a high potential and the cathode side can have a lower potential than the anode side. The transistor M5 is controlled by a signal supplied to the wiring VG and functions as a selection transistor for controlling a selection state of the pixel circuit PIX2. The transistor M6 functions as a driving transistor that controls a current flowing through the light-emitting element EL, in accordance with a potential supplied to the gate. When the transistor M5 is in an on state, a potential supplied to the wiring VS is supplied to the gate of the transistor M6, and the emission luminance of the light-emitting element EL can be controlled in accordance with the potential. The transistor M7 is controlled by a signal supplied to the wiring MS and has a function of making the potential between the transistor M6 and the light-emitting element EL a potential to be supplied to the wiring OUT2 and/or a function of outputting the potential between the transistor M6 and the light-emitting element EL to the outside through the wiring OUT2.

Figure 17E:
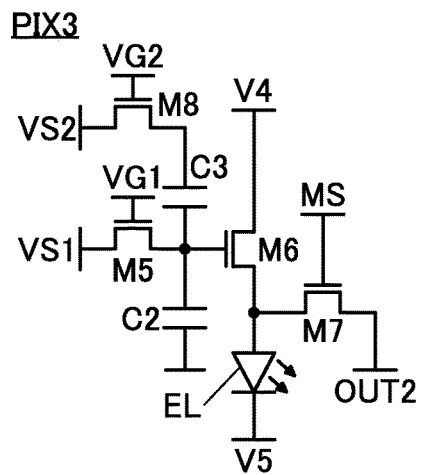

FIG. 17E illustrates an example of a pixel circuit provided with a memory portion, which can be applied to the structure illustrated in FIG. 17B.

A pixel circuit PIX3 illustrated in FIG. 17E has the structure of the pixel circuit PIX2 to which a transistor M8 and a capacitor C3 are added. The wiring VS and the wiring VG in the pixel circuit PIX2 are denoted as a wiring VS1 and a wiring VG1, respectively, in the pixel circuit PIX3.

A gate of the transistor M8 is electrically connected to a wiring VG2, one of a source and a drain of the transistor M8 is electrically connected to a wiring VS2, and the other thereof is electrically connected to one electrode of the capacitor C3. The other electrode of the capacitor C3 is electrically connected to the gate of the transistor M6, one electrode of the capacitor C2, and the other of the source and the drain of the transistor M5.

The wiring VS1 corresponds to the above-described wiring to which the video data is supplied. The wiring VS2 corresponds to a wiring to which the above-described weight data is supplied. A node to which the gate of the transistor M6 is connected corresponds to the above-described memory portion.

An example of a method for operating the pixel circuit PIX3 is described. First, a first potential is written from the wiring VS1 to the node to which the gate of the transistor M6 is connected, through the transistor M5. After that, the transistor M5 is turned off, whereby the node becomes in a floating state. Next, a second potential is written from the wiring VS2 to the one electrode of the capacitor C3 through the transistor M8. Accordingly, the potential of the node changes from the first potential in accordance with the second potential owing to capacitive coupling of the capacitor C3, thereby becoming a third potential. Then, a current corresponding to the third potential flows to the transistor M6 and the light-emitting element EL, whereby the light-emitting element EL emits light with a luminance corresponding to the potential.

Note that in the display device of this embodiment, the light-emitting element may be made to emit light in a pulsed manner so as to display an image. A reduction in the driving time of the light-emitting element can reduce the power consumption of the display panel and suppress heat generation. An organic EL element is particularly preferable because of its favorable frequency characteristics. The frequency can be higher than or equal to 1 kHz and lower than or equal to 100 MHz, for example. Alternatively, a driving method in which the light-emitting element is made to emit light with the pulse width being varied, which is also referred to as Duty driving, may be used.

Here, a transistor including a metal oxide (an oxide semiconductor) in a semiconductor layer where a channels is formed is preferably used as each of the transistor M1, the transistor M2, the transistor M3, and the transistor M4 included in the pixel circuit PIX1, the transistor M5, the transistor M6, and the transistor M7 included in the pixel circuit PIX2, and the transistor M8 included in the pixel circuit PIX3.

Alternatively, a transistor including silicon as a semiconductor where a channel is formed can be used as each of the transistor M1 to the transistor M8. In particular, the use of silicon with high crystallinity, such as single crystal silicon or polycrystalline silicon, is preferable because high field-effect mobility is achieved and higher-speed operation is possible.

Alternatively, a transistor including an oxide semiconductor may be used as one or more of the transistor M1 to the transistor M8, and transistors including silicon may be used as the other transistors.

For example, transistors that include an oxide semiconductor and have an extremely low off-state current are preferably used as the transistor M1, the transistor M2, the transistor M5, the transistor M7, and the transistor M8 that function as switches for retaining charge. In this case, a transistor including silicon can be used as one or more of the other transistors.

Although n-channel transistors are shown as the transistors in the pixel circuit PIX1, the pixel circuit PIX2, and the pixel circuit PIX3, p-channel transistors can also be used. Alternatively, a structure in which n-channel transistor and p-channel transistor are mixed may be employed.

At least part of this embodiment can be implemented in combination with the other embodiments described in this specification as appropriate.

Embodiment 4

In this embodiment, structure examples and application examples of a stacked-layer panel that is one embodiment of a display panel that can easily have a larger size are described with reference to drawings.

One embodiment of the present invention is a display panel capable of increasing its size by arranging a plurality of display panels to partly overlap one another. In two of the overlapping display panels, at least a display panel positioned on the display surface side (upper side) includes a region transmitting visible light that is adjacent to a display portion. A pixel of a display panel positioned on the lower side and the region transmitting visible light of the display panel positioned on the upper side are provided to overlap with each other. Thus, the two of the overlapping display panels can display a seamless and contiguous image when seen from the display surface side (in a plan view).

For example, one embodiment of the present invention is a stacked-layer panel including a first display panel and a second display panel. The first display panel includes a first region, and the first region includes a first pixel and a second pixel. The second display panel includes a second region, a third region, and a fourth region. The second region includes a third pixel. The third region has a function of transmitting visible light. The fourth region has a function of blocking visible light. The second pixel of the first display panel and the third region of the second display panel have a region where they overlap with each other. The aperture ratio of the second pixel is preferably higher than the aperture ratio of the first pixel.

For one or both of the first display panel and the second display panel, the display device described above as an example, which includes a light-emitting element and a light-receiving element, can be used. In other words, at least one of the first pixel, the second pixel, and the third pixel includes a light-emitting element and a light-receiving element.

More details of the structure of one embodiment of the present invention are as follows.

Structure Example 1

[Display Panel]

Figure 18A:
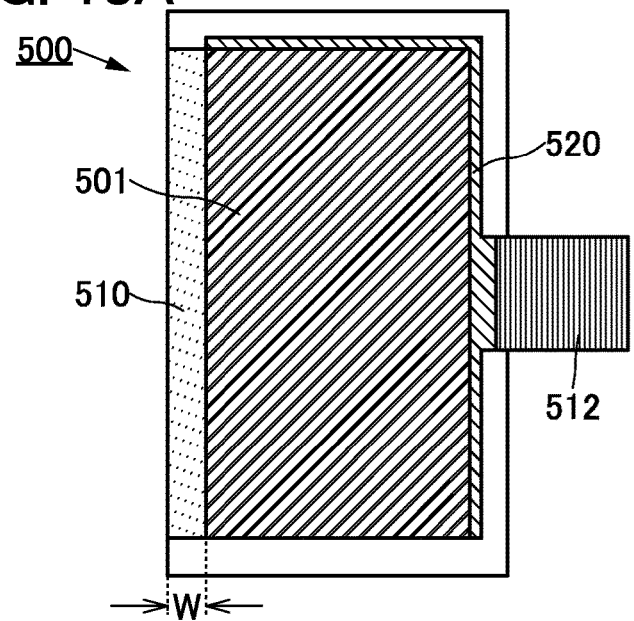
FIG. 18A and FIG. 18B are diagrams illustrating structure examples of a display device.

FIG. 18A is a schematic top view of a display panel 500 included in a display device of one embodiment of the present invention.

The display panel 500 includes a display region 501, and a region 510 transmitting visible light and a region 520 having a portion blocking visible light that are adjacent to the display region 501. FIG. 18A illustrates an example in which the display panel 500 is provided with an FPC (Flexible Printed Circuit) 512.

Here, an image can be displayed on the display region 501 even when the display panel 500 is used independently. Moreover, an image can be captured by the display region 501 even when the display panel 500 is used independently.

In the region 510, for example, a pair of substrates included in the display panel 500, a sealant for sealing the display element interposed between the pair of substrates, and the like may be provided. Here, for a member provided in the region 510, a material with a visible-light-transmitting property is used.

In the region 520, for example, a wiring electrically connected to pixels included in the display region 501 is provided. In addition to such wiring, driver circuits (such as a scan line driver circuit and a signal line driver circuit) for driving the pixels or a circuit such as a protective circuit may be provided. Furthermore, the region 520 includes a region where a terminal electrically connected to the FPC 512 (also referred to as a connection terminal), a wiring electrically connected to the terminal, and the like are provided.

For specific description of a cross-sectional structure example or the like of the display panel, Embodiments 1 and 2 can be referred to.

[Stacked-Layer Panel]

Figure 18B:
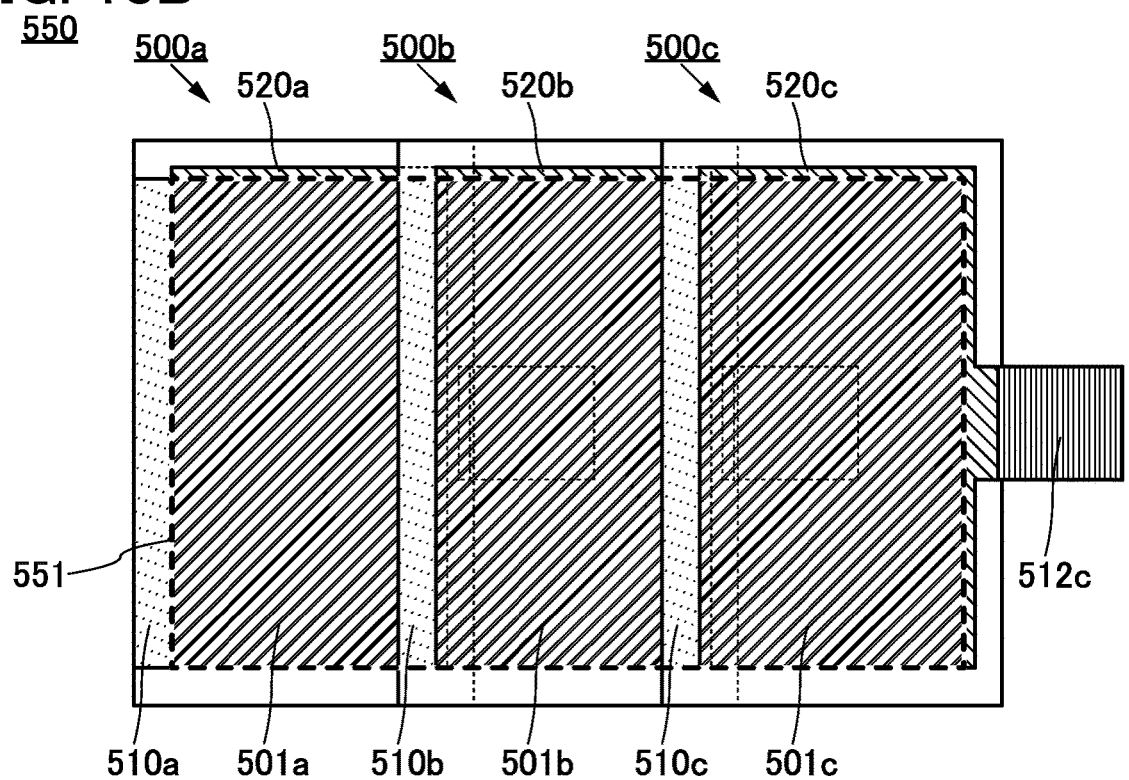

A stacked-layer panel 550 of one embodiment of the present invention includes a plurality of display panels 500 described above. FIG. 18B illustrates a schematic top view of the stacked-layer panel 550 including three display panels.

Hereinafter, to distinguish the display panels from each other, the same components included in the display panels from each other, or the same components relating to the display panels from each other, letters are added to reference numerals of them. Unless otherwise specified, in a plurality of display panels partly overlapping with each other, "a" is added to reference numerals for a display panel placed on the lowest side (the side opposite to the display surface side), components thereof, and the like, and to one or more display panels placed on the upper side of the display panel, components thereof, and the like, "b" or letters after "b" in alphabetical order are added from the lower side. Furthermore, unless otherwise specified, in describing a structure in which a plurality of display panels is included, letters are not added when a common part of the display panels, the components, or the like is described.

The stacked-layer panel 550 illustrated in FIG. 18B includes a display panel 500a, a display panel 500b, and a display panel 500c.

The display panel 500b is placed so that part of the display panel 500b is stacked over an upper side (a display surface side) of the display panel 500a. Specifically, the display panel 500b is placed so that a display region 501a of the display panel 500a and a region 510b transmitting visible light of the display panel 500b overlap with each other and the display region 501a of the display panel 500a and a region 520b blocking visible light of the display panel 500b do not overlap each other.

Similarly, the display panel 500c is placed so as to partly overlap with an upper side (display surface side) of the display panel 500b. Specifically, the display panel 500c is placed so that a display region 501b of the display panel 500b and a region 510c transmitting visible light of the display panel 500c overlap with each other and the display region 501b of the display panel 500b and a region 520c blocking visible light of the display panel 500c do not overlap each other.

The region 510b transmitting visible light overlaps with the display region 501a; thus, the whole display region 501a can be visually recognized from the display surface side. Similarly, the whole display region 501b can also be visually recognized from the display surface side when the region 510c overlaps with the display region 501b. Therefore, a region where the display region 501a, the display region 501b, and a display region 501c are placed seamlessly can serve as a display region 551 of the stacked-layer panel 550.

The display region 551 of the stacked-layer panel 550 can be enlarged by the number of display panels 500. Here, by using display panels each having an image capturing function (i.e., display panels each including a light-emitting element and a light-receiving element) as all the display panels 500, the entire display region 551 can serve as an imaging region.

Note that without limitation to the above, a display panel having an image capturing function and a display panel not having an image capturing function (e.g., a display panel having no light-receiving element) may be combined. For example, a display panel having an image capturing function can be used where needed, and a display panel not having an image capturing function can be used in other portions.

Structure Example 2

In FIG. 18B, the plurality of display panels 500 overlap each other in one direction; however, the plurality of display panels 500 may overlap each other in two directions of the vertical and horizontal directions.

Figure 19A:
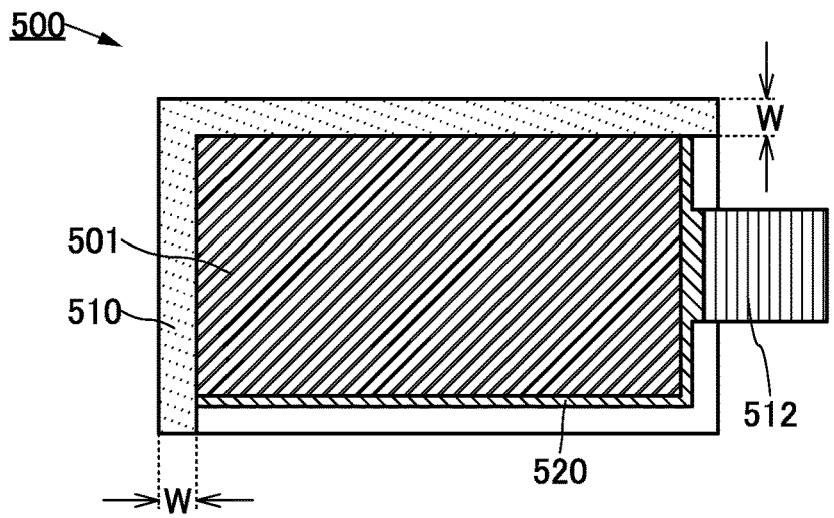
FIG. 19A to FIG. 19C are diagrams illustrating structure examples of a display device.

FIG. 19A illustrates an example of the display panel 500 that differs from that in FIG. 18A in the shape of the region 510. In the display panel 500 in FIG. 19A, the region 510 transmitting visible light is placed along two sides of the display region 501.

Figure 19B:
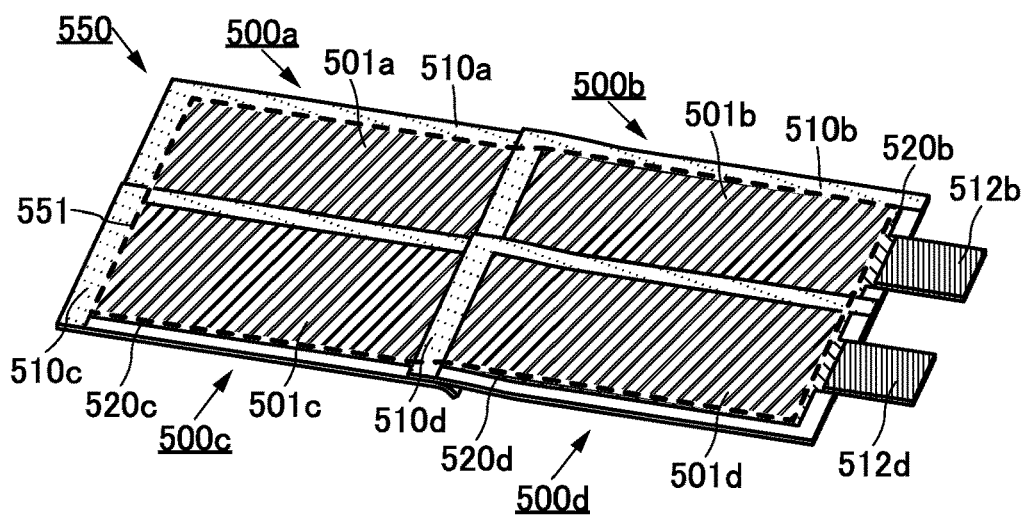
Figure 19C:
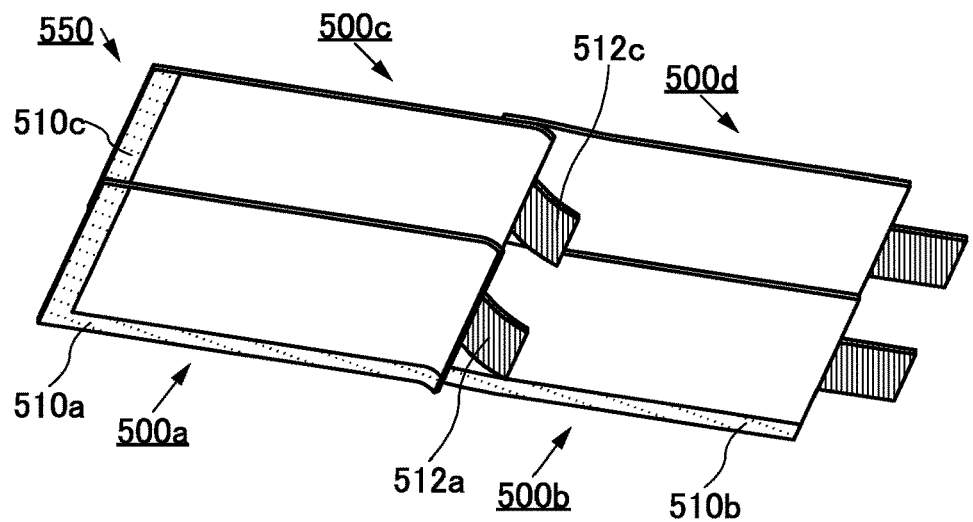

FIG. 19B is a schematic perspective view of the stacked-layer panel 550 in which the display panels 500 in FIG. 19A are arranged two by two in both vertical and horizontal directions. FIG. 19C is a schematic perspective view of the stacked-layer panel 550 when seen from a side opposite to the display surface side.

In FIG. 19B and FIG. 19C, a region along a short side of the display region 501a of the display panel 500a overlaps with part of the region 510b of the display panel 500b. In addition, a region along a long side of the display region 501a of the display panel 500a overlaps with part of the region 510c of the display panel 500c. Moreover, a region 510d of a display panel 500d overlaps with a region along a long side of the display region 501b of the display panel 500b and a region along a short side of the display region 501c of the display panel 500c.

Therefore, as illustrated in FIG. 19B, a region where the display region 501a, the display region 501b, the display region 501c, and the display region 501d are placed seamlessly can serve as the display region 551 of the stacked-layer panel 550.

Here, it is preferable that a flexible material be used for the pair of substrates included in the display panel 500 and the display panel 500 have flexibility. Thus, as is the case of the display panel 500a in FIG. 19B and FIG. 19C, part of the display panel 500a on an FPC 512a side is curved when the FPC 512a and the like are provided on the display surface side, whereby the FPC 512a is placed under the display region 501b of the adjacent display panel 500b so as to overlap with the display region 501b, for example. As a result, the FPC 512a can be placed without physical interference with the rear surface of the display panel 500b. Furthermore, when the display panel 500a and the display panel 500b overlap with and are bonded to each other, it is not necessary to consider the thickness of the FPC 512a; thus, a difference in the height between the top surface of the region 510b of the display panel 500b and the top surface of the display region 501a of the display panel 500a can be reduced. As a result, the end portion of the display panel 500b over the display region 501a is prevented from being viewed.

Moreover, each display panel 500 is made flexible, in which case the display panel 500b can be curved gently so that the height of the top surface of the display region 501b of the display panel 500b is the same as the height of the top surface of the display region 501a of the display panel 500a. Thus, the display regions can have uniform height except in the vicinity of a region where the display panel 500a and the display panel 500b overlap with each other, and the display quality of an image displayed on the display region 551 of the stacked-layer panel 550 can be improved.

Although the relation between the display panel 500a and the display panel 500b is taken as an example in the above description, the same applies to the relation between any other two adjacent display panels.

To reduce the step between two adjacent display panels 500, the thickness of the display panel 500 is preferably small. For example, the thickness of the display panel 500 is preferably less than or equal to 1 mm, further preferably less than or equal to 300 μm, still further preferably less than or equal to 100 μm.

Moreover, a substrate for protecting the display region 551 of the stacked-layer panel 550 (e.g., the second substrate in Embodiment 1) may be provided. The substrate may be provided for each display panel, or one substrate may be provided for a plurality of display panels.

Note that although the structure where the four display panels 500 are stacked is described above, when the number of display panels 500 is increased, an extremely large stacked-layer panel can be obtained. Furthermore, by changing a method for arranging the plurality of display panels 500, the shape of the contour of the display region of the stacked-layer panel can be any of a variety of shapes such as a circular shape, an elliptical shape, and a polygonal shape. In addition, when the display panels 500 are arranged in a three-dimensional manner, a stacked-layer panel including a display region with a three-dimensional shape can be obtained.

Application Example

Figure 20:
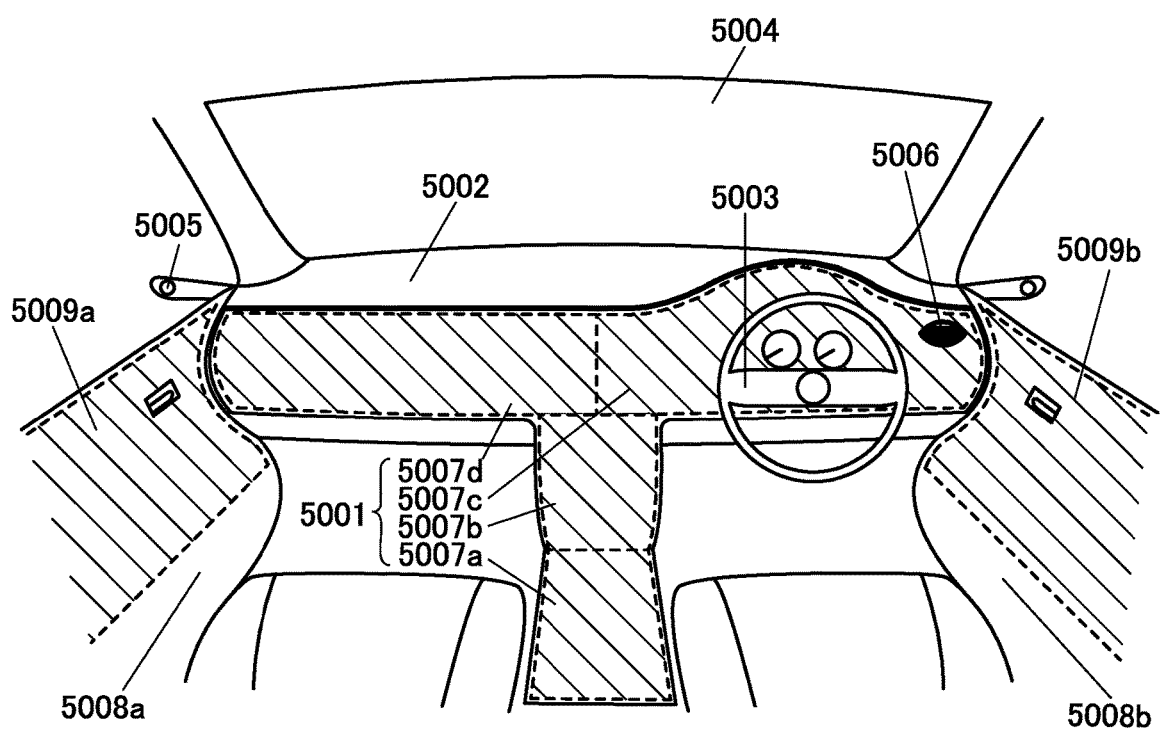
FIG. 20 is a diagram illustrating a structure example of a vehicle.

The above-described stacked-layer panel can be incorporated along a curved surface of an inside wall or an outside wall of a house or a building or the interior or the exterior of a vehicle. FIG. 20 illustrates an example of installation of the stacked-layer panel of one embodiment of the present invention in a vehicle.

FIG. 20 illustrates a structure example of a vehicle equipped with a display portion 5001. The above-described stacked-layer panel is used in the display portion 5001. Note that although in the example illustrated in FIG. 20, the display portion 5001 is installed in, but not limited to, a right-hand drive vehicle; installation in a left-hand drive vehicle is possible. In that case, the left and right of the components arranged in FIG. 20 are reversed.

FIG. 20 illustrates a dashboard 5002, a steering wheel 5003, a windshield 5004, and the like that are arranged around a driver seat and a front passenger seat. The display portion 5001 is placed in a predetermined position in the dashboard 5002, specifically, around the driver, and has a rough T shape. Although one display portion 5001 formed of a plurality of display panels 5007 (display panels 5007a, 5007b, 5007c, and 5007d) is provided along the dashboard 5002 in the example illustrated in FIG. 20, the display portion 5001 may be divided and placed in a plurality of places.

Furthermore, in FIG. 20, a display portion 5009a and a display portion 5009b are provided along a surface of a door 5008a by the passenger seat and a surface of a door 5008b by the driver seat, respectively. Each of the display portion 5009a and the display portion 5009b can be formed using one or a plurality of display panels.

The display portion 5009a and the display portion 5009b are placed to face each other, and the display portion 5001 is provided on the dashboard 5002 so as to connect an end portion of the display portion 5009a and an end portion of the display portion 5009b. Accordingly, the driver and the fellow passenger in the passenger seat are surrounded on the front and both sides by the display portion 5001, the display portion 5009a, and the display portion 5009b. For example, displaying one image across the display portion 5009a, the display portion 5001, and the display portion 5009b can provide an enhanced sense of immersion to the driver and the fellow passenger.

Note that the plurality of display panels 5007 may have flexibility. In this case, the display portion 5001 can be processed into a complicated shape; for example, a structure in which the display portion 5001 is provided along a curved surface of the dashboard 5002 or the like or a structure in which a display region of the display portion 5001 is not provided at a connection portion of the steering wheel, display portions of meters, a ventilation duct 5006, or the like can easily be achieved.

In addition, a plurality of cameras 5005 that take pictures of the situations at the rear side may be provided outside the vehicle. Although the camera 5005 is provided instead of a side mirror in the example in FIG. 20, both the side mirror and the camera may be provided.

As the camera 5005, a CCD camera, a CMOS camera, or the like can be used. In addition, an infrared camera may be used in combination with such a camera. The infrared camera, which has a higher output level with a higher temperature of an object, can detect or extract a living body such as a human or an animal.

An image captured with the camera 5005 can be output to any one or more of the display panels 5007. This display portion 5001 is mainly used for supporting driving of the vehicle. An image of the situation on the rear side is taken at a wide angle of view by the camera 5005, and the image is displayed on the display panels 5007 so that the driver can see a blind area for avoiding an accident.

Furthermore, the use of the display system of one embodiment of the present invention can compensate for the discontinuity of the picture at the junctions between the display panels 5007a, 5007b, 5007c, and 5007d. This makes it possible to display a near seamless picture, so that the visibility of the display portion 5001 during driving can be improved.

Furthermore, a distance image sensor may be provided over a roof of the vehicle, for example, and an image obtained by the distance image sensor may be displayed on the display portion 5001. For the distance image sensor, an image sensor, LIDAR (Light Detection and Ranging), or the like can be used. An image obtained by the image sensor and the image obtained by the distance image sensor are displayed on the display portion 5001, whereby more information can be provided to the driver to support driving.

The display portion 5001 may also have a function of displaying map information, traffic information, television images, DVD images, and the like. For example, map information can be displayed on the display panels 5007a, 5007b, 5007c, and 5007d as a large display screen. Note that the number of display panels 5007 can be increased depending on the image to be displayed.

Furthermore, the images displayed on the display panels 5007a, 5007b, 5007c, and 5007d can be freely set to meet the driver's preference. For example, television images or DVD images are displayed on the display panel 5007d on the left, map information is displayed on the display panel 5007b at the center position, meters are displayed on the display panel 5007c on the right, and audio information and the like are displayed on the display panel 5007a near a transmission gear (between the driver's seat and the front passenger's seat). In addition, a combination of the plurality of display panels 5007 can add a fail-safe function to the display unit 5001. For example, even when any one of the display panels 5007 is broken for any reason, a display region can be changed so that display can be performed using another display panel 5007.

Also images displayed on the display portion 5009*a* and the display portion 5009*b* can be set freely depending on the driver's or fellow passenger's preference. For example, for a child sitting in the front passenger seat, the display portion 5009*a* can display contents for children, such as animation.

In addition, the display portion 5009*a* and the display portion 5009*b* can display an image synchronized with the scenery from the window, which is obtained by synthesizing images obtained by the camera 5005 and the like. That is, an image which the driver and the fellow passenger can see through the door 5008*a* and the door 5008*b* can be displayed on the display portion 5009*a* and the display portion 5009*b*. Therefore, the driver and the fellow passenger can experience a feeling as if they are floating.

A display panel having an image capturing function is preferably used as at least one of the display panels 5007*a*, 5007*b*, 5007*c*, and 5007*d*. Furthermore, a display panel having an image capturing function can also be used as one or more of the display panels provided in the display portion 5009*a* and the display portion 5009*b*.

For example, when the driver touches the display panel, the vehicle can perform biometric authentication such as fingerprint authentication or palm print authentication. The vehicle may have a function of setting an environment to meet the driver's preference when the driver is authenticated by biometric authentication. For example, one or more of adjustment of the position of the seat, adjustment of the position of the handle, adjustment of the position of the camera 5005, setting of brightness, setting of an air conditioner, setting of the speed (frequency) of wipers, volume setting of audio, and reading of the playlist of the audio are preferably performed after authentication.

Alternatively, a vehicle can be brought into a state where the vehicle can be driven, e.g., a state where an engine is started or a state where an electric vehicle can be started after the driver is authenticated by biometric authentication. This is preferable because a key, which is conventionally necessary, is unnecessary.

At least part of this embodiment can be implemented in combination with the other embodiments described in this specification as appropriate.

Embodiment 5

Described in this embodiment is a metal oxide (also referred to as an oxide semiconductor) that can be used in an OS transistor described in the above embodiment.

The metal oxide preferably contains at least indium or zinc. In particular, indium and zinc are preferably contained. In addition, aluminum, gallium, yttrium, tin, or the like is preferably contained. Furthermore, one or more kinds selected from boron, silicon, titanium, iron, nickel, germanium, zirconium, molybdenum, lanthanum, cerium, neodymium, hafnium, tantalum, tungsten, magnesium, cobalt, and the like may be contained.

The metal oxide can be formed by a sputtering method, a chemical vapor deposition (CVD) method such as a metal organic chemical vapor deposition (MOCVD) method, an atomic layer deposition (ALD) method, or the like.

<Classification of Crystal Structures>

Amorphous (including a completely amorphous structure), CAAC (c-axis-aligned crystalline), nc (nanocrystalline), CAC (cloud-aligned composite), single crystal, and polycrystalline (poly crystal) structures can be given as examples of a crystal structure of an oxide semiconductor.

A crystal structure of a film or a substrate can be analyzed with an X-ray diffraction (XRD) spectrum. For example, evaluation is possible using an XRD spectrum obtained by GIXD (Grazing-Incidence XRD) measurement. Note that a GIXD method is also referred to as a thin film method or a Seemann-Bohlin method.

For example, the XRD spectrum of a quartz glass substrate shows a peak with a substantially bilaterally symmetrical shape. On the other hand, the peak of the XRD spectrum of an IGZO film having a crystal structure has a bilaterally asymmetrical shape. The asymmetrical peak of the XRD spectrum clearly shows the existence of crystal in the film or the substrate. In other words, the crystal structure of the film or the substrate cannot be regarded as "amorphous" unless it has a bilaterally symmetrical peak in the XRD spectrum.

A crystal structure of a film or a substrate can also be evaluated with a diffraction pattern obtained by a nanobeam electron diffraction method (NBED) (such a pattern is also referred to as a nanobeam electron diffraction pattern). For example, a halo pattern is observed in the diffraction pattern of the quartz glass substrate, which indicates that the quartz glass substrate is in an amorphous state. Furthermore, not a halo pattern but a spot-like pattern is observed in the diffraction pattern of the IGZO film deposited at room temperature. Thus, it is suggested that the IGZO film deposited at room temperature is in an intermediate state, which is neither a crystal state nor an amorphous state, and it cannot be concluded that the IGZO film is in an amorphous state.

<<Structure of Oxide Semiconductor>>

Oxide semiconductors might be classified in a manner different from the above-described one when classified in terms of the structure. Oxide semiconductors are classified into a single crystal oxide semiconductor and a non-single-crystal oxide semiconductor, for example. Examples of the non-single-crystal oxide semiconductor include the above-described CAAC-OS and nc-OS. Other examples of the non-single-crystal oxide semiconductor include a polycrystalline oxide semiconductor, an amorphous-like oxide semiconductor (a-like OS), and an amorphous oxide semiconductor.

Here, the above-described CAAC-OS, nc-OS, and a-like OS are described in detail.

[CAAC-OS]

The CAAC-OS is an oxide semiconductor that has a plurality of crystal regions each of which has c-axis alignment in a particular direction. Note that the particular direction refers to the film thickness direction of a CAAC-OS film, the normal direction of the surface where the CAAC-OS film is formed, or the normal direction of the surface of the CAAC-OS film. The crystal region refers to a region having a periodic atomic arrangement. When an atomic arrangement is regarded as a lattice arrangement, the crystal region also refers to a region with a uniform lattice arrangement. The CAAC-OS has a region where a plurality of crystal regions are connected in the a-b plane direction, and the region has distortion in some cases. Note that the distortion refers to a portion where the direction of a lattice arrangement changes between a region with a uniform lattice arrangement and another region with a uniform lattice arrangement in a region where a plurality of crystal regions are connected. That is, the CAAC-OS is an oxide semiconductor having c-axis alignment and having no clear alignment in the a-b plane direction.

Note that each of the plurality of crystal regions is formed of one or more fine crystals (crystals each of which has a maximum diameter of less than 10 nm). In the case where the crystal region is formed of one fine crystal, the maximum diameter of the crystal region is less than 10 nm. In the case where the crystal region is formed of a large number of fine crystals, the size of the crystal region may be approximately several tens of nanometers.

In the case of an In-M-Zn oxide (the element M is one or more kinds selected from aluminum, gallium, yttrium, tin, titanium, and the like), the CAAC-OS tends to have a layered crystal structure (also referred to as a layered structure) in which a layer containing indium (In) and oxygen (hereinafter, an In layer) and a layer containing the element M, zinc (Zn), and oxygen (hereinafter, an (M,Zn) layer) are stacked. Indium and the element M can be replaced with each other. Therefore, indium may be contained in the (M,Zn) layer. In addition, the element M may be contained in the In layer. Note that Zn may be contained in the In layer. Such a layered structure is observed as a lattice image in a high-resolution TEM (Transmission Electron Microscope) image, for example.

When the CAAC-OS film is subjected to structural analysis by out-of-plane XRD measurement with an XRD apparatus using θ/2θ scanning, for example, a peak indicating c-axis alignment is detected at 2θ of 31° or around 31°. Note that the position of the peak indicating c-axis alignment (the value of 2θ) may change depending on the kind, composition, or the like of the metal element contained in the CAAC-OS.

For example, a plurality of bright spots are observed in the electron diffraction pattern of the CAAC-OS film. Note that one spot and another spot are observed point-symmetrically with a spot of the incident electron beam passing through a sample (also referred to as a direct spot) as the symmetric center.

When the crystal region is observed from the particular direction, a lattice arrangement in the crystal region is basically a hexagonal lattice arrangement; however, a unit lattice is not always a regular hexagon and is a non-regular hexagon in some cases. A pentagonal lattice arrangement, a heptagonal lattice arrangement, and the like are included in the distortion in some cases. Note that a clear grain boundary cannot be observed even in the vicinity of the distortion in the CAAC-OS. That is, formation of a grain boundary is inhibited by the distortion of lattice arrangement. This is probably because the CAAC-OS can tolerate distortion owing to a low density of arrangement of oxygen atoms in the a-b plane direction, an interatomic bond distance changed by substitution of a metal atom, or the like.

A crystal structure in which a clear grain boundary is observed is what is called polycrystal. It is highly probable that the grain boundary becomes a recombination center and captures carriers and thus decreases the on-state current and field-effect mobility of a transistor, for example. Thus, the CAAC-OS in which no clear grain boundary is observed is one of crystalline oxides having a crystal structure suitable for a semiconductor layer of a transistor. Note that Zn is preferably contained to form the CAAC-OS. For example, an In—Zn oxide and an In—Ga—Zn oxide are suitable because they can inhibit generation of a grain boundary as compared with an In oxide.

The CAAC-OS is an oxide semiconductor with high crystallinity in which no clear grain boundary is observed. Thus, in the CAAC-OS, a reduction in electron mobility due to the grain boundary is unlikely to occur. Moreover, since the crystallinity of an oxide semiconductor might be decreased by entry of impurities, formation of defects, or the like, the CAAC-OS can be regarded as an oxide semiconductor that has a small amount of impurities and defects (e.g., oxygen vacancies). Hence, an oxide semiconductor including the CAAC-OS is physically stable. Therefore, the oxide semiconductor including the CAAC-OS is resistant to heat and has high reliability. In addition, the CAAC-OS is stable with respect to high temperature in the manufacturing process (what is called thermal budget). Accordingly, the use of the CAAC-OS for the OS transistor can extend the degree of freedom of the manufacturing process.

[nc-OS]

In the nc-OS, a microscopic region (e.g., a region with a size greater than or equal to 1 nm and less than or equal to 10 nm, in particular, a region with a size greater than or equal to 1 nm and less than or equal to 3 nm) has a periodic atomic arrangement. In other words, the nc-OS includes a fine crystal. Note that the size of the fine crystal is, for example, greater than or equal to 1 nm and less than or equal to 10 nm, particularly greater than or equal to 1 nm and less than or equal to 3 nm; thus, the fine crystal is also referred to as a nanocrystal. Furthermore, there is no regularity of crystal orientation between different nanocrystals in the nc-OS. Hence, the orientation in the whole film is not observed. Accordingly, the nc-OS cannot be distinguished from an a-like OS or an amorphous oxide semiconductor by some analysis methods. For example, when an nc-OS film is subjected to structural analysis using out-of-plane XRD measurement with an XRD apparatus using θ/2θ scanning, a peak indicating crystallinity is not detected. Furthermore, a diffraction pattern like a halo pattern is observed when the nc-OS film is subjected to electron diffraction (also referred to as selected-area electron diffraction) using an electron beam with a probe diameter larger than the diameter of a nanocrystal (e.g., larger than or equal to 50 nm). Meanwhile, in some cases, a plurality of spots in a ring-like region with a direct spot as the center are observed in the obtained electron diffraction pattern when the nc-OS film is subjected to electron diffraction (also referred to as nanobeam electron diffraction) using an electron beam with a probe diameter nearly equal to or smaller than the diameter of a nanocrystal (e.g., greater than or equal to 1 nm and less than or equal to 30 nm).

[a-like OS]

The a-like OS is an oxide semiconductor having a structure between those of the nc-OS and the amorphous oxide semiconductor. The a-like OS includes a void or a low-density region. That is, the a-like OS has lower crystallinity than the nc-OS and the CAAC-OS. Moreover, the a-like OS has higher hydrogen concentration in the film than the nc-OS and the CAAC-OS.

<<Composition of Oxide Semiconductor>>

Next, the above-described CAC-OS is described in detail. Note that the CAC-OS relates to the material composition.

[CAC-OS]

The CAC-OS refers to one composition of a material in which elements constituting a metal oxide are unevenly distributed with a size greater than or equal to 0.5 nm and less than or equal to 10 nm, preferably greater than or equal to 1 nm and less than or equal to 3 nm, or a similar size, for example. Note that a state in which one or more metal elements are unevenly distributed and regions including the metal element(s) are mixed with a size greater than or equal to 0.5 nm and less than or equal to 10 nm, preferably greater than or equal to 1 nm and less than or equal to 3 nm, or a similar size in a metal oxide is hereinafter referred to as a mosaic pattern or a patch-like pattern.

In addition, the CAC-OS has a composition in which materials are separated into a first region and a second region to form a mosaic pattern, and the first regions are distributed in the film (this composition is hereinafter also referred to as a cloud-like composition). That is, the CAC-OS is a composite metal oxide having a composition in which the first regions and the second regions are mixed.

Note that the atomic ratios of In, Ga, and Zn to the metal elements contained in the CAC-OS in an In—Ga—Zn oxide are denoted with [In], [Ga], and [Zn], respectively. For example, the first region in the CAC-OS in the In—Ga—Zn oxide has [In] higher than [In] in the composition of the CAC-OS film. Moreover, the second region has [Ga] higher than [Ga] in the composition of the CAC-OS film. For example, the first region has higher [In] and lower [Ga] than the second region. Moreover, the second region has higher [Ga] and lower [In] than the first region.

Specifically, the first region includes indium oxide, indium zinc oxide, or the like as its main component. The second region includes gallium oxide, gallium zinc oxide, or the like as its main component. That is, the first region can be referred to as a region containing In as its main component. The second region can be referred to as a region containing Ga as its main component.

Note that a clear boundary between the first region and the second region cannot be observed in some cases.

In a material composition of a CAC-OS in an In—Ga—Zn oxide that contains In, Ga, Zn, and O, regions containing Ga as a main component are observed in part of the CAC-OS and regions containing In as a main component are observed in part thereof. These regions are randomly dispersed to form a mosaic pattern. Thus, it is suggested that the CAC-OS has a structure in which metal elements are unevenly distributed.

The CAC-OS can be formed by a sputtering method under a condition where a substrate is not heated, for example. Moreover, in the case of forming the CAC-OS by a sputtering method, any one or more selected from an inert gas (typically, argon), an oxygen gas, and a nitrogen gas are used as a deposition gas. The ratio of the flow rate of the oxygen gas to the total flow rate of the deposition gas in deposition is preferably as low as possible; for example, the ratio of the flow rate of the oxygen gas to the total flow rate of the deposition gas in deposition is higher than or equal to 0% and lower than 30%, preferably higher than or equal to 0% and lower than or equal to 10%.

For example, energy dispersive X-ray spectroscopy (EDX) is used to obtain EDX mapping, and according to the EDX mapping, the CAC-OS in the In—Ga—Zn oxide has a structure in which the region containing In as its main component (the first region) and the region containing Ga as its main component (the second region) are unevenly distributed and mixed.

Here, the first region has a higher conductivity than the second region. In other words, when carriers flow through the first region, the conductivity of a metal oxide is exhibited. Accordingly, when the first regions are distributed in a metal oxide as a cloud, high field-effect mobility ($\mu$) can be achieved.

The second region has a higher insulating property than the first region. In other words, when the second regions are distributed in a metal oxide, a leakage current can be inhibited.

Thus, in the case where the CAC-OS is used for a transistor, a switching function (On/Off switching function) can be given to the CAC-OS owing to the complementary action of the conductivity derived from the first region and the insulating property derived from the second region. A CAC-OS has a conducting function in part of the material and has an insulating function in another part of the material; as a whole, the CAC-OS has a function of a semiconductor. Separation of the conducting function and the insulating function can maximize each function. Accordingly, when the CAC-OS is used for a transistor, high on-state current ($I_{on}$), high field-effect mobility ($\mu$), and excellent switching operation can be achieved.

A transistor using a CAC-OS has high reliability. Thus, the CAC-OS is most suitable for a variety of semiconductor devices such as display devices.

An oxide semiconductor has various structures with different properties. Two or more kinds among the amorphous oxide semiconductor, the polycrystalline oxide semiconductor, the a-like OS, the CAC-OS, the nc-OS, and the CAAC-OS may be included in an oxide semiconductor of one embodiment of the present invention.

<Transistor Including Oxide Semiconductor>

Next, the case where the above oxide semiconductor is used for a transistor is described.

When the above oxide semiconductor is used for a transistor, a transistor with high field-effect mobility can be achieved. In addition, a transistor having high reliability can be achieved.

An oxide semiconductor with a low carrier concentration is preferably used for the transistor. For example, the carrier concentration of an oxide semiconductor is lower than or equal to $1 \times 10^{17}$ cm$^{-3}$, preferably lower than or equal to $1 \times 10^{15}$ cm$^{-3}$, further preferably lower than or equal to $1 \times 10^{13}$ cm$^{-3}$, still further preferably lower than or equal to $1 \times 10^{11}$ cm$^{-3}$, yet further preferably lower than $1 \times 10^{10}$ cm$^{-3}$, and higher than or equal to $1 \times 10^{-9}$ cm$^{-3}$. In order to reduce the carrier concentration of an oxide semiconductor film, the impurity concentration in the oxide semiconductor film is reduced so that the density of defect states can be reduced. In this specification and the like, a state with a low impurity concentration and a low density of defect states is referred to as a highly purified intrinsic or substantially highly purified intrinsic state. Note that an oxide semiconductor having a low carrier concentration may be referred to as a highly purified intrinsic or substantially highly purified intrinsic oxide semiconductor.

A highly purified intrinsic or substantially highly purified intrinsic oxide semiconductor film has a low density of defect states and accordingly has a low density of trap states in some cases.

Charge trapped by the trap states in the oxide semiconductor takes a long time to disappear and might behave like fixed electric charge. Thus, a transistor whose channel formation region is formed in an oxide semiconductor with a high density of trap states has unstable electrical characteristics in some cases.

Accordingly, in order to obtain stable electrical characteristics of a transistor, reducing the impurity concentration in an oxide semiconductor is effective. In order to reduce the impurity concentration in the oxide semiconductor, it is preferable that the impurity concentration in an adjacent film be also reduced. Examples of impurities include hydrogen, nitrogen, an alkali metal, an alkaline earth metal, iron, nickel, and silicon.

<Impurities>

Here, the influence of each impurity in the oxide semiconductor is described.

When silicon, carbon, or the like, which is one of Group 14 elements, is contained in the oxide semiconductor, defect states are formed in the oxide semiconductor. Thus, the concentration of silicon or carbon in the oxide semiconductor and the concentration of silicon or carbon in the vicinity of an interface with the oxide semiconductor (the concentration measured by secondary ion mass spectrometry (SIMS)) are lower than or equal to $2\times10^{18}$ atoms/cm$^3$, preferably lower than or equal to $2\times10^{17}$ atoms/cm$^3$.

When the oxide semiconductor contains an alkali metal or an alkaline earth metal, defect states are formed and carriers are generated in some cases. Accordingly, a transistor including an oxide semiconductor that contains an alkali metal or an alkaline earth metal tends to have normally-on characteristics. Thus, the concentration of an alkali metal or an alkaline earth metal in the oxide semiconductor, which is obtained by SIMS, is lower than or equal to $1\times10^{18}$ atoms/cm$^3$, preferably lower than or equal to $2\times10^{16}$ atoms/cm$^3$.

When the oxide semiconductor contains nitrogen, the oxide semiconductor easily becomes n-type by generation of electrons serving as carriers and an increase in carrier concentration. As a result, a transistor using an oxide semiconductor containing nitrogen as a semiconductor is likely to have normally-on characteristics. When nitrogen is contained in the oxide semiconductor, a trap state is sometimes formed. This might make the electrical characteristics of the transistor unstable. Therefore, the concentration of nitrogen in the oxide semiconductor, which is obtained by SIMS, is lower than $5\times10^{19}$ atoms/cm$^3$, preferably lower than or equal to $5\times10^{18}$ atoms/cm$^3$, further preferably lower than or equal to $1\times10^{18}$ atoms/cm$^3$, still further preferably lower than or equal to $5\times10^{17}$ atoms/cm$^3$.

Hydrogen contained in the oxide semiconductor reacts with oxygen bonded to a metal atom to be water, and thus forms an oxygen vacancy in some cases. Entry of hydrogen into the oxygen vacancy generates an electron serving as a carrier in some cases. Furthermore, bonding of part of hydrogen to oxygen bonded to a metal atom causes generation of an electron serving as a carrier in some cases. Thus, a transistor using an oxide semiconductor containing hydrogen is likely to have normally-on characteristics. Accordingly, hydrogen in the oxide semiconductor is preferably reduced as much as possible. Specifically, the hydrogen concentration in the oxide semiconductor, which is obtained by SIMS, is lower than $1\times10^{20}$ atoms/cm$^3$, preferably lower than $1\times10^{19}$ atoms/cm$^3$, further preferably lower than $5\times10^{18}$ atoms/cm$^3$, still further preferably lower than $1\times10^{18}$ atoms/cm$^3$.

When an oxide semiconductor with sufficiently reduced impurities is used for the channel formation region of the transistor, stable electrical characteristics can be given.

At least part of this embodiment can be implemented in combination with the other embodiments described in this specification as appropriate.

Embodiment 6

In this embodiment, electronic devices of embodiments of the present invention are described with reference to FIG. 21 to FIG. 23.

The electronic device of one embodiment of the present invention can perform imaging, touch operation detection, or the like in the display portion, for example. Consequently, the electronic device can have improved functionality and convenience, for example.

Examples of electronic devices of embodiments of the present invention include a digital camera, a digital video camera, a digital photo frame, a mobile phone, a portable game console, a portable information terminal, and an audio reproducing device, in addition to electronic devices with a relatively large screen, such as a television device, a desktop or laptop personal computer, a monitor of a computer or the like, digital signage, and a large game machine such as a pachinko machine.

The electronic device of one embodiment of the present invention may include a sensor (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays).

The electronic device of one embodiment of the present invention can have a variety of functions. For example, the electronic device can have a function of displaying a variety of information (a still image, a moving image, a text image, and the like) on the display portion, a touch panel function, a function of displaying a calendar, date, time, and the like, a function of executing a variety of software (programs), a wireless communication function, and a function of reading out a program or data stored in a recording medium.

Figure 21A:
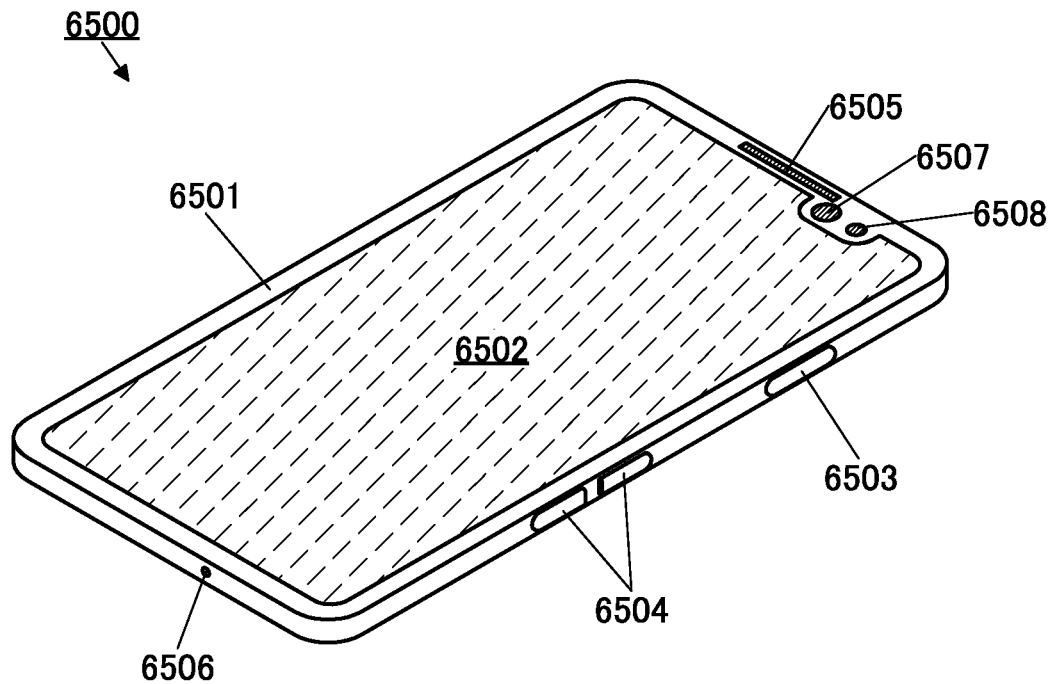
FIG. 21A and FIG. 21B are diagrams showing a structure example of an electronic device.

An electronic device 6500 illustrated in FIG. 21A is a portable information terminal that can be used as a smartphone.

The electronic device 6500 includes a housing 6501, a display portion 6502, a power button 6503, buttons 6504, a speaker 6505, a microphone 6506, a camera 6507, a light source 6508, and the like. The display portion 6502 has a touch panel function.

The display device described in Embodiment 2 can be used in the display portion 6502.

Figure 21B:
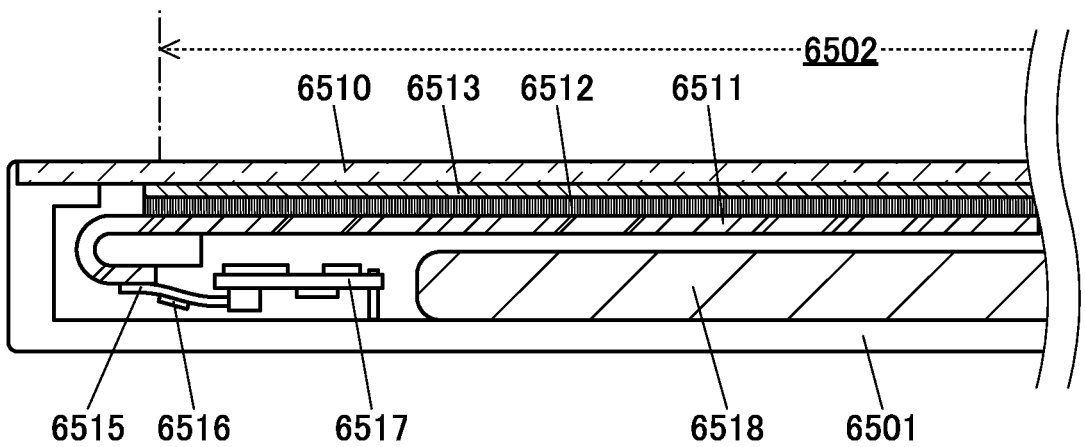

FIG. 21B is a schematic cross-sectional view including an end portion of the housing 6501 on the microphone 6506 side.

A protection member 6510 having a light-transmitting property is provided on the display surface side of the housing 6501, and a display panel 6511, an optical member 6512, a touch sensor panel 6513, a printed circuit board 6517, a battery 6518, and the like are provided in a space surrounded by the housing 6501 and the protection member 6510.

The display panel 6511, the optical member 6512, and the touch sensor panel 6513 are fixed to the protection member 6510 with an adhesive layer (not illustrated).

Part of the display panel 6511 is folded back in a region outside the display portion 6502, and an FPC 6515 is connected to the part that is folded back. An IC 6516 is mounted on the FPC 6515. The FPC 6515 is connected to a terminal provided on the printed circuit board 6517.

A flexible display of one embodiment of the present invention can be used as the display panel 6511. Thus, an extremely lightweight electronic device can be achieved. Since the display panel 6511 is extremely thin, the battery 6518 with high capacity can be mounted with the thickness of the electronic device controlled. An electronic device with a narrow frame can be achieved when part of the display panel 6511 is folded back so that the portion connected to the FPC 6515 is provided on the rear side of a pixel portion.

Using the display device described in Embodiment 2 as the display panel 6511 allows imaging on the display portion 6502. For example, an image of a fingerprint is captured by the display panel 6511; thus, fingerprint identification can be performed.

When the display portion 6502 further includes the touch sensor panel 6513, the display portion 6502 can be provided with a touch panel function. A variety of types such as a capacitive type, a resistive type, a surface acoustic wave type, an infrared type, an optical type, and a pressuresensitive type can be used for the touch sensor panel 6513. Alternatively, the display panel 6511 may function as a touch sensor; in such a case, the touch sensor panel 6513 is not necessarily provided.

Figure 22A:
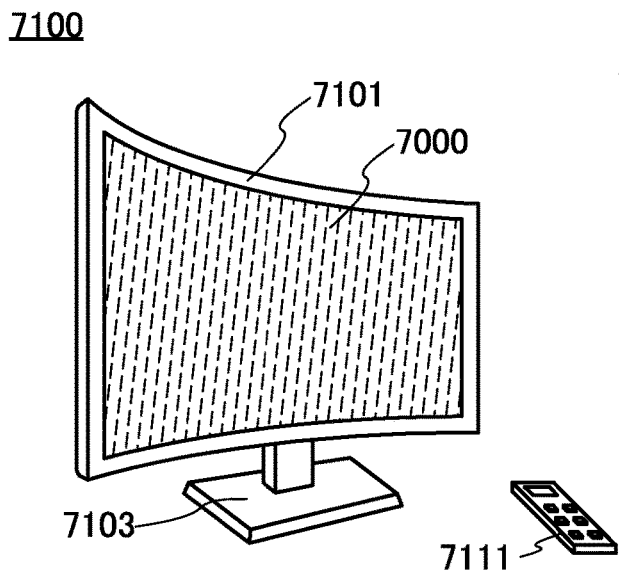
FIG. 22A to FIG. 22D are diagrams illustrating structure examples of electronic devices.

FIG. 22A illustrates an example of a television device. In a television device 7100, a display portion 7000 is incorporated in a housing 7101. Here, a structure in which the housing 7101 is supported by a stand 7103 is illustrated.

The display device described in Embodiment 2 can be used in the display portion 7000.

Operation of the television device 7100 illustrated in FIG. 22A can be performed with an operation switch provided in the housing 7101 or a separate remote controller 7111. Alternatively, the display portion 7000 may include a touch sensor, and the television device 7100 may be operated by a touch on the display portion 7000 with a finger or the like. The remote controller 7111 may include a display portion for displaying information output from the remote controller 7111. With operation keys or a touch panel provided in the remote controller 7111, channels and volume can be controlled, and videos displayed on the display portion 7000 can be controlled.

Note that the television device 7100 has a structure in which a receiver, a modem, and the like are provided. A general television broadcast can be received with the receiver. When the television device is connected to a communication network with or without wires via the modem, one-way (from a transmitter to a receiver) or two-way (between a transmitter and a receiver or between receivers, for example) data communication can be performed.

Figure 22B:
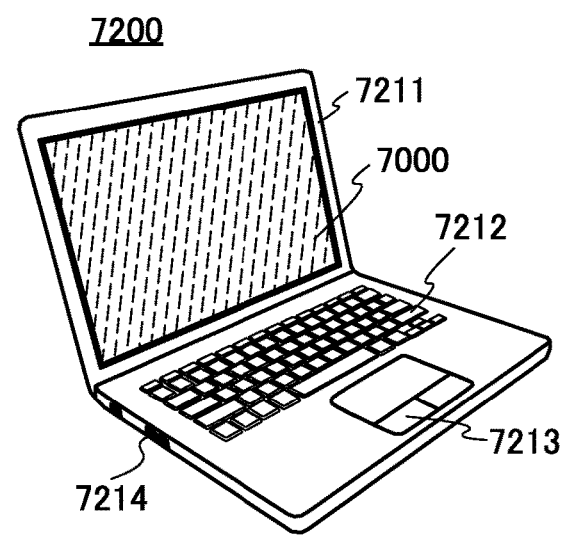

FIG. 22B illustrates an example of a laptop personal computer. A laptop personal computer 7200 includes a housing 7211, a keyboard 7212, a pointing device 7213, an external connection port 7214, and the like. In the housing 7211, the display portion 7000 is incorporated.

The display device described in Embodiment 2 can be used in the display portion 7000.

Figure 22C:
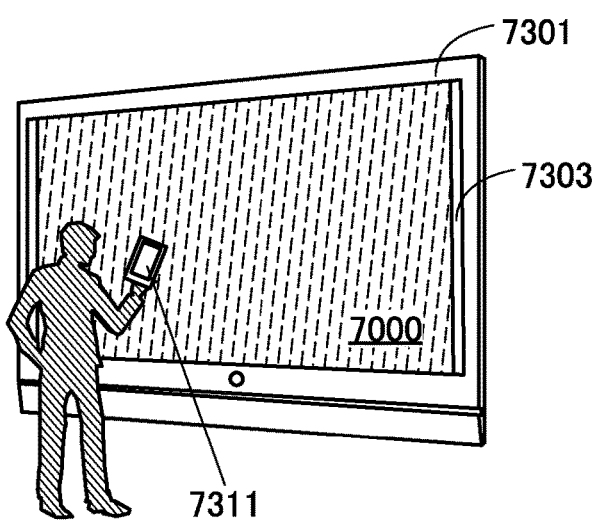
Figure 22D:
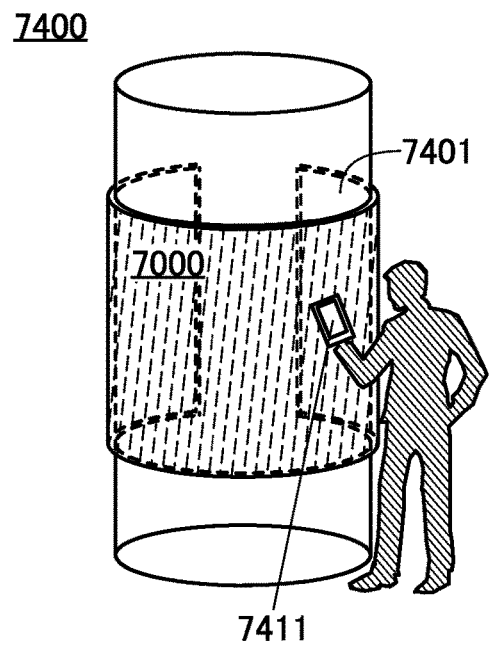

FIG. 22C and FIG. 22D illustrate examples of digital signage.

Digital signage 7300 illustrated in FIG. 22C includes a housing 7301, the display portion 7000, a speaker 7303, and the like. Furthermore, the digital signage can include an LED lamp, operation keys (including a power switch or an operation switch), a connection terminal, a variety of sensors, a microphone, and the like.

FIG. 22D is digital signage 7400 attached to a cylindrical pillar 7401. The digital signage 7400 includes the display portion 7000 provided along a curved surface of the pillar 7401.

A larger area of the display portion 7000 can increase the amount of information that can be provided at a time. The larger display portion 7000 attracts more attention, so that the advertising effectiveness can be enhanced, for example.

The use of a touch panel in the display portion 7000 is preferable because in addition to display of a still image or a moving image on the display portion 7000, intuitive operation by a user is possible. Moreover, for an application for providing information such as route information or traffic information, usability can be enhanced by intuitive operation.

As illustrated in FIG. 22C and FIG. 22D, it is preferable that the digital signage 7300 or the digital signage 7400 can work with an information terminal 7311 or an information terminal 7411, such as a smartphone a user has, through wireless communication. For example, information of an advertisement displayed on the display portion 7000 can be displayed on a screen of the information terminal 7311 or the information terminal 7411. By operation of the information terminal 7311 or the information terminal 7411, display on the display portion 7000 can be switched.

The display device described in Embodiment 2 can be used in the display portion of the information terminal 7311 or the information terminal 7411 in FIG. 22C and FIG. 22D.

It is possible to make the digital signage 7300 or the digital signage 7400 execute a game with use of the screen of the information terminal 7311 or the information terminal 7411 as an operation means (controller). Thus, an unspecified number of users can join in and enjoy the game concurrently.

Electronic devices illustrated in FIG. 23A to FIG. 23F include a housing 9000, a display portion 9001, a speaker 9003, an operation key 9005 (including a power switch or an operation switch), a connection terminal 9006, a sensor 9007 (a sensor having a function of measuring force, displacement, position, speed, acceleration, angular velocity, rotational frequency, distance, light, liquid, magnetism, temperature, a chemical substance, sound, time, hardness, electric field, current, voltage, electric power, radiation, flow rate, humidity, gradient, oscillation, a smell, or infrared rays), a microphone 9008, and the like.

The electronic devices illustrated in FIG. 23A to FIG. 23F have a variety of functions. For example, the electronic devices can have a function of displaying a variety of information (a still image, a moving image, a text image, and the like) on the display portion, a touch panel function, a function of displaying a calendar, date, time, and the like, a function of controlling processing with the use of a variety of software (programs), a wireless communication function, and a function of reading out and processing a program or data stored in a recording medium. Note that the functions of the electronic devices are not limited thereto, and the electronic devices can have a variety of functions. The electronic devices may include a plurality of display portions. The electronic devices may each include a camera or the like and have a function of taking a still image, a moving image, or the like and storing the taken image in a recording medium (an external recording medium or a recording medium incorporated in the camera), a function of displaying the taken image on the display portion, or the like.

The details of the electronic devices illustrated in FIG. 23A to FIG. 23F are described below.

Figure 23A:
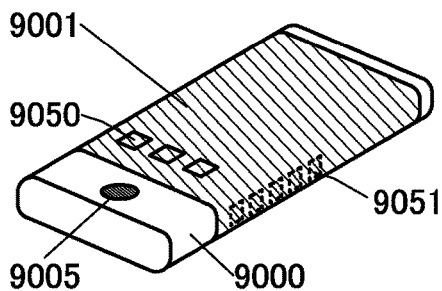
FIG. 23A to FIG. 23F are diagrams illustrating structure examples of electronic devices.

FIG. 23A is a perspective view illustrating a portable information terminal 9101. The portable information terminal 9101 can be used as a smartphone, for example. Note that the portable information terminal 9101 may be provided with the speaker 9003, the connection terminal 9006, the sensor 9007, or the like. The portable information terminal 9101 can display letters, image information, or the like on its plurality of surfaces. FIG. 23A illustrates an example where three icons 9050 are displayed. Information 9051 indicated by dashed rectangles can be displayed on another surface of the display portion 9001. Examples of the information 9051 include notification of reception of an e-mail, SNS, an incoming call, or the like, the title and sender of an e-mail, SNS, or the like, the date, the time, remaining battery, and the reception strength of an antenna. Alternatively, the icon 9050 or the like may be displayed at the position where the information 9051 is displayed.

Figure 23B:
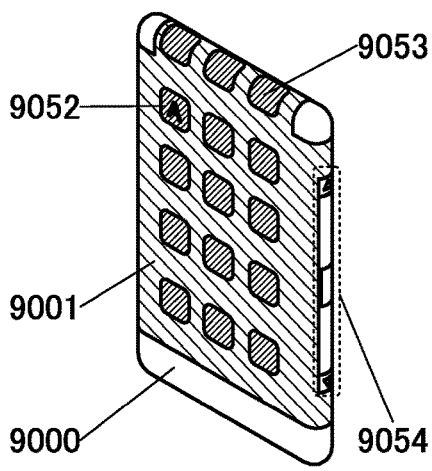

FIG. 23B is a perspective view illustrating a portable information terminal 9102. The portable information terminal 9102 has a function of displaying information on three or more surfaces of the display portion 9001. Here, an example in which information 9052, information 9053, and information 9054 are displayed on different surfaces is shown. For example, a user can check the information 9053 displayed at a position that can be observed from above the portable information terminal 9102, with the portable information terminal 9102 put in a breast pocket of his/her clothes. The user can see the display without taking out the portable information terminal 9102 from the pocket and decide whether to answer the call, for example.

Figure 23C:
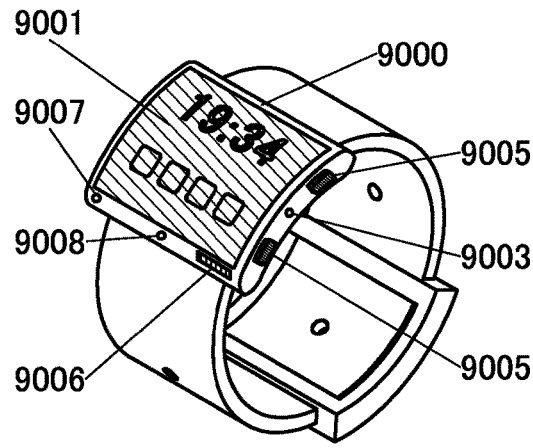

FIG. 23C is a perspective view illustrating a watch-type portable information terminal 9200. The information terminal 9200 can be used as a smartwatch, for example. The display portion 9001 is provided such that its display surface is curved, and display can be performed along the curved display surface. Mutual communication between the portable information terminal 9200 and, for example, a headset capable of wireless communication enables hands-free calling. With the connection terminal 9006, the portable information terminal 9200 can perform mutual data transmission with another information terminal, charging, and the like. Note that the charging operation may be performed by wireless power feeding.

Figure 23D:
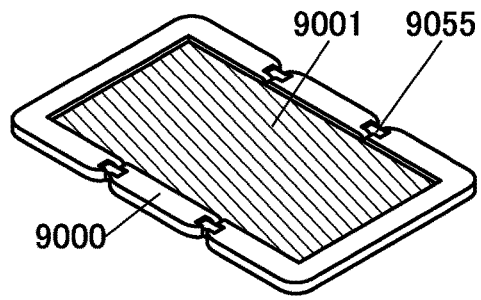
Figure 23E:
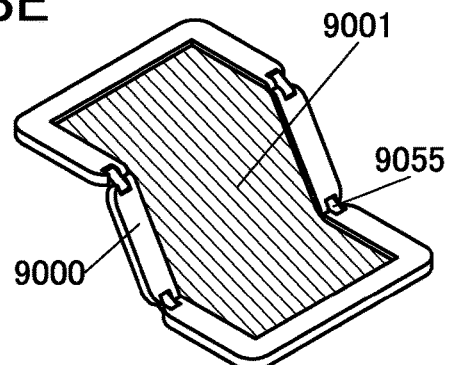
Figure 23F:
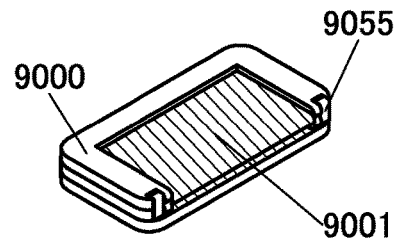

FIG. 23D to FIG. 23F are perspective views illustrating a foldable portable information terminal 9201. FIG. 23D is a perspective view of an opened state of the portable information terminal 9201, FIG. 23F is a perspective view of a folded state thereof, and FIG. 23E is a perspective view of a state in the middle of change from one of FIG. 23D and FIG. 23F to the other. The portable information terminal 9201 is highly portable in the folded state and is highly browsable in the opened state because of a seamless large display region. The display portion 9001 of the portable information terminal 9201 is supported by three housings 9000 joined by hinges 9055. For example, the display portion 9001 can be curved with a radius of curvature greater than or equal to 0.1 mm and less than or equal to 150 mm.

At least part of this embodiment can be implemented in combination with the other embodiments described in this specification as appropriate.

EXAMPLE

In this example, evaluation results of the characteristics of the light-receiving element of one embodiment of the present invention that was fabricated will be described.

In this example, two light-receiving elements (Samples A1 and A2) were fabricated. The two light-receiving elements fabricated in this example had similar structures except for the structure of an active layer.

Chemical formulae of materials used in this example are shown below.

[Chemical Formulae 1]

Table 1 shows specific structures of the light-receiving elements fabricated in this example. The light-receiving element 270PD illustrated in FIG. 10A can be referred to for the structures of the light-receiving elements. Note that in this example, a buffer layer was formed over the common electrode 275.

TABLE 1

| | Pixel electrode 271 | Hole-injection layer 281 | Hole-transport layer 282 | Active layer 273 | | Electron-transport layer 284 | | Electron-injection layer 285 | Common electrode 275 | Buffer layer |
|---|---|---|---|---|---|---|---|---|---|---|
| Sample A1 | APC\ITSO 100 nm\ 100 nm | BBABnf:OCHD-001 (=1:0.1) 10 nm | BBABnf 40 nm | $C_{70}$:DBP (=9:1) 60 nm | | 2mDBTBPDBq-II 10 nm | NBPhen 10 nm | LiF 1 nm | Ag:Mg (=10:1) 10 nm | DBT3P-II 80 nm |
| Sample A2 | | | | Rubrene 54 nm | Me-PTCDI 6 nm | | | | | |

The pixel electrode 271 (also referred to as a first electrode) was formed by depositing an alloy of silver (Ag), palladium (Pd), and copper (Cu) (Ag—Pd—Cu (APC)) by a sputtering method to a thickness of 100 nm and depositing indium tin oxide containing silicon oxide (ITSO) by a sputtering method to a thickness of 100 nm.

Next, a base material provided with the pixel electrode 271 was washed with water, baked at 200° C. for an hour, and then subjected to UV ozone treatment for 370 seconds. Then, the substrate was transferred into a vacuum evaporation apparatus where the pressure was reduced to approximately $10^{-4}$ Pa, and vacuum baking was performed at 170° C. for 30 minutes in a heating chamber of the vacuum evaporation apparatus. Then, the substrate was cooled down for approximately 30 minutes.

The hole-injection layer 281 was formed by depositing N,N-bis(4-biphenyl)-6-phenylbenzo[b]naphtho[1,2-d] furan-8-amine (abbreviation: BBABnf) and an electron acceptor material (OCHD-001) by co-evaporation at a weight ratio of BBABnf:OCHD-001=1:0.10. The hole-injection layer 281 was formed to a thickness of 10 nm.

The hole-transport layer 282 was formed by depositing BBABnf by evaporation to a thickness of 40 nm.

The active layer 273 in Sample A1 was formed by depositing Fullerene $C_{70}$ and tetraphenyldibenzoperiflanthene (abbreviation: DBP) by co-evaporation at a weight ratio of $C_{70}$:DBP=9:1. The active layer 273 was formed to a thickness of 60 nm.

The active layer 273 in Sample A2 was formed by depositing N,N'-dimethyl-3,4,9,10-perylenetetracarboxylic diimide (abbreviation: Me-PTCDI) by evaporation to a thickness of 54 nm and then depositing Rubrene by evaporation to a thickness of 6 nm.

The electron-transport layer 284 was formed by depositing 2-[3'-(dibenzothiophen-4-yl)biphenyl-3-yl]dibenzo[f,h] quinoxaline (abbreviation: 2mDBTBPDBq-II) by evaporation to a thickness of 10 nm and subsequently depositing 2,9-bis(naphthalen-2-yl)-4,7-diphenyl-1,10-phenanthroline (abbreviation: NBPhen) by evaporation to a thicknesses of 10 nm.

The electron-injection layer 285 was formed by depositing lithium fluoride (LiF) by evaporation to a thickness of 1 nm.

The common electrode 275 (also referred to as a second electrode) was formed by co-evaporation so that the volume ratio of silver (Ag) to magnesium (Mg) was 10:1 to a thickness of 10 nm.

Furthermore, as the buffer layer, 4,4',4''-(benzene-1,3,5-triyl)tri(dibenzothiophene) (abbreviation: DBT3P-II) was deposited by evaporation to a thickness 80 nm over the common electrode 275.

In the above manner, Sample A1 and Sample A2 that differed in the structure of the active layer were each fabricated.

Table 2 shows the HOMO levels, the LUMO levels, and the deposition temperatures of the materials of the active layer of each of the light-receiving elements. Deposition rates are also shown below the deposition temperatures. It is found that the deposition temperature of the active layer used in Sample A2 can be lower than that in Sample A1 and the materials of the active layer is a combination that can increase the deposition rate.

TABLE 2

|  | Sample A1 | | Sample A2 | |
| --- | --- | --- | --- | --- |
|  | Acceptor $C_{70}$ | Donor DBP | Acceptor Me-PTCDI | Donor Rubrene |
| HOMO | −6.0 eV | −5.5 eV | −6.6 eV | −5.5 eV |
| LUMO | −4.2 eV | −3.5 eV | −4.0 eV | −3.1 eV |
| Deposition temperature | 510° C. @0.9 Å/s | 450° C. @0.1 Å/s | 350° C. @0.9 Å/s | 210° C. @0.9 Å/s |

Figure 24A:
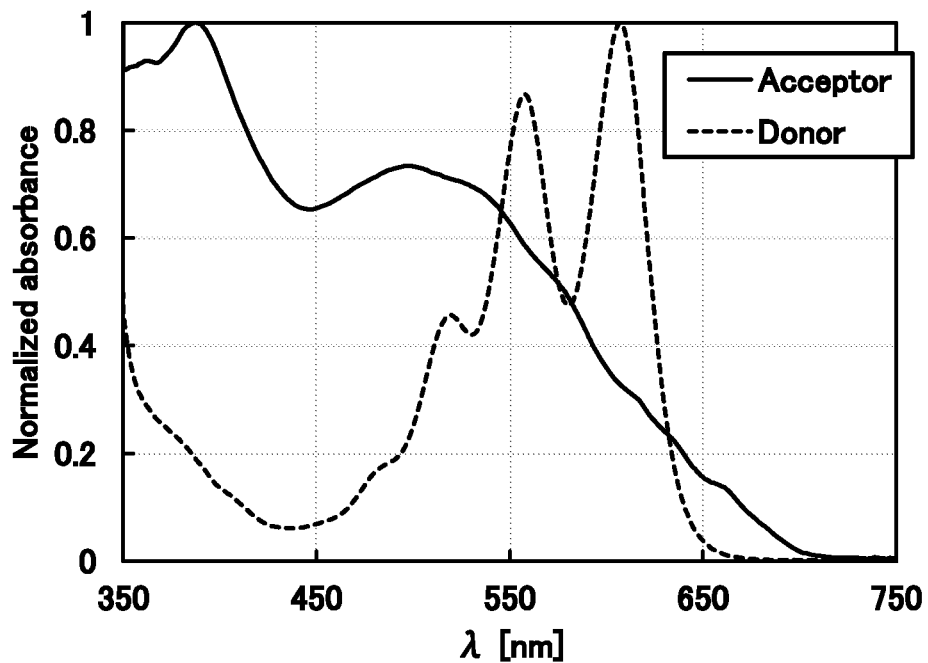
FIG. 24A and FIG. 24B show measurement results of absorption coefficients of light-receiving elements.
Figure 24B:
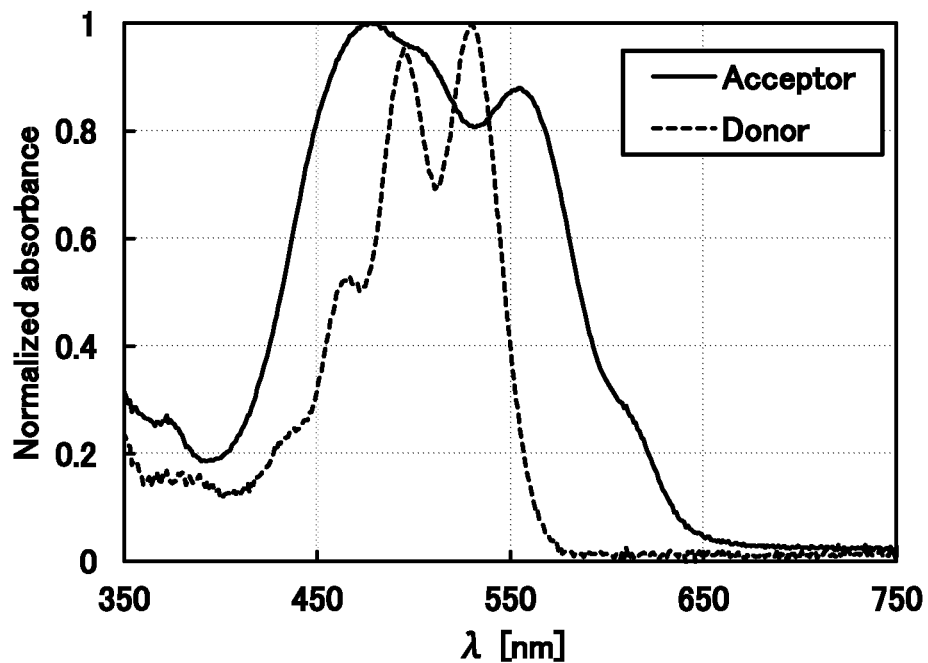

FIG. 24A and FIG. 24B show wavelength dependence of the absorption coefficients of the materials of the active layers. FIG. 24A shows the results of Sample A1, and FIG. 24B shows the results of Sample A2. In each graph, the horizontal axis represents wavelength ($\lambda$ [nm]) and the vertical axis represents a normalized absorption coefficient (Normalized absorbance).

As shown in FIG. 24A, absorption of the acceptor in Sample A1 expands to the long wavelength side. Furthermore, the weight of the acceptor is 90 wt % in Sample A1. Therefore, Sample A1 is a light-receiving element that has sensitivity in a wide range of the visible region.

Meanwhile, as shown in FIG. 24B, absorption of the acceptor and absorption of the donor in Sample A2 are positioned in the green wavelength range. In particular, the donor has a sharper absorption peak than the acceptor in a narrow wavelength range. The donor occupies 90% of the whole active layer in Sample A2; therefore, Sample A2 is a light-receiving element that has high sensitivity in the green wavelength range.

Figure 25A:
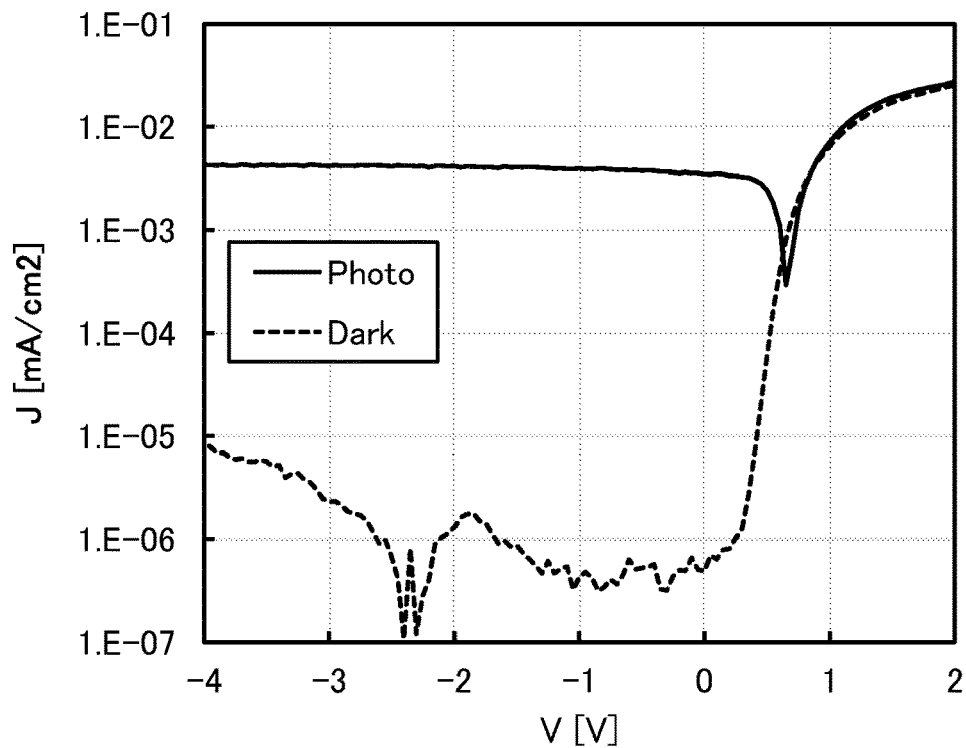
FIG. 25A and FIG. 25B show measurement results of current-voltage characteristics of the light-receiving elements.
Figure 25B:
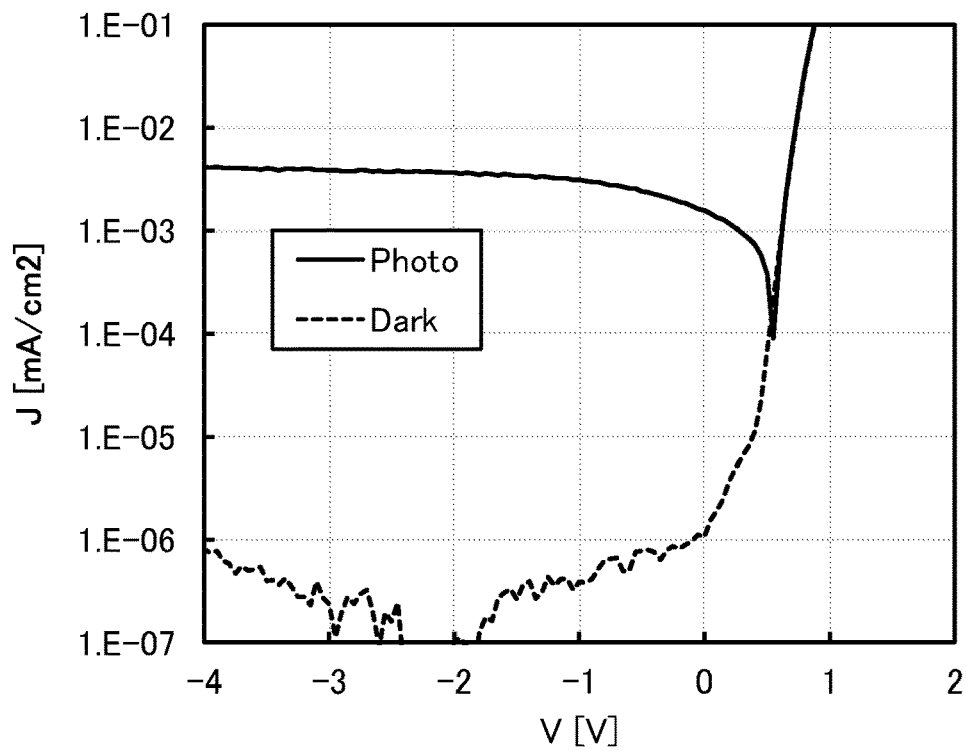

Next, the current-voltage characteristics of each light-receiving element were measured. The measurement was performed in each of a state with irradiation with monochromatic light of 525 nm at an irradiance of 12.5 μW/cm$^2$ (denoted by Photo) and a dark state (denoted by Dark). FIG. 25A and FIG. 25B show the current-voltage characteristics. FIG. 25A and FIG. 25B show the measurement results of Sample A1 and Sample A2, respectively. In each graph, the horizontal axis represents voltage (V [V]) and the vertical axis represents current density (J [mA/cm$^2$]).

As shown in FIG. 25A and FIG. 25B, it was confirmed that Sample A1 and Sample A2 each exhibited favorable saturation characteristics.

Figure 26A:
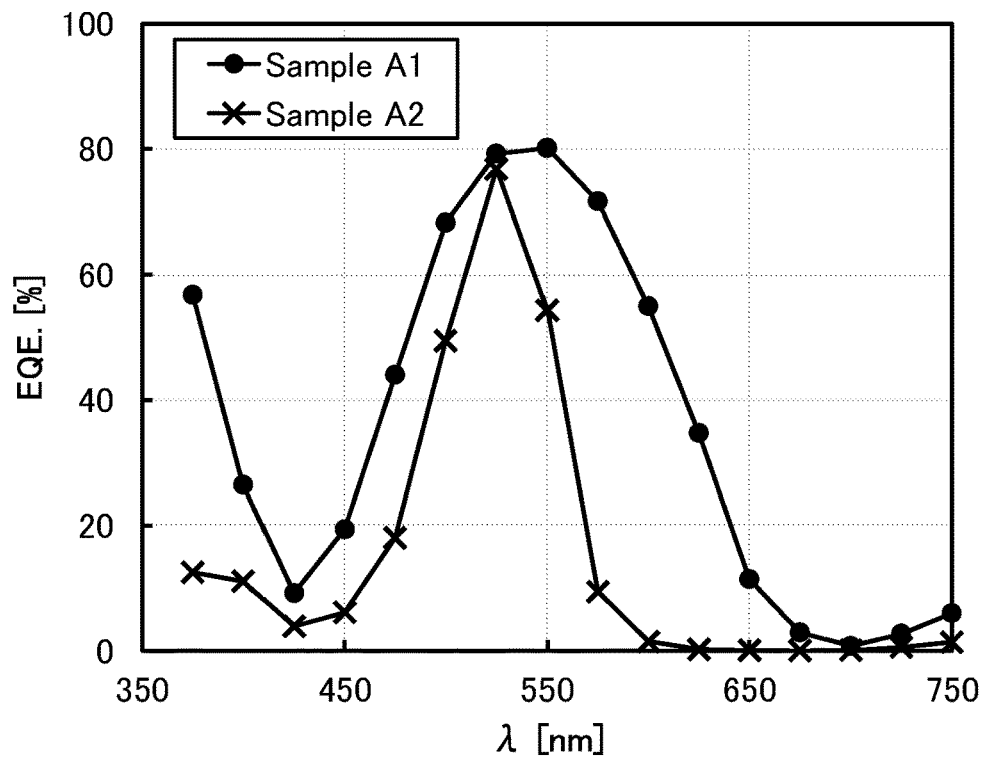
FIG. 26A shows measurement results of external quantum efficiency.

FIG. 26A shows wavelength dependence of external quantum efficiency (EQE). The EQE was measured at a voltage of −4V and an irradiance of 12.5 μW/cm$^2$ with various wavelengths. In FIG. 26A, the horizontal axis represents wavelength ($\lambda$ [nm]) and the vertical axis represents EQE ([%]).

It was found from FIG. 26A that any of the light-receiving elements had the highest sensitivity peak at around 525 nm. Furthermore, it was found that Sample A1 had broader sensitivity than Sample A2 particularly on the long wavelength side. Meanwhile, it was confirmed that Sample A2 had sensitivity selectively in the green wavelength range.

Figure 26B:
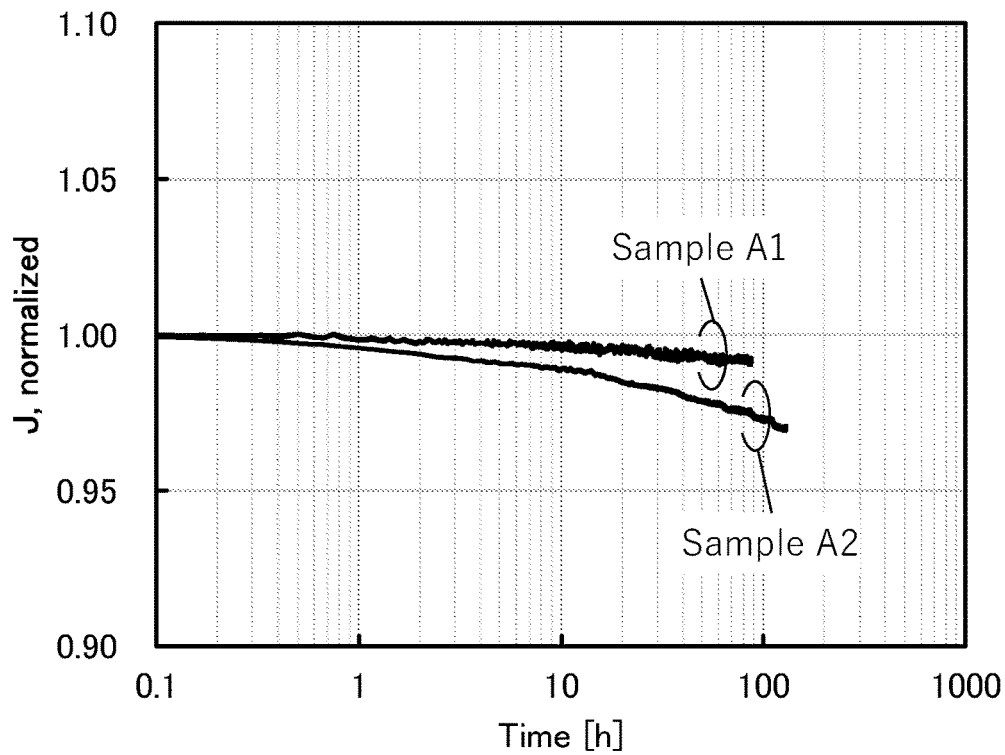
FIG. 26B shows reliability test results of the light-receiving elements.

Next, the reliability of each light-receiving element was evaluated. For the evaluation of the reliability, the light-receiving element was irradiated with light of 5000 K at an illuminance of 100 klux using a white LED, and the current density was measured with the condition kept at a voltage of −4 V and a temperature of 25° C. FIG. 26B shows the measurement results of the light-receiving elements. In FIG. 26B, the horizontal axis represents time (Time [h]) and the vertical axis represents normalized current density (J, normalized). As shown in FIG. 26B, it was found that any of the light-receiving elements had high reliability.

REFERENCE NUMERALS 10, 10a, 10b: display device; 11, 12: substrate: 13, 14: resin layer; 15: functional layer; 16: resin layer; 17: protective layer; 20: light-receiving element; 21: conductive layer; 22: photoelectric conversion layer; 23: conductive layer; 25: light-blocking layer; 30, 30R, 30G, 30B: light-emitting element; 31: conductive layer; 32: EL layer; 40, 40a: pixel; 41: insulating layer; 42: protective layer; 43: conductive layer; 50: finger; 51, 52: light; 55: resin layer; 56a, 56b, 57: conductive layer; 58: insulating layer, 500, 500a-500d: display panel; 501, 501a-501d: display region; 510, 510b-510d: region; 512a-512d: FPC; 520, 520b, 520c: region; 550: stacked-layer panel, 551: display region, 5001: display portion; 5002: dashboard; 5003: steering wheel; 5004: windshield; 5005: camera; 5006: ventilation duct; 5007, 5007a-5007d: display panel; 5008a, 5008b: door; 5009a, 5009b: display portion

The invention claimed is:

1. A display device comprising a light-receiving element, a light-emitting element, a first substrate, a second substrate, a first resin layer, a second resin layer, and a light-blocking layer,
   wherein the first resin layer, the second resin layer, and the second substrate are stacked in this order over the first substrate,
   wherein the light-receiving element and the light-emitting element are each between the first substrate and the first resin layer,
   wherein the light-blocking layer is between the first resin layer and the second resin layer and comprises a first opening portion overlapping with the light-receiving element,
   wherein the first opening portion is on an inner side of a light-receiving region of the light-receiving element in a plan view and a width of the first opening portion is less than or equal to a width of the light-receiving region, and
   wherein the second substrate is thicker than each of the first resin layer and the second resin layer.

2. The display device according to claim 1,
   wherein the light-receiving element comprises a first pixel electrode, an active layer, and a common electrode,
   wherein the light-emitting element comprises a second pixel electrode, a light-emitting layer, and the common electrode,
   wherein the first pixel electrode and the second pixel electrode are positioned on the same surface, and
   wherein the common electrode comprises a portion overlapping with the first pixel electrode with the active layer therebetween and a portion overlapping with the second pixel electrode with the light-emitting layer therebetween.

3. The display device according to claim 2, further comprising:
a common layer,
wherein the common layer comprises a portion between the first pixel electrode and the common electrode, a portion between the second pixel electrode and the common electrode, and a portion overlapping neither the first pixel electrode nor the second pixel electrode.

4. The display device according to claim 1,
wherein a plurality of the light-emitting elements are included,
wherein the plurality of the light-receiving elements are periodically arranged in a matrix, and
wherein an arrangement pitch of the light-emitting elements is greater than or equal to 1 μm and less than or equal to 150 μm.

5. The display device according to claim 4,
wherein a plurality of the light-emitting elements are included, and
wherein the plurality of the light-emitting elements are arranged in a matrix with the same arrangement pitch as the light-receiving elements.

6. The display device according to claim 4,
wherein a plurality of the light-emitting elements are included, and
wherein the plurality of the light-emitting elements are arranged in a matrix with an arrangement pitch different from that of the light-receiving elements.

7. The display device according to claim 1, further comprising:
a functional layer,
wherein the functional layer comprises a third resin layer,
wherein the functional layer is between the second resin layer and the second substrate,
wherein the third resin layer has a lower refractive index with respect to a wavelength of light emitted by the light-emitting element than the second substrate, and
wherein the third resin layer is thinner than the second substrate and thicker than each of the first resin layer and the second resin layer.

8. The display device according to claim 7,
wherein the functional layer is a polarizing plate.

9. The display device according to claim 7,
wherein the functional layer is a touch sensor, and
wherein the functional layer comprises a first electrode along a first surface of the third resin layer.

10. The display device according to claim 7, further comprising:
a fourth resin layer,
wherein the fourth resin layer is between the functional layer and the second substrate,
wherein the fourth resin layer is thinner than each of the second substrate and the functional layer, and
wherein the fourth resin layer has a lower refractive index with respect to the wavelength of light emitted by the light-emitting element than the second substrate.

11. The display device according to claim 1, further comprising:
a protective layer,
wherein the protective layer is between the first substrate and the first resin layer,
wherein the protective layer covers the light-receiving element and the light-emitting element,
wherein the protective layer comprises an inorganic insulator, and
wherein the protective layer is thinner than the first resin layer.

12. The display device according to claim 11, further comprising:
a second electrode,
wherein the second electrode is between the protective layer and the first resin layer,
wherein the second electrode functions as an electrode of a touch sensor, and
wherein the second electrode is thinner than the first resin layer.

13. A display module comprising:
the display device according to claim 1, and a connector or an integrated circuit.

14. An electronic device comprising:
the display module according to claim 13; and
at least one of an antenna, a battery, a housing, a camera, a speaker, a microphone, a touch sensor, and an operation button.

15. The display device according to claim 1,
wherein the first resin layer comprises a region in which a thickness of a portion overlapping with the light-receiving region of the light-receiving element is greater than or equal to one time and less than or equal to 10 times as large as the width of the light-receiving region.

16. The display device according to claim 1, further comprising a third resin layer and a fourth resin layer,
wherein the third resin layer is between the second resin layer and the second substrate,
wherein the fourth resin layer is between the third resin layer and the second substrate, and
wherein the second substrate is thicker than each of the third resin layer and the fourth resin layer.

17. A display device comprising a light-receiving element, a light-emitting element, a first substrate, a second substrate, a first resin layer, a second resin layer, and a light-blocking layer,
wherein the first resin layer, the second resin layer, and the second substrate are stacked in this order over the first substrate,
wherein the light-receiving element and the light-emitting element are each between the first substrate and the first resin layer,
wherein the light-blocking layer is between the first resin layer and the second resin layer and comprises a first opening portion overlapping with the light-receiving element,
wherein the first opening portion is on an inner side of a light-receiving region of the light-receiving element in a plan view and a width of the first opening portion is less than or equal to a width of the light-receiving region,
wherein the second substrate is thicker than each of the first resin layer and the second resin layer, and
wherein the second substrate has a higher refractive index with respect to a wavelength of light emitted by the light-emitting element than the first resin layer and the second resin layer.

18. The display device according to claim 17,
wherein the first resin layer has a lower refractive index with respect to the wavelength of light emitted by the light-emitting element than the second resin layer.

19. The display device according to claim 17,
wherein the refractive index of the second substrate with respect to the wavelength of light emitted by the light-emitting element is greater than or equal to 1.5 and less than or equal to 2.0, and
wherein the refractive index of the first resin layer with respect to the wavelength of light emitted by the light-emitting element is greater than or equal to 1.3 and less than or equal to 1.6.

20. The display device according to claim 17, further comprising a third resin layer and a fourth resin layer,
wherein the third resin layer is between the second resin layer and the second substrate,
wherein the fourth resin layer is between the third resin layer and the second substrate, and
wherein the second substrate is thicker than each of the third resin layer and the fourth resin layer.

* * * * *